(12) United States Patent
Nishio

(10) Patent No.: US 7,619,832 B2
(45) Date of Patent: Nov. 17, 2009

(54) IMAGING APPARATUS

(75) Inventor: Akihiro Nishio, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 11/929,356

(22) Filed: Oct. 30, 2007

(65) Prior Publication Data

US 2008/0273250 A1      Nov. 6, 2008

(30) Foreign Application Priority Data

Dec. 5, 2006    (JP) .............................. 2006-328094

(51) Int. Cl.
*G02B 15/14* (2006.01)
(52) U.S. Cl. ..................... 359/691; 359/676; 359/784; 396/79; 250/234
(58) Field of Classification Search .................. 359/432, 359/676, 691, 716, 784; 396/79, 85; 250/234
See application file for complete search history.

(56) References Cited

U.S. PATENT DOCUMENTS 5,587,739 A    12/1996  Suzuki et al.
6,771,432 B2   8/2004   Mihara
6,850,373 B2   2/2005   Mihara et al.
6,975,462 B2   12/2005  Mihara
7,145,730 B2   12/2006  Mihara

FOREIGN PATENT DOCUMENTS

| JP | 06-284322 A | 10/1994 |
|---|---|---|
| JP | 2004-037967 A | 2/2004 |
| JP | 2004-069808 A | 3/2004 |
| JP | 2005-084151 | * 3/2005 |
| JP | 2005-084151 A | 3/2005 |
| JP | 2006-106071 A | 4/2006 |

* cited by examiner

*Primary Examiner*—Joseph Martinez
(74) *Attorney, Agent, or Firm*—Canon USA Inc IP Div

(57) ABSTRACT

An imaging apparatus, configured to form an image on an image pickup element, includes, in an order from an object side toward an image side, a first optical unit having a negative refractive power, a second optical unit having a positive refractive power, and a third optical unit including the image pickup element. The first optical unit does not move during zooming. The second optical unit moves toward the object side and the third optical unit moves.

14 Claims, 43 Drawing Sheets

WIDE-ANGLE END

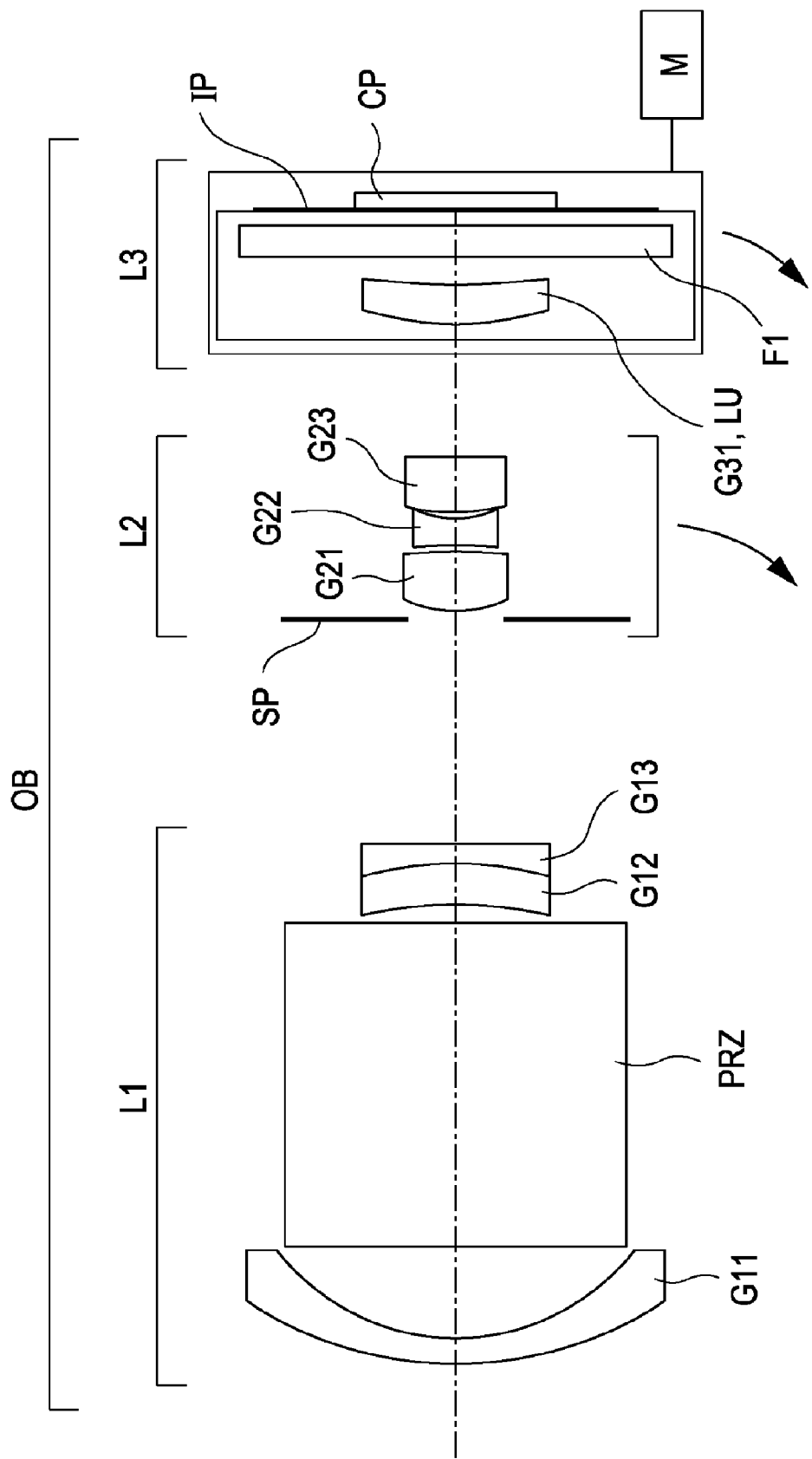

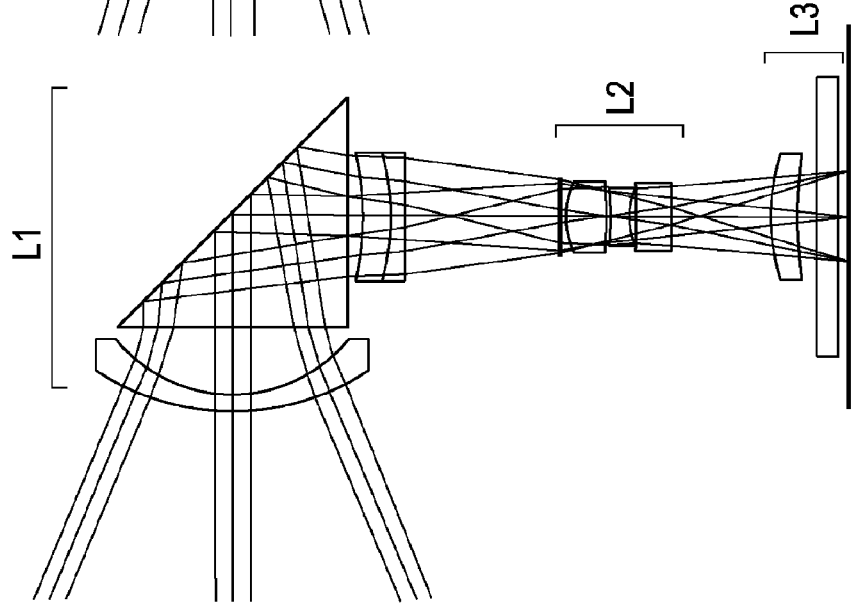
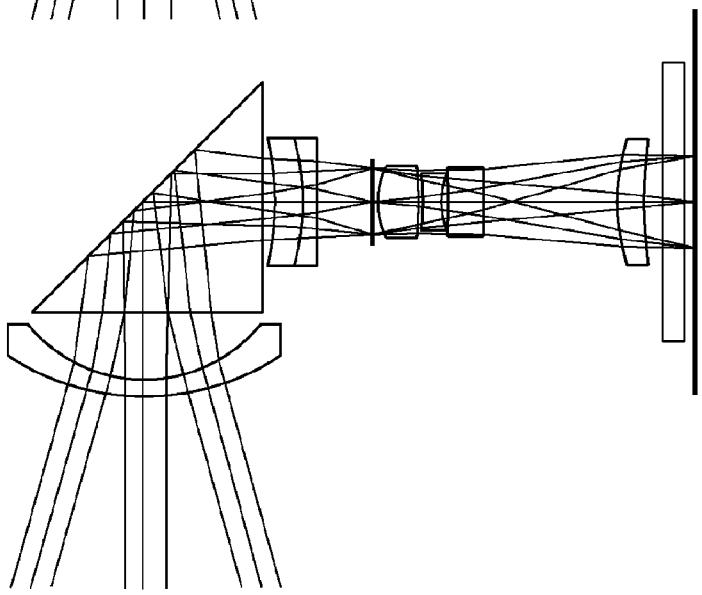
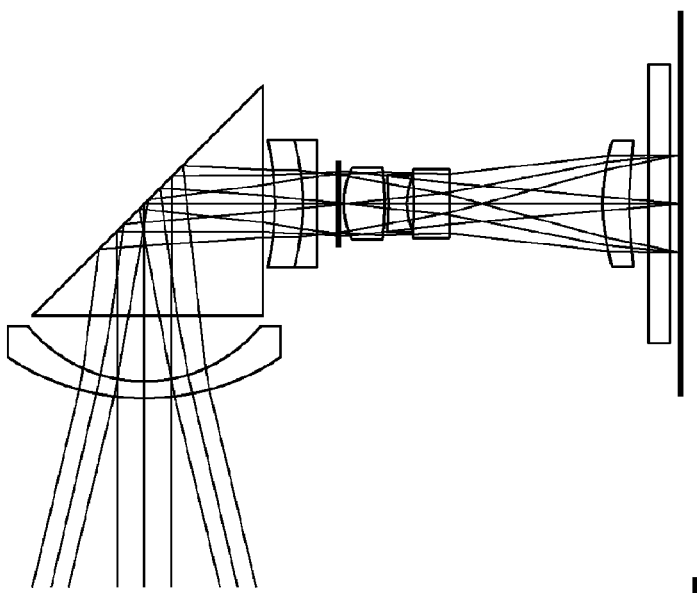

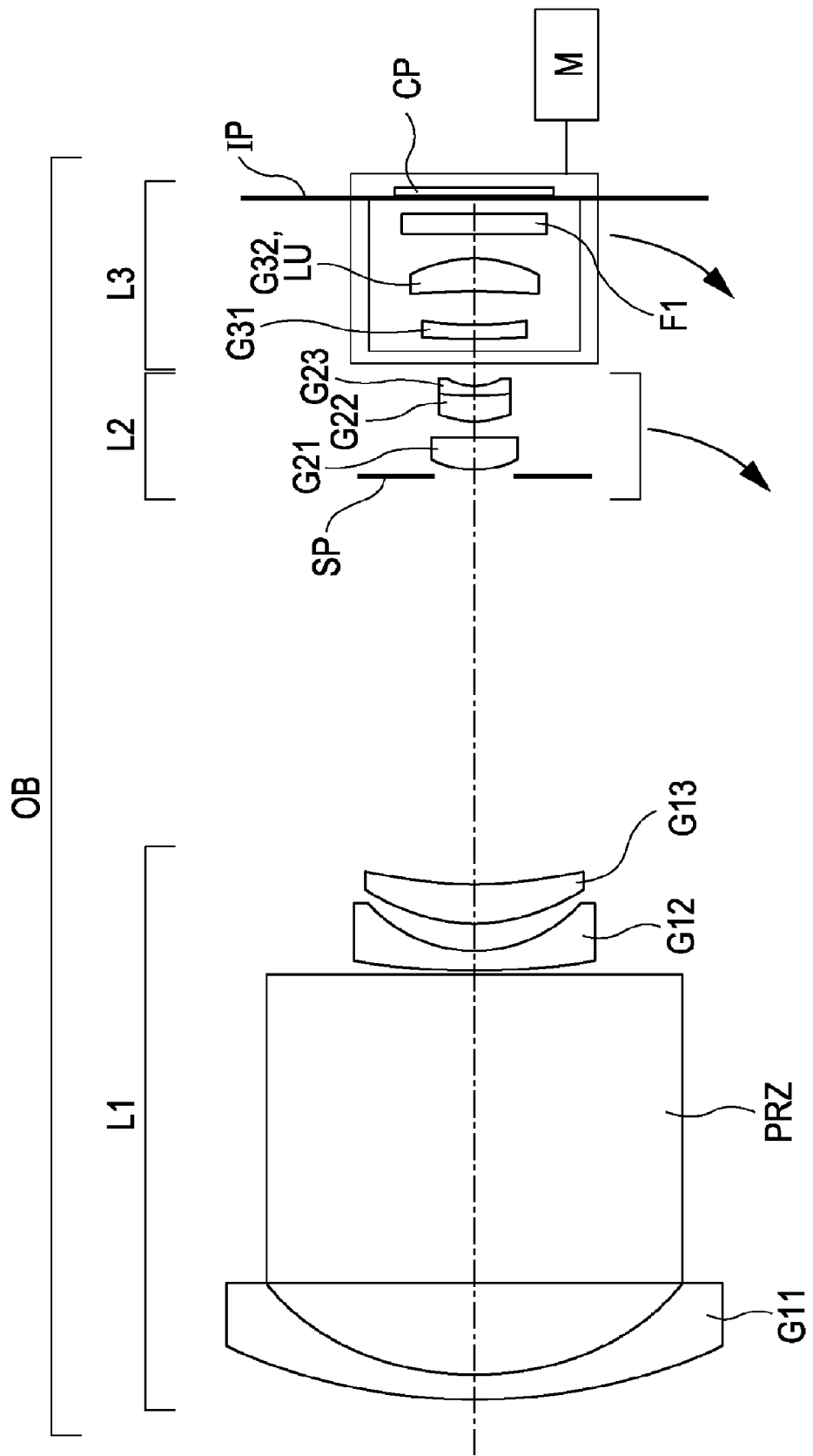

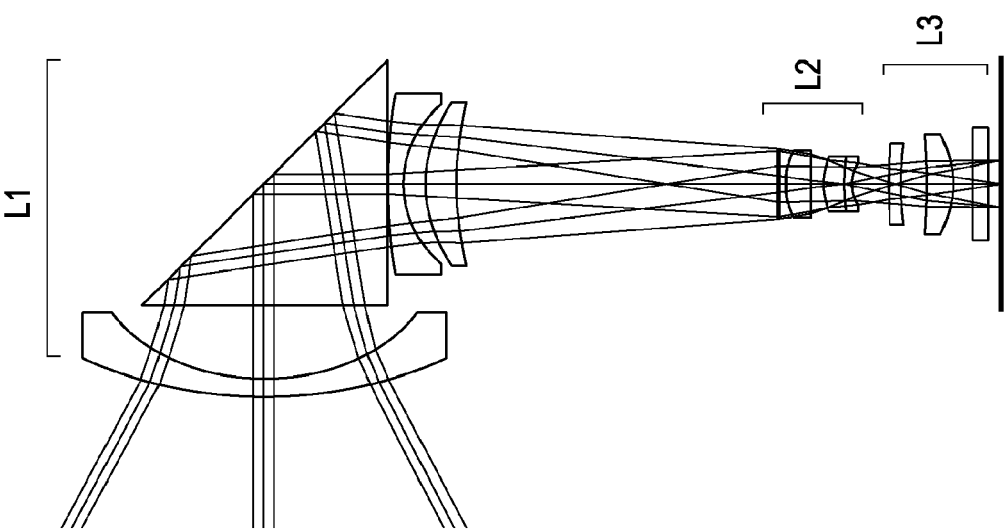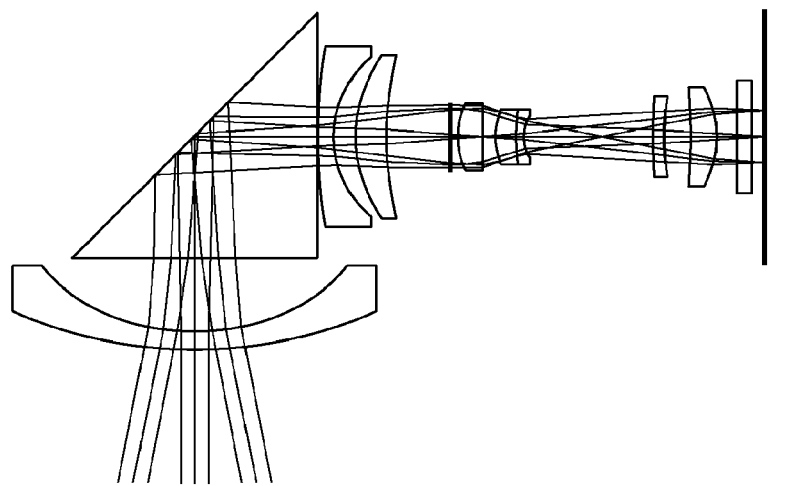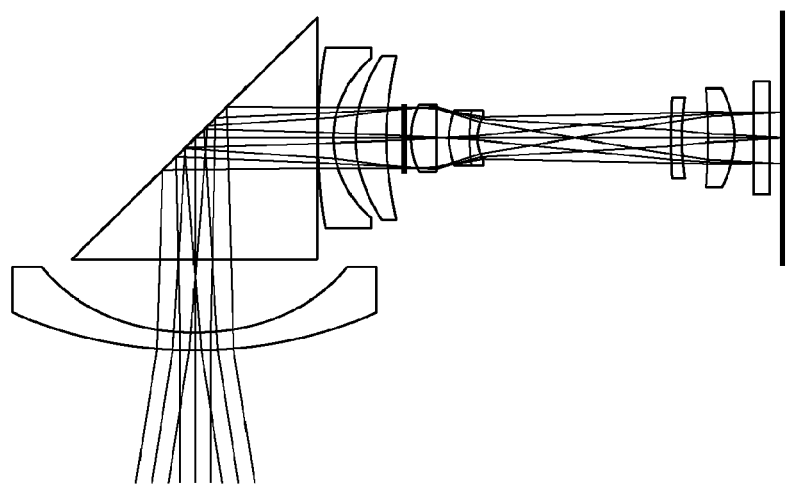

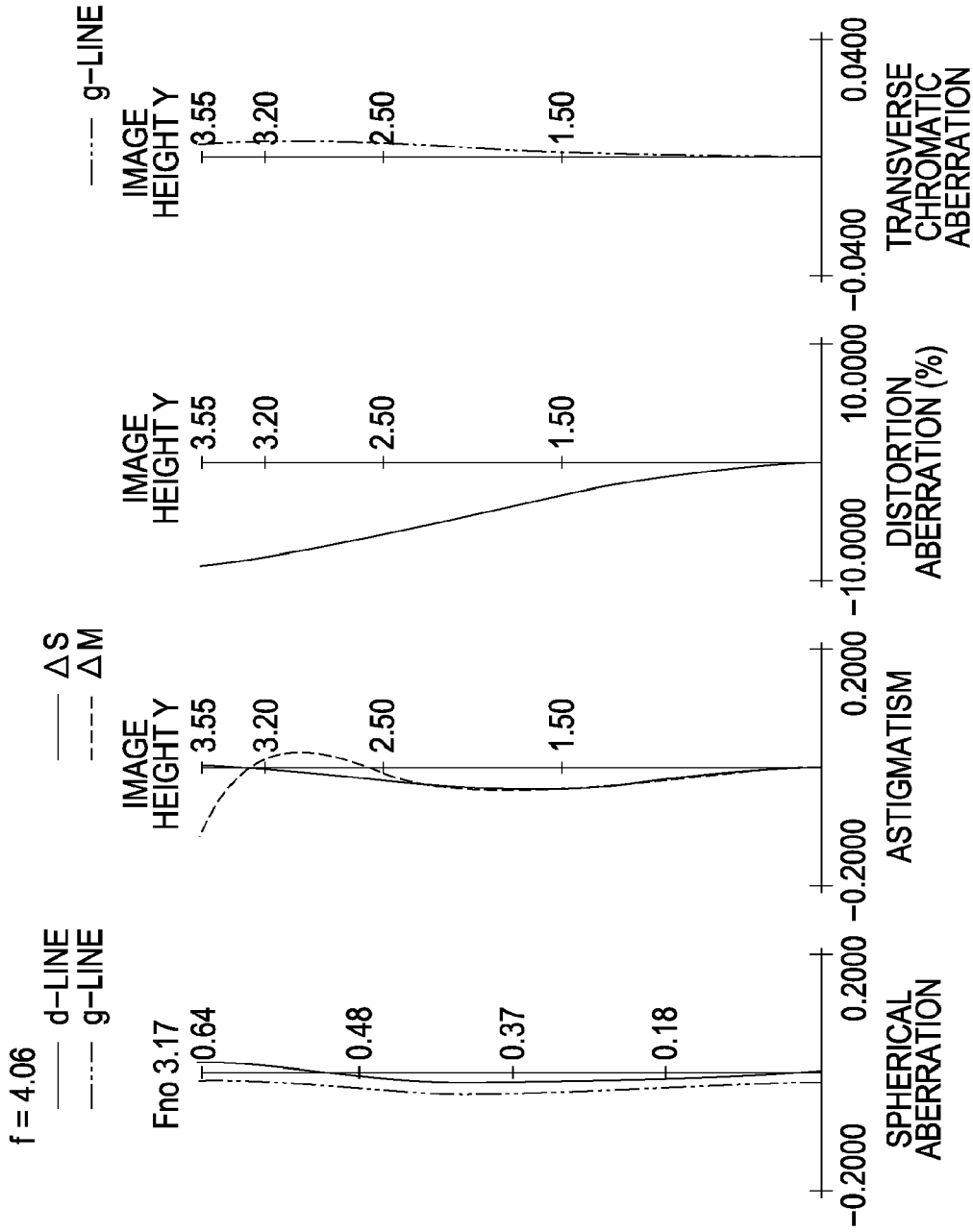

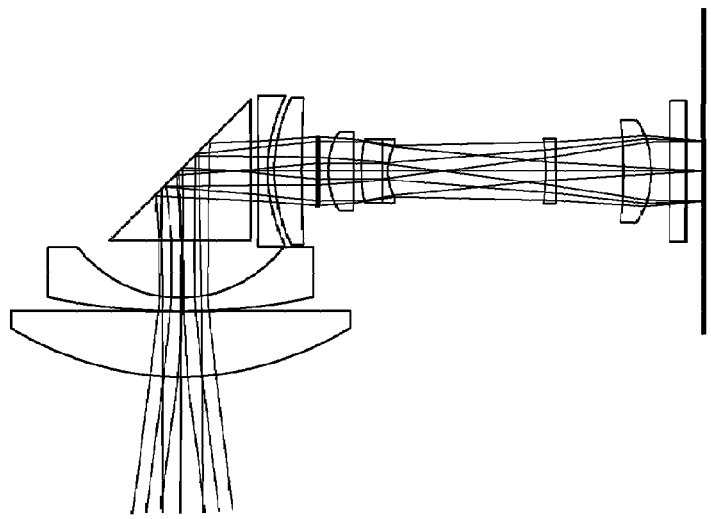
FIG.12C TELEPHOTO END
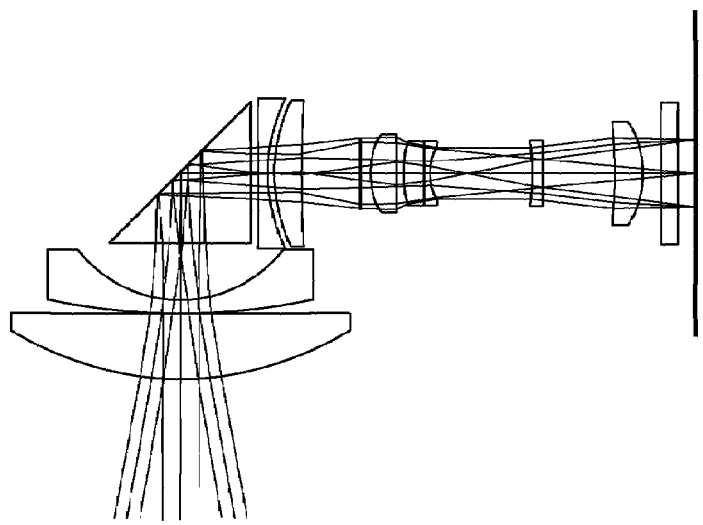
FIG.12B INTERMEDIATE
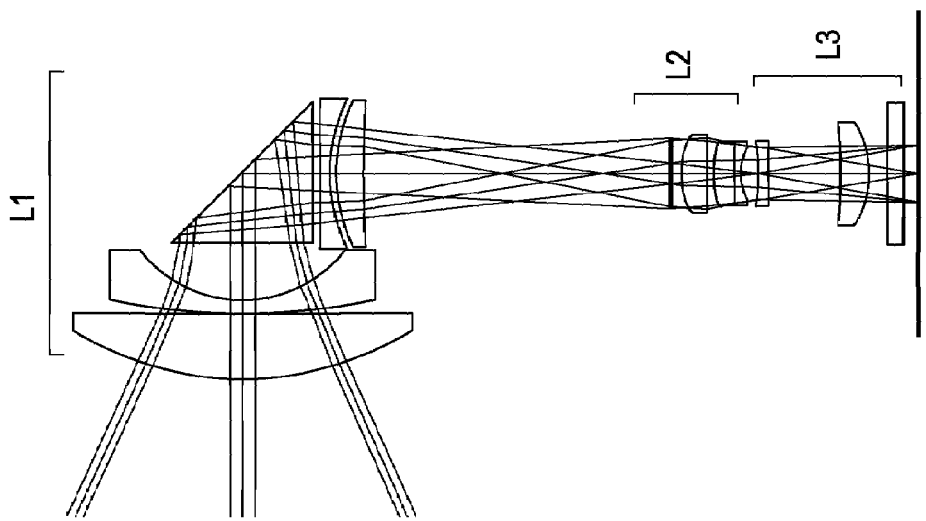
FIG.12A WIDE-ANGLE END

TELEPHOTO END

INTERMEDIATE

WIDE-ANGLE END

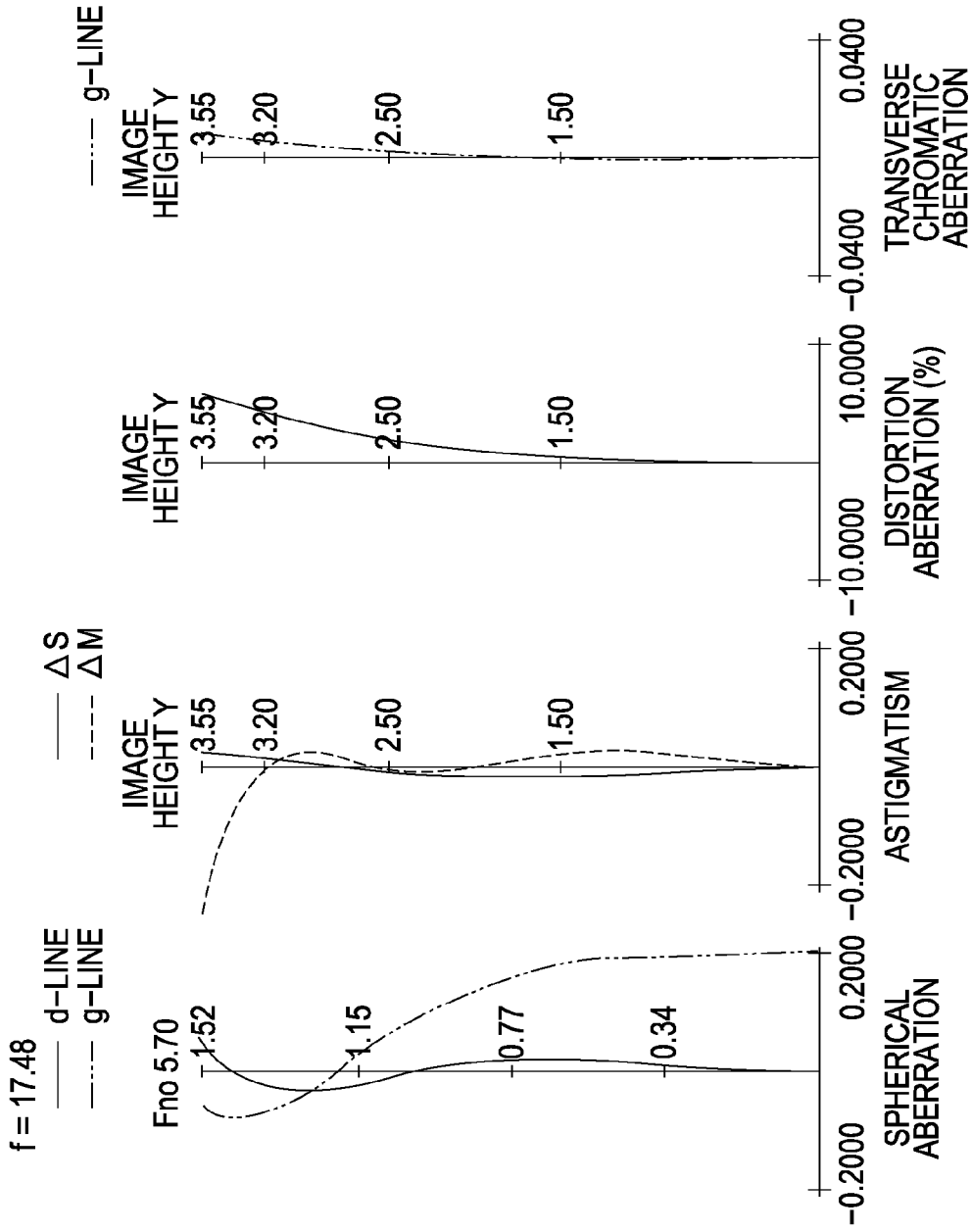

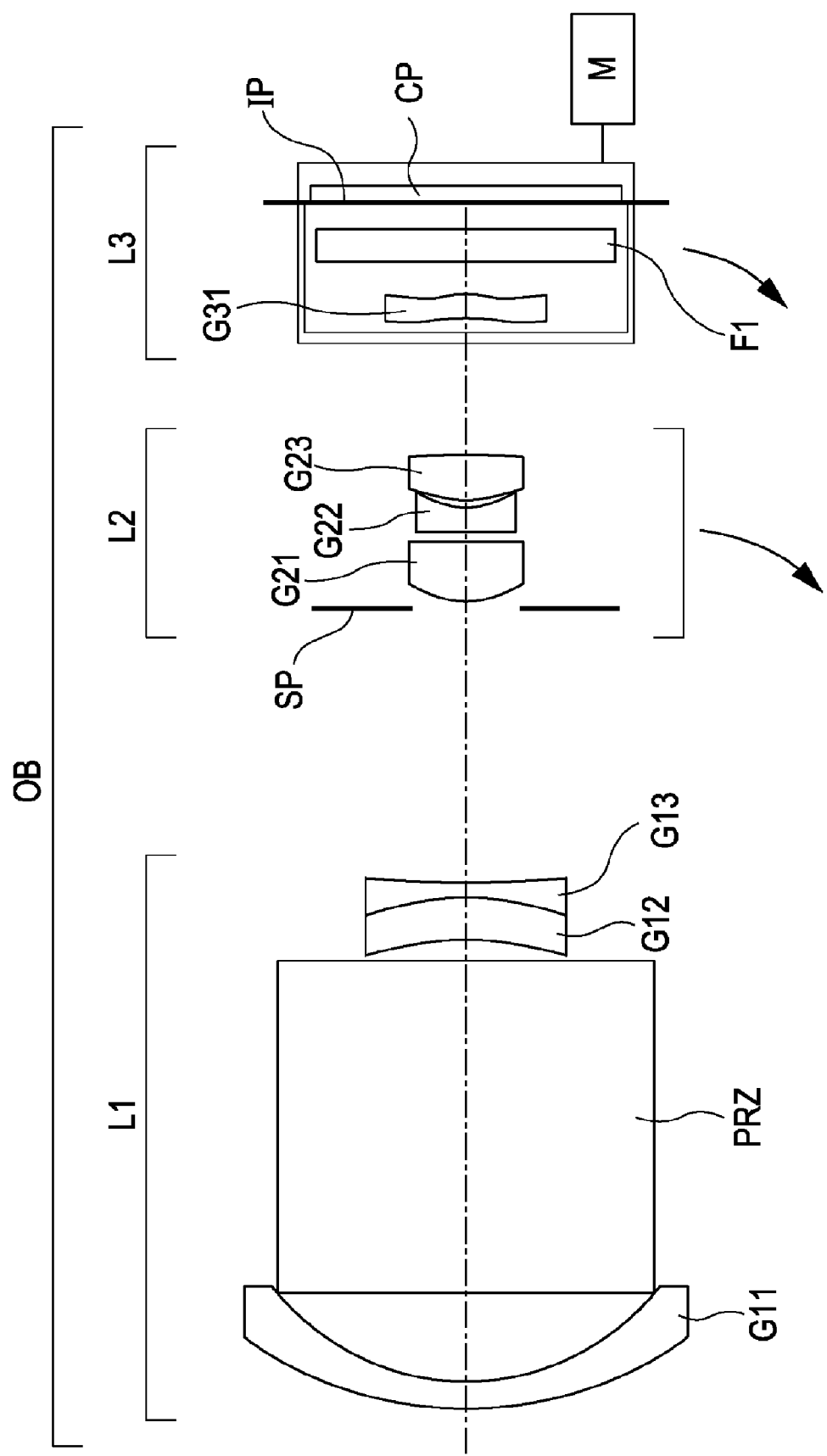

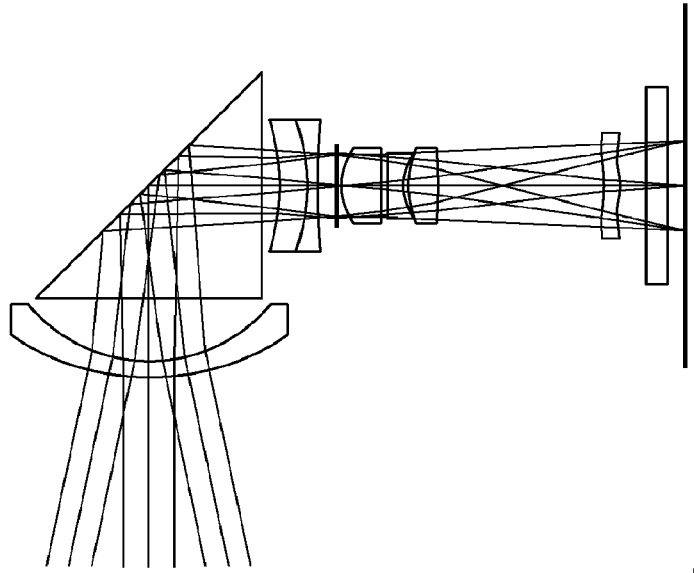
FIG.22C TELEPHOTO END
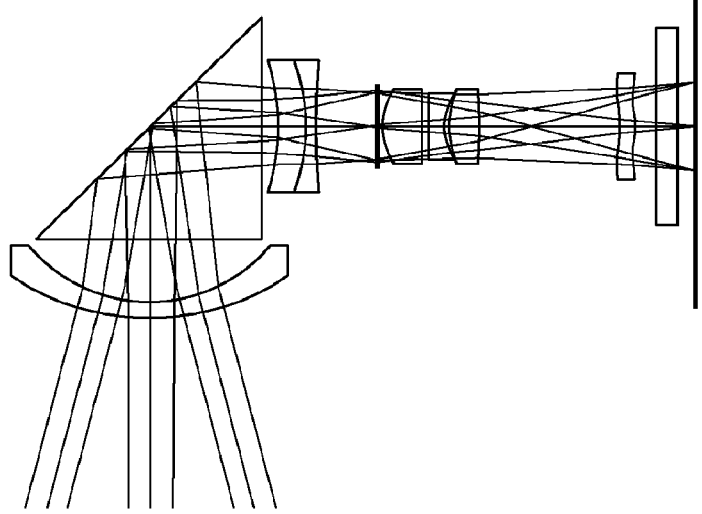
FIG.22B INTERMEDIATE
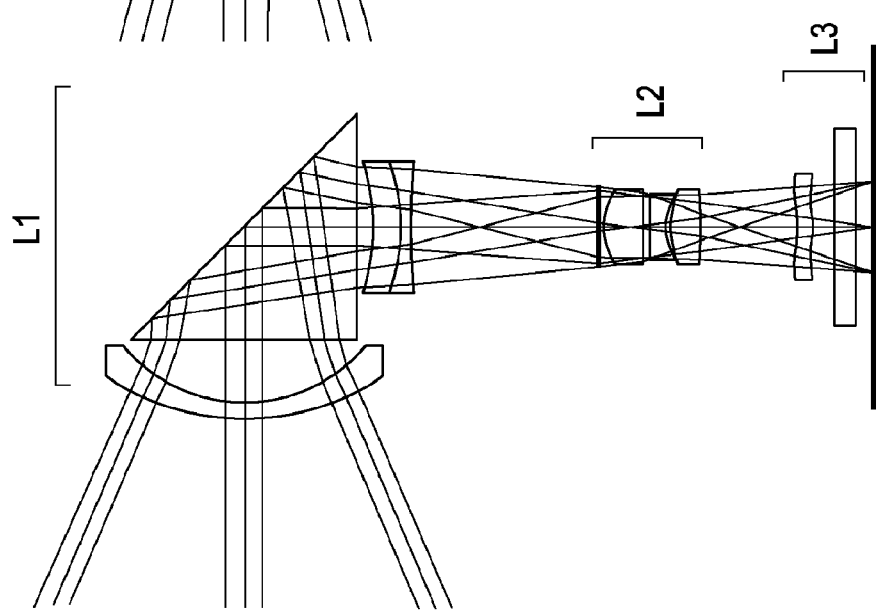
FIG.22A WIDE-ANGLE END

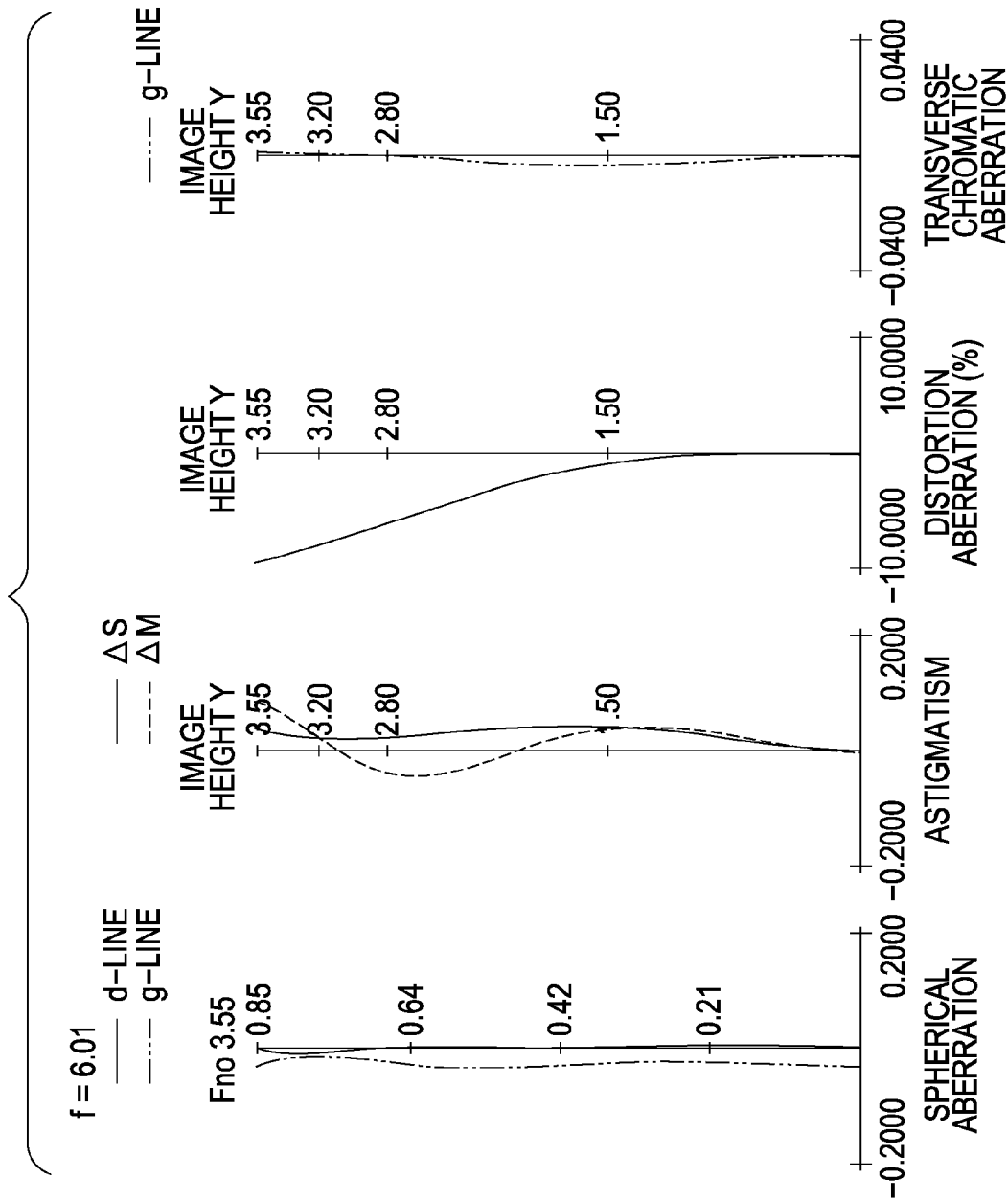

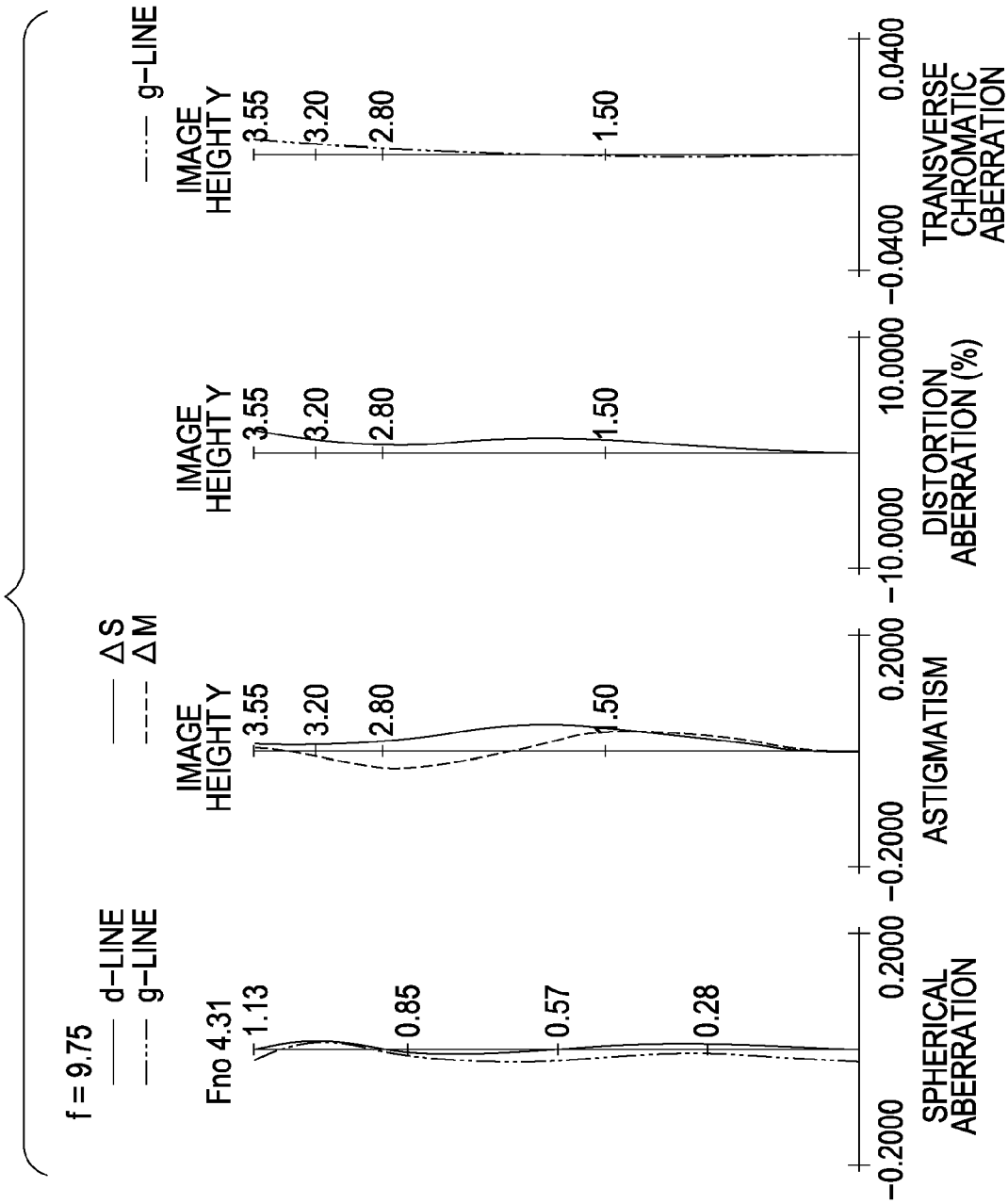

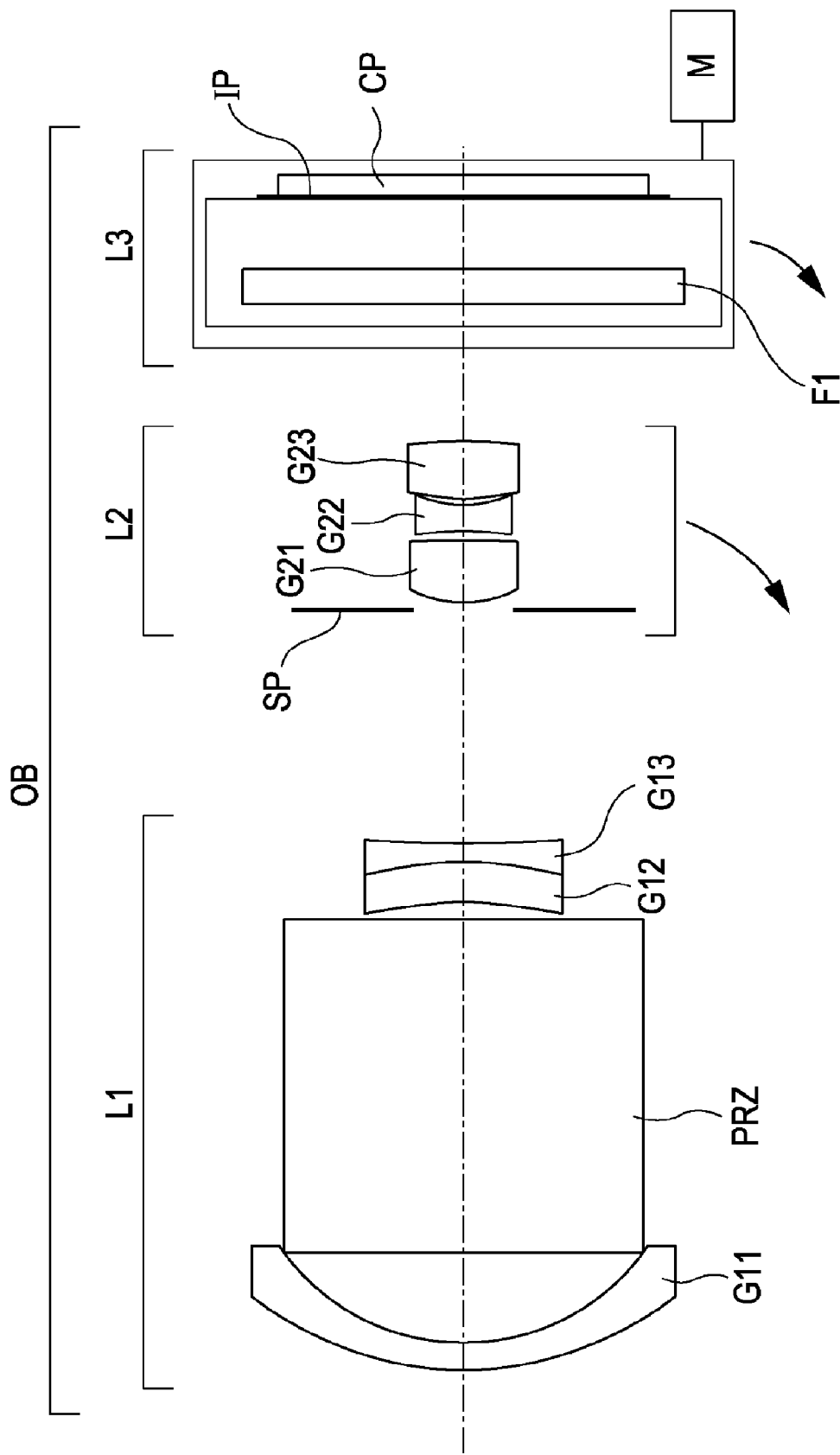

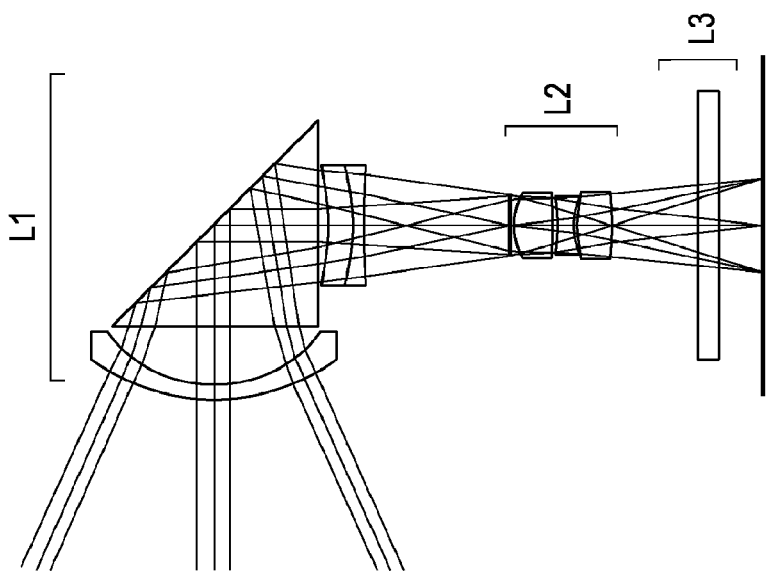
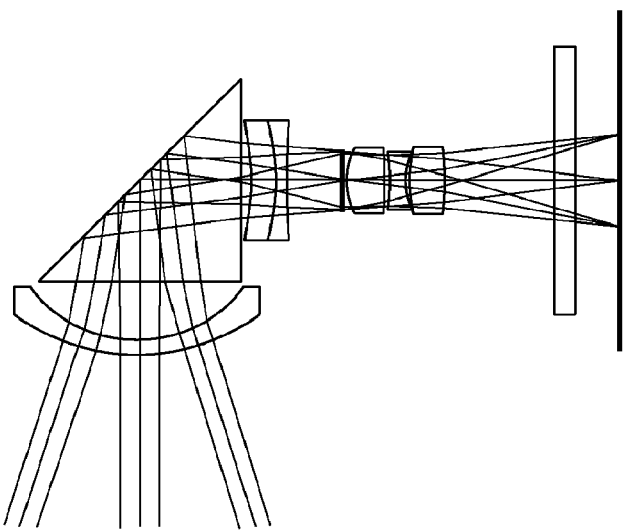
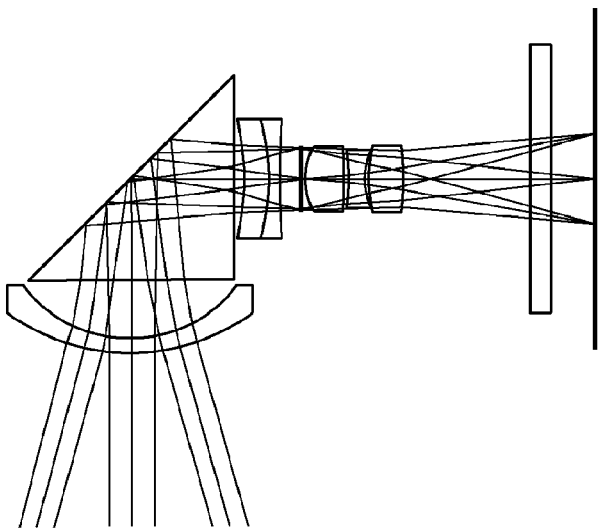
FIG.27A WIDE-ANGLE END
FIG.27B INTERMEDIATE
FIG.27C TELEPHOTO END

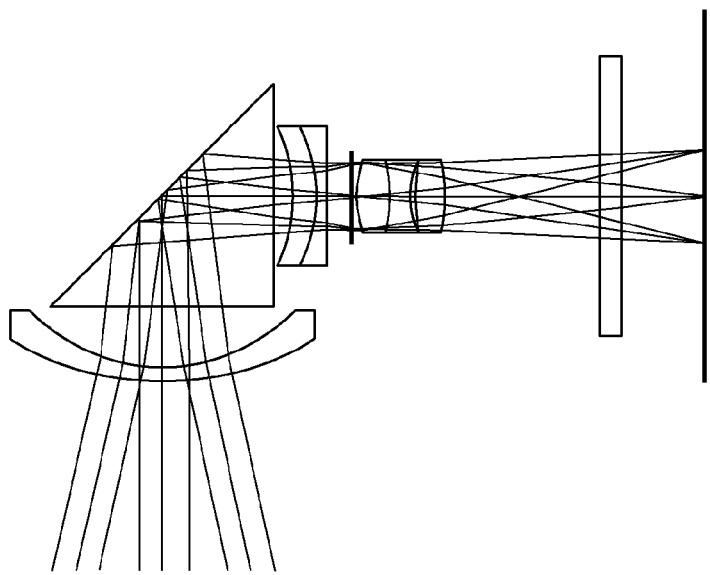
FIG.32C TELEPHOTO END
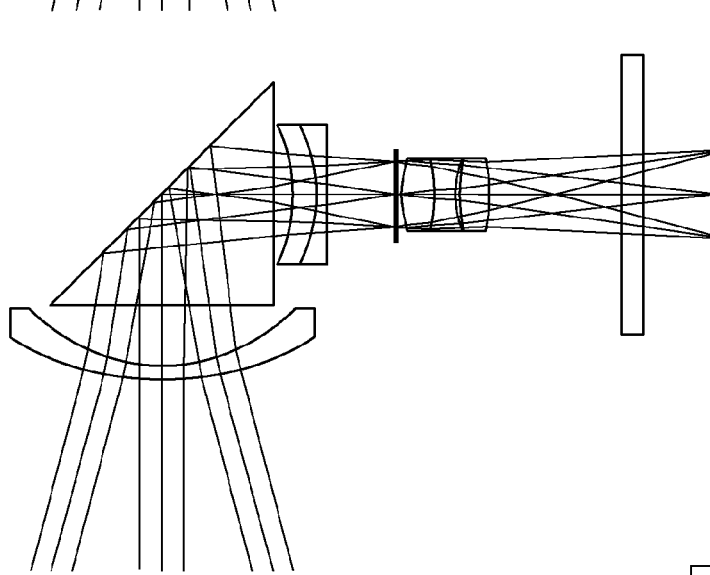
FIG.32B INTERMEDIATE
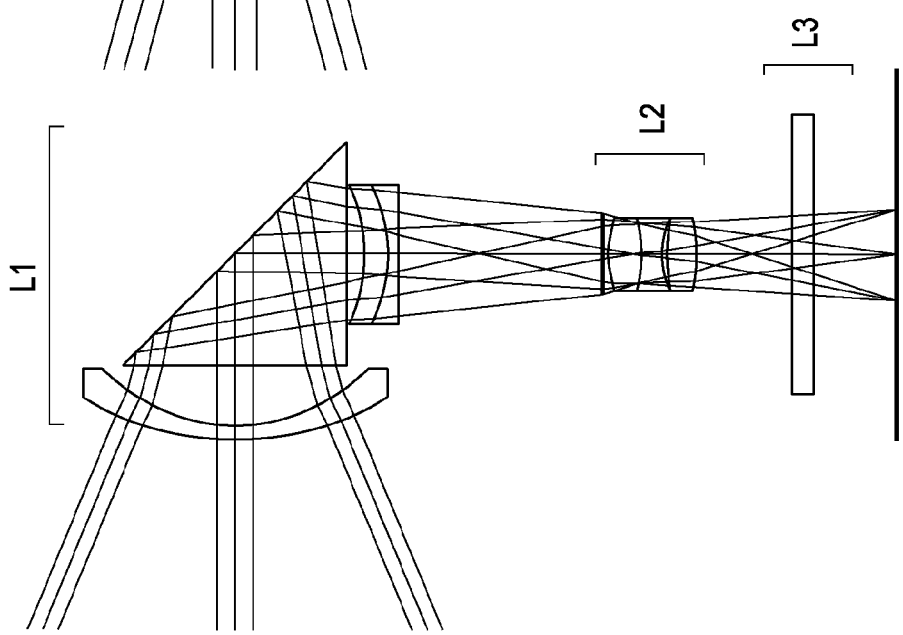
FIG.32A WIDE-ANGLE END

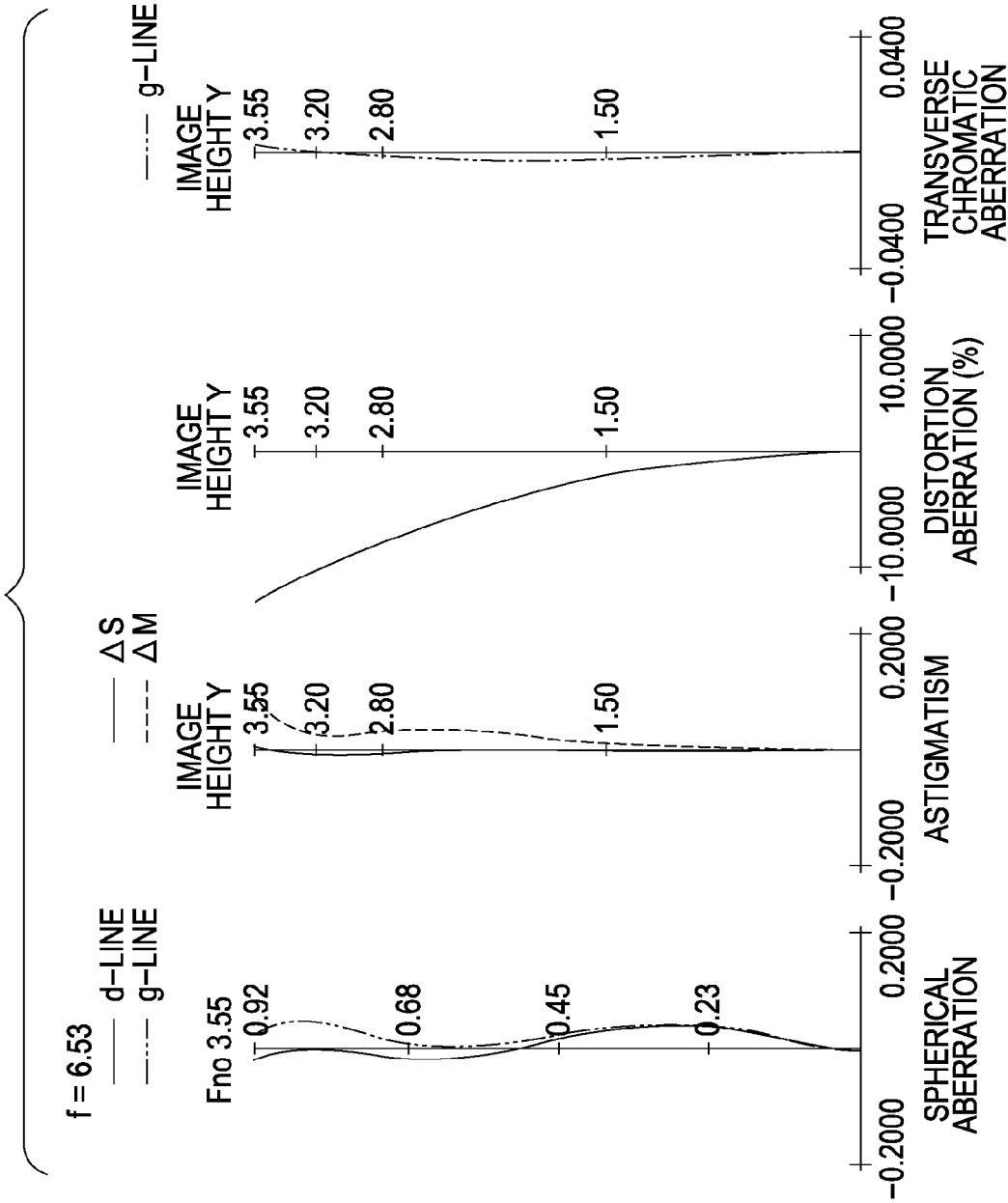

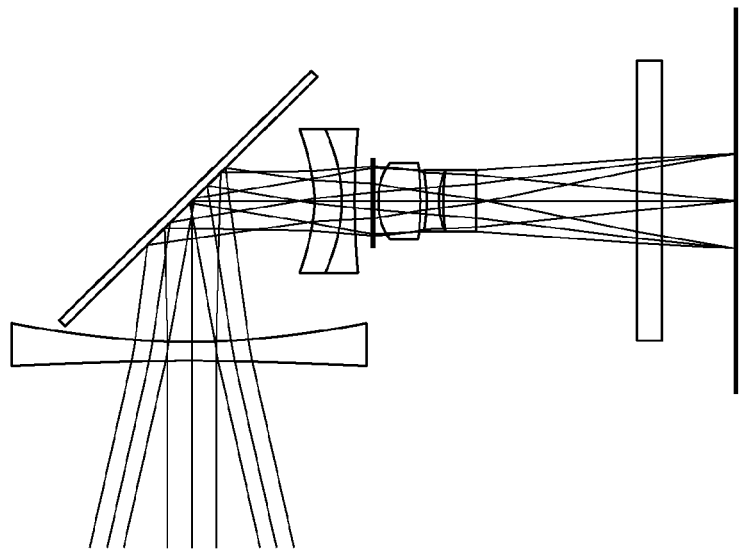
FIG.37C TELEPHOTO END
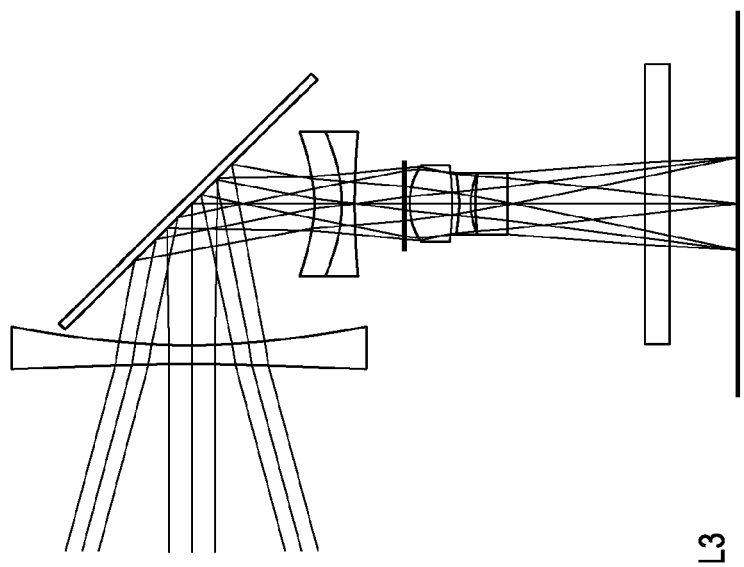
FIG.37B INTERMEDIATE
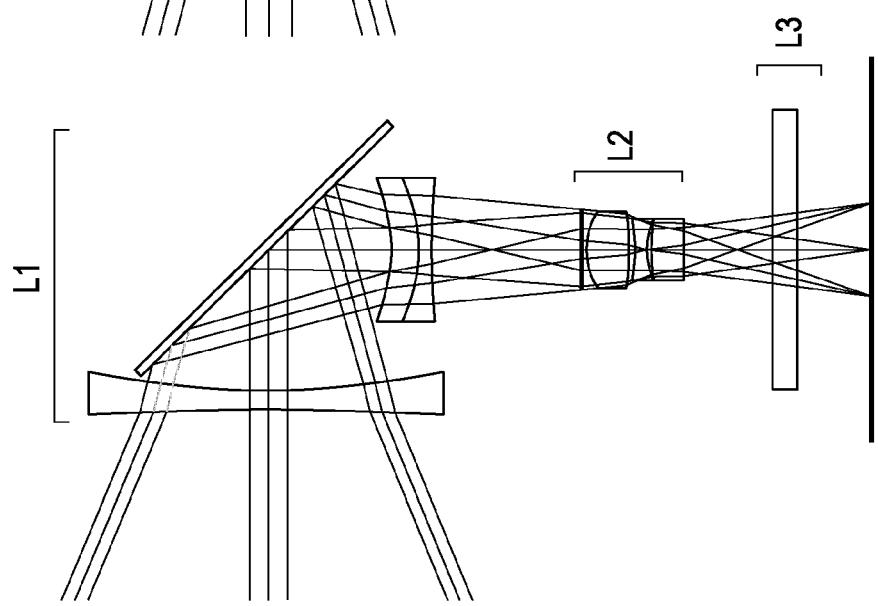
FIG.37A WIDE-ANGLE END

NO-OFFSET STATE

INCLINED STATE OF IMAGE PICKUP SURFACE

INCLINED STATE OF POSITIVE LENS AND IMAGE PICKUP SURFACE

IMAGING APPARATUS

BACKGROUND OF THE INVENTION

1. Field of the Invention

The present invention relates to an imaging apparatus, such as a digital camera and a video camera, using an image pickup element.

2. Description of the Related Art

In the field of an imaging apparatus, such as a digital camera and a video camera, using an image pickup element to form an image, there has recently been a demand for obtaining a more compact camera with a smaller overall size and forming an image with higher quality.

In an imaging apparatus such as a digital camera, for example, a more compact camera having a smaller thickness (being thinner or slimmer) is demanded with importance paid to portability when the camera is carried by a photographer.

There is known a zoom lens barrel employing a retractable structure, which can efficiently contain a zoom lens, for the purpose of further slimming the camera.

On the other hand, a variable-magnification imaging apparatus is proposed in which an image pickup element is moved following to a focus position that is varied during zooming, in order to realize a simpler and more compact mechanism for a zoom lens (see U.S. Pat. No. 5,587,739).

Also, a slim camera (imaging apparatus) is known in which an optical thickness in the direction toward an object (i.e., in the back-and-forth direction) is reduced by using a folded optical system that includes a reflective member to deflect (fold) an optical axis at substantially 90° (see Japanese Patent Laid-Open No. 2004-37967 and U.S. Pat. No. 6,771,432).

Further, a zoom lens is proposed in which an image pickup element is moved in a folded zoom optical system in accordance with the position of an image plane during zooming, to thereby reduce an overall size of the optical system (see Japanese Patent Laid-Open No. 2005-84151 and No. 2006-106071).

In the zoom lens, conditions for moving various optical units including the image pickup element are required to be properly set in order to compensate for a variation of the image plane position caused with zooming while simplifying a mechanism for moving an optical unit which is moved during zooming.

Also, in the folded-type slimmer zoom lens in which the reflective member is disposed in the light path of the optical system to fold the optical axis for reducing the thickness of the imaging apparatus in the back-and-forth direction, the number of required moving mechanisms is increased and the moving mechanisms become complicated and large in size when the image pickup element is moved independently of another optical unit (which includes a lens unit or includes only an optical member having no refractive power).

Further, from the viewpoint of maintaining high optical performance while reducing the thickness of the imaging apparatus in the back-and-forth direction, it is desired to provide the reflective member for folding the optical axis at an appropriate position in the light path of the optical system and to properly set selection of the optical units which are moved during the zooming.

SUMMARY OF THE INVENTION

The present invention is directed to an imaging apparatus. According to an aspect of the present invention, an imaging apparatus configured to form an image on an image pickup element, includes, in an order from an object side toward an image side, a first optical unit having a negative refractive power, a second optical unit having a positive refractive power, and a third optical unit including the image pickup element. The first optical unit does not move during zooming, the second optical unit moves toward the object side during zooming from a wide-end angle to a telephoto end, and the third optical unit moves during zooming.

Further features of the present invention will become apparent from the following description of exemplary embodiments with reference to the attached drawings.

BRIEF DESCRIPTION OF THE DRAWINGS

FIG. 1 is an optical sectional view of a zoom lens in a first exemplary embodiment of the present invention.

FIGS. 2A, 2B and 2C each illustrate a light path of the zoom lens in the first exemplary embodiment when the light path is folded at 90 degrees.

FIG. 6 is an optical sectional view of a zoom lens in a second exemplary embodiment of the present invention.

FIGS. 7A, 7B and 7C each illustrate a light path of the zoom lens in the second exemplary embodiment when the light path is folded at 90 degrees.

FIG. 8 illustrates various aberrations at a wide-angle end of the zoom lens in the second exemplary embodiment.

FIGS. 12A, 12B and 12C each illustrate a light path of the zoom lens in the third exemplary embodiment when the light path is folded at 90 degrees.

FIG. 20 illustrates various aberrations at a telephoto end of the zoom lens in the fourth exemplary embodiment.

FIG. 21 is an optical sectional view of a zoom lens in a fifth exemplary embodiment of the present invention.

FIGS. 22A, 22B and 22C each illustrate a light path of the zoom lens in the fifth exemplary embodiment when the light path is folded at 90 degrees.

FIG. 23 illustrates various aberrations at a wide-angle end of the zoom lens in the fifth exemplary embodiment.

FIG. 24 illustrates various aberrations at an intermediate zooming position of the zoom lens in the fifth exemplary embodiment.

FIG. 26 is an optical sectional view of a zoom lens in a sixth exemplary embodiment of the present invention.

FIGS. 27A, 27B and 27C each illustrate a light path of the zoom lens in the sixth exemplary embodiment when the light path is folded at 90 degrees.

FIGS. 32A, 32B and 32C each illustrate a light path of the zoom lens in the seventh exemplary embodiment when the light path is folded at 90 degrees.

FIG. 33 illustrates various aberrations at a wide-angle end of the zoom lens in the seventh exemplary embodiment.

FIGS. 37A, 37B and 37C each illustrate a light path of the zoom lens in the eighth exemplary embodiment when the light path is folded at 90 degrees.

DESCRIPTION OF THE EMBODIMENTS

Each of the following exemplary embodiments provides an imaging apparatus in which the overall size of an optical system can be easily reduced while simplifying a mechanism for moving optical units during zooming. Also, each of the following exemplary embodiments provides an imaging apparatus which can simplify the moving mechanism while reducing a thickness in the back-and-forth direction. Detailed arrangements of the imaging apparatuses according to the exemplary embodiments will be described below.

FIG. 1 is an optical sectional view of a zoom lens used in the imaging apparatus according to a first exemplary embodiment of the present invention at a wide-angle end when a light path of the zoom lens is shown in the developed form, and FIGS. 2A, 2B and 2C each illustrate a light path of the zoom lens when the light path is folded by a reflective member.

Figure 3:
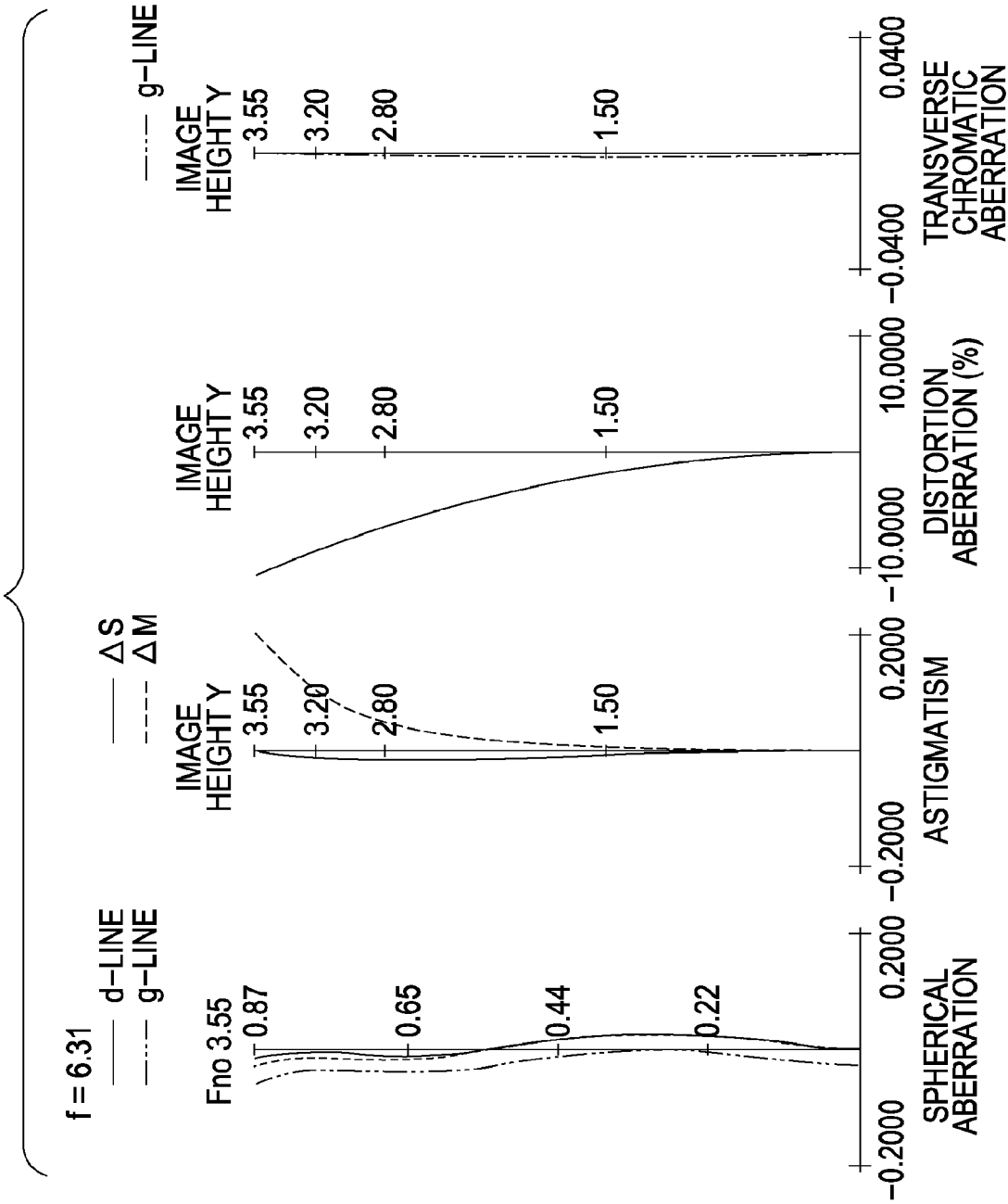
FIG. 3 illustrates various aberrations at a wide-angle end of the zoom lens in the first exemplary embodiment.
Figure 4:
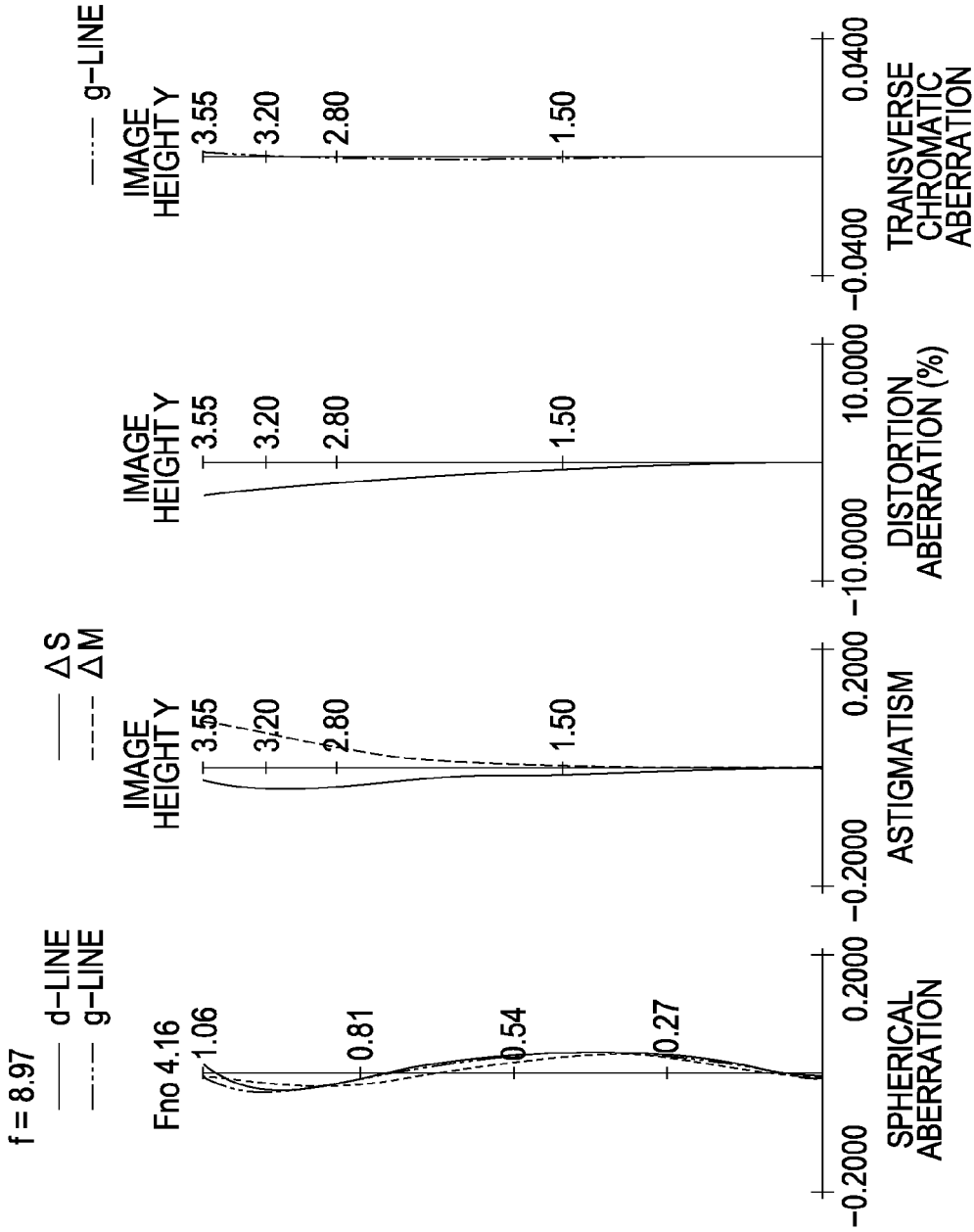
FIG. 4 illustrates various aberrations at an intermediate zooming position of the zoom lens in the first exemplary embodiment.
Figure 5:
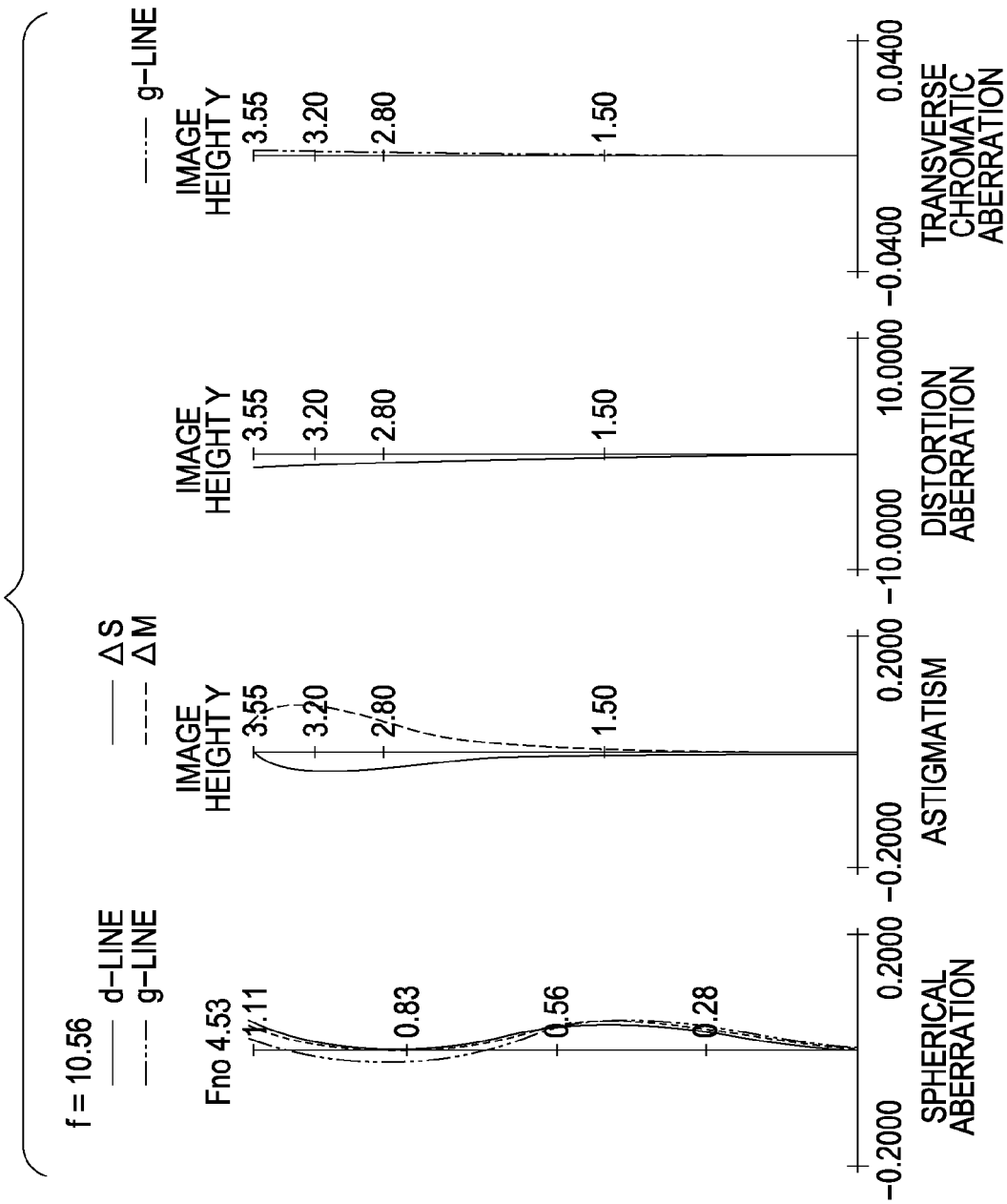
FIG. 5 illustrates various aberrations at a telephoto end of the zoom lens in the first exemplary embodiment.

FIGS. 3, 4 and 5 illustrate various aberrations of the zoom lens at a wide-angle end (shorter focal length end), an intermediate zooming position, and a telephoto end (longer focal length end), respectively, which is used in the imaging apparatus according to the first exemplary embodiment.

Figure 9:
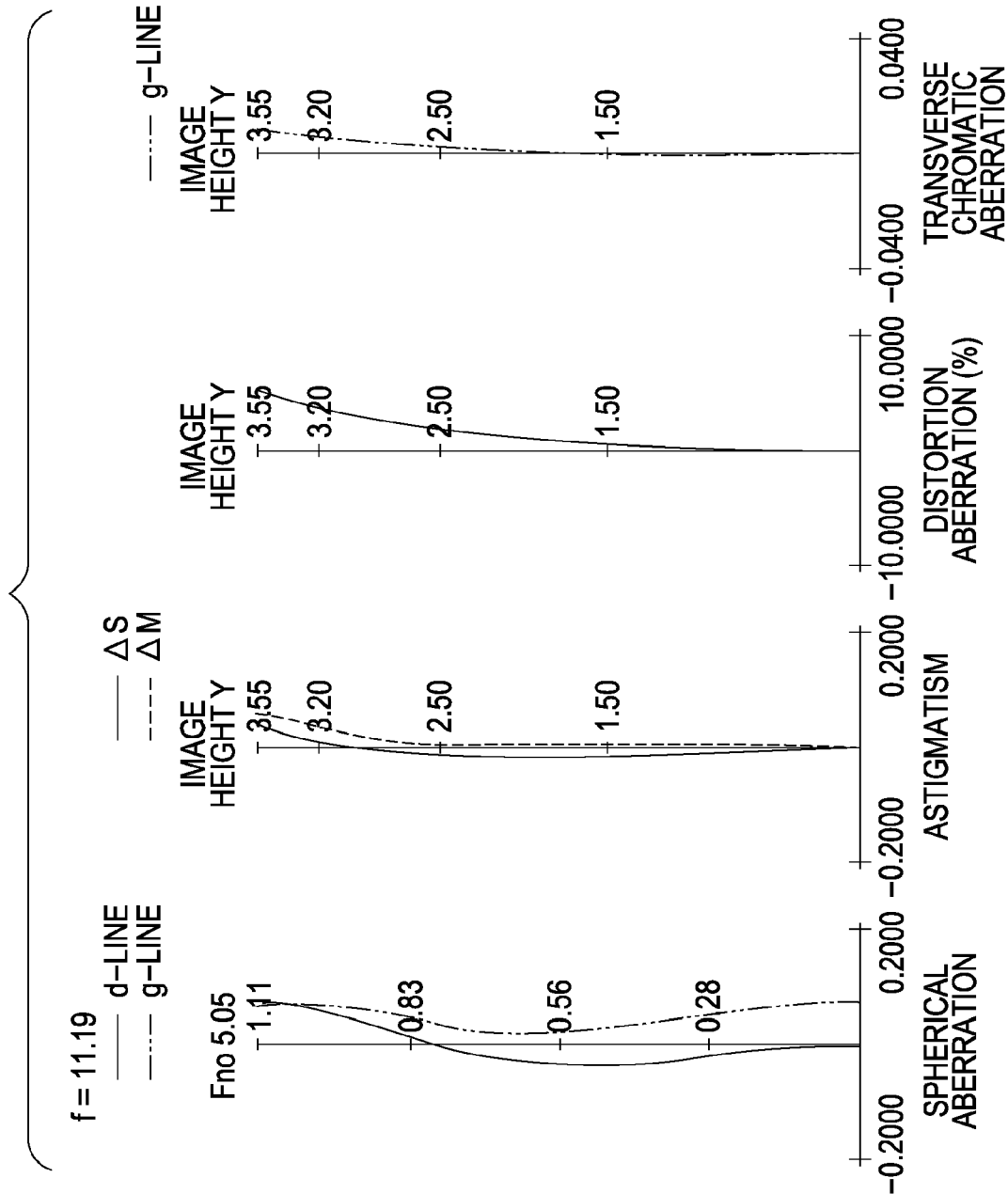
FIG. 9 illustrates various aberrations at an intermediate zooming position of the zoom lens in the second exemplary embodiment.
Figure 10:
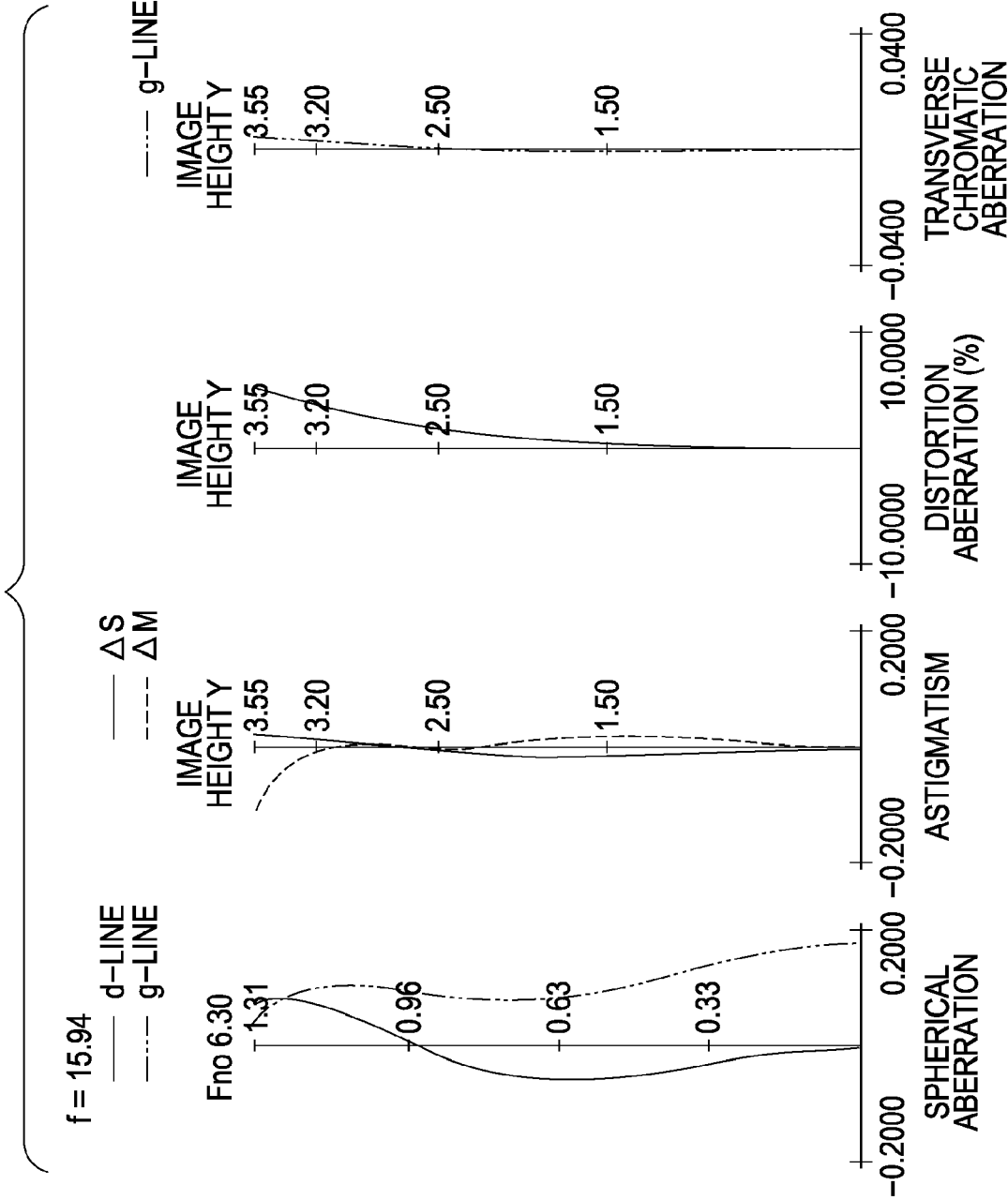
FIG. 10 illustrates various aberrations at a telephoto end of the zoom lens in the second exemplary embodiment.

FIG. 6 is a optical sectional view of a zoom lens used in the imaging apparatus according to a second exemplary embodiment of the present invention at a wide-angle end, and FIGS. 7A, 7B and 7C each illustrate a light path of the zoom lens when the light path is folded by a reflective member. FIGS. 8, 9 and 10 illustrate various aberrations of the zoom lens at a wide-angle end (shorter focal length end), an intermediate zooming position, and a telephoto end (longer focal length end), respectively, which is used in the imaging apparatus according to the second exemplary embodiment.

Figure 11:
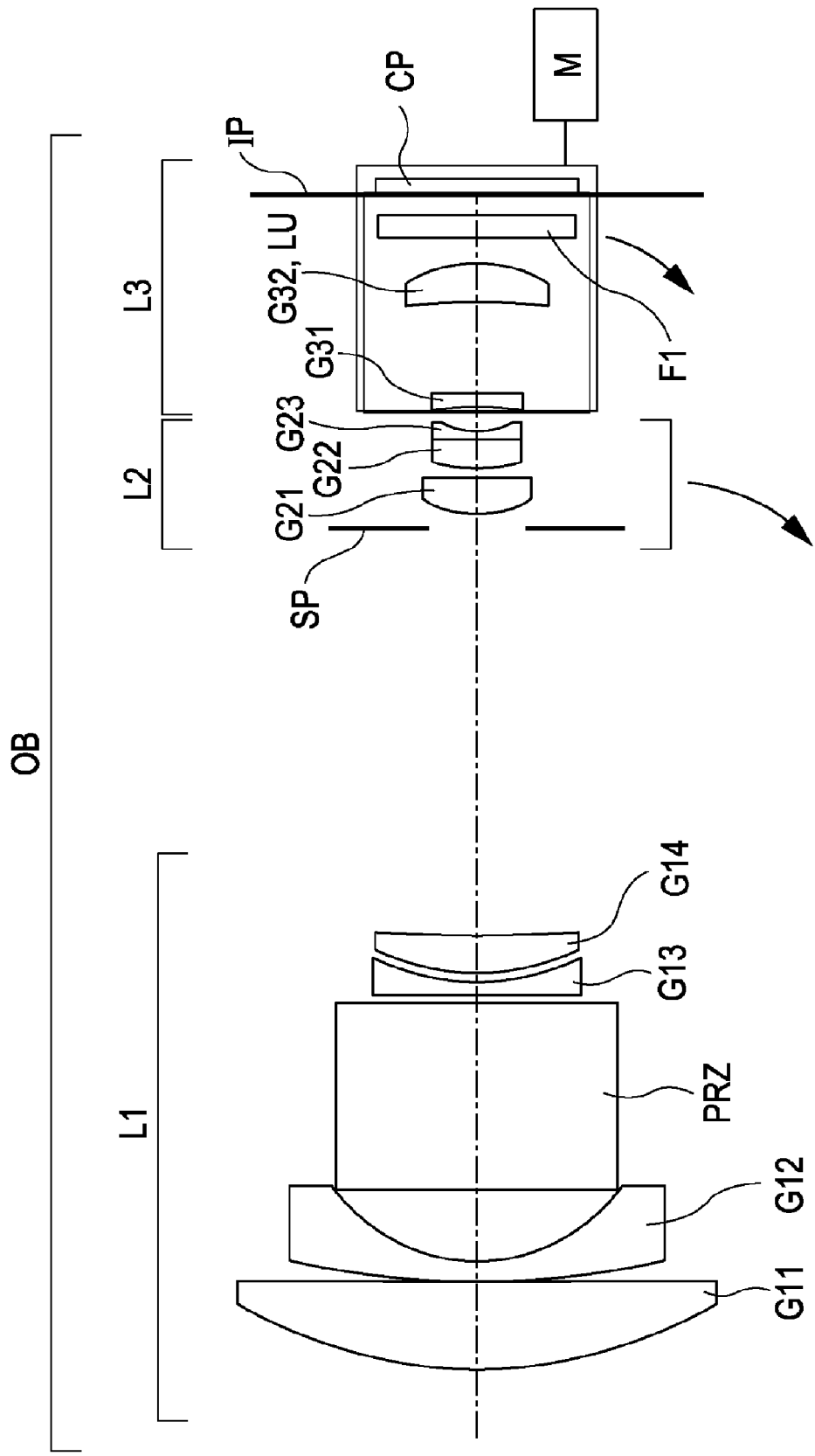
FIG. 11 is an optical sectional view of a zoom lens in a third exemplary embodiment of the present invention.
Figure 13:
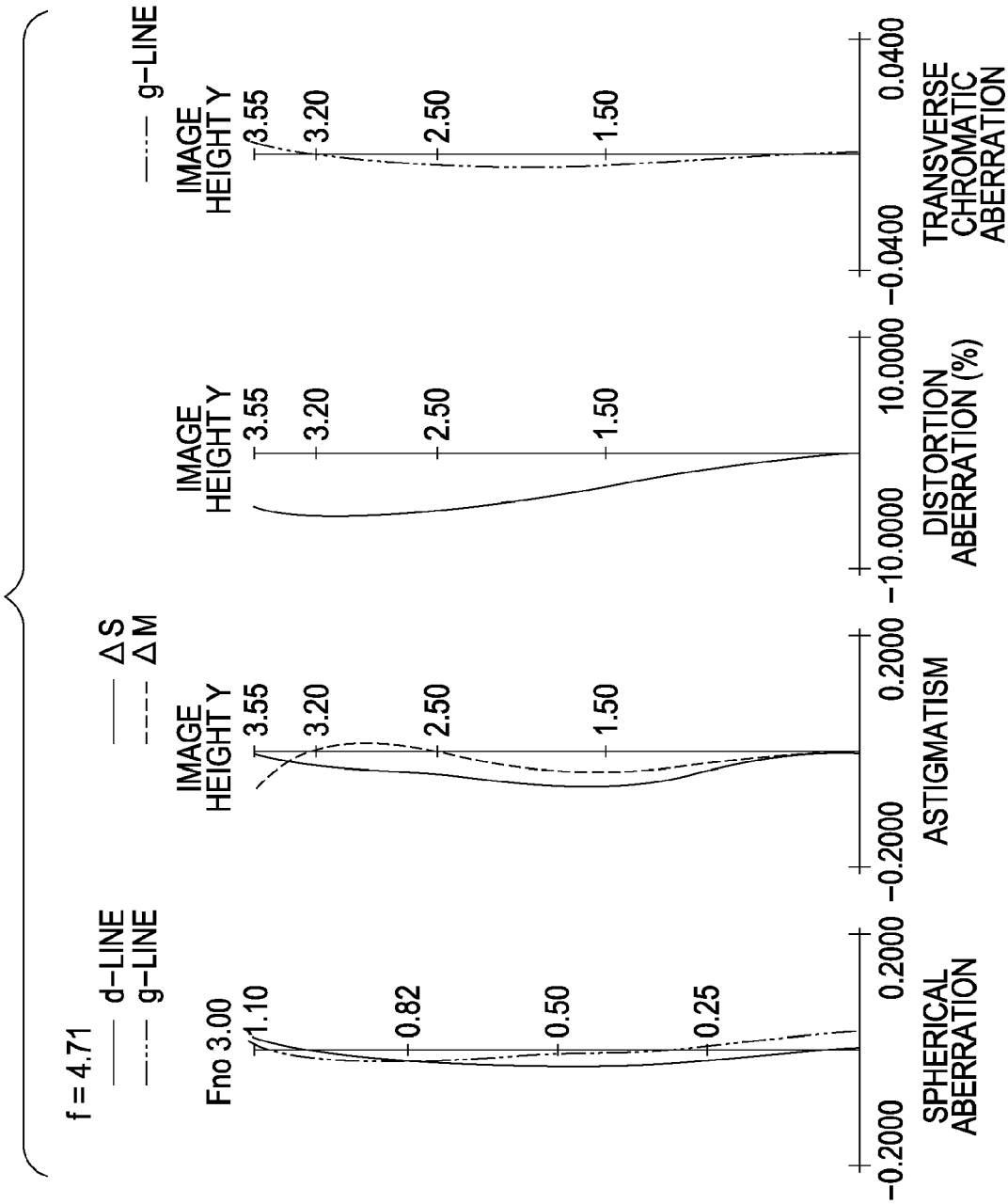
FIG. 13 illustrates various aberrations at a wide-angle end of the zoom lens in the third exemplary embodiment.
Figure 14:
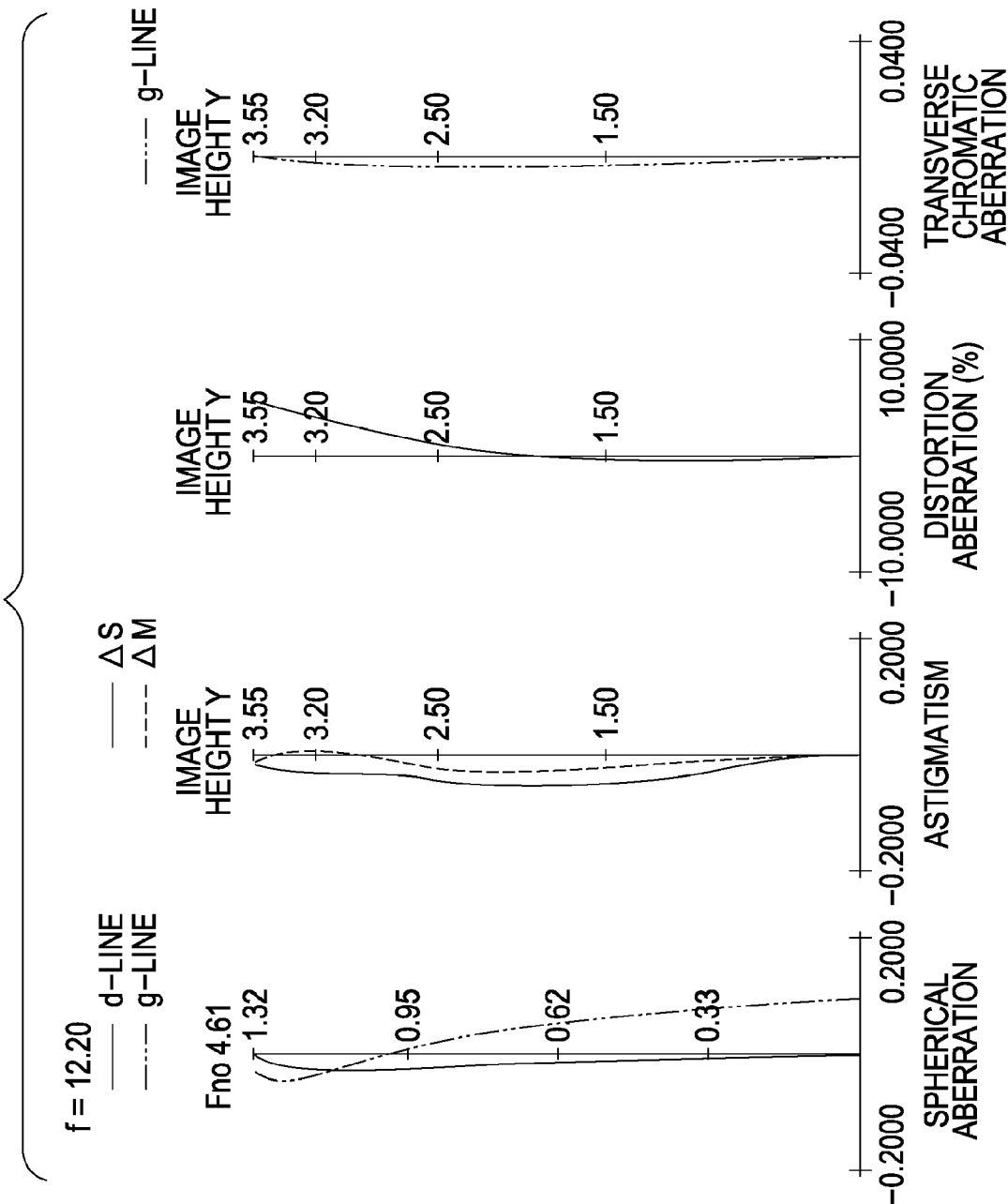
FIG. 14 illustrates various aberrations at an intermediate zooming position of the zoom lens in the third exemplary embodiment.
Figure 15:
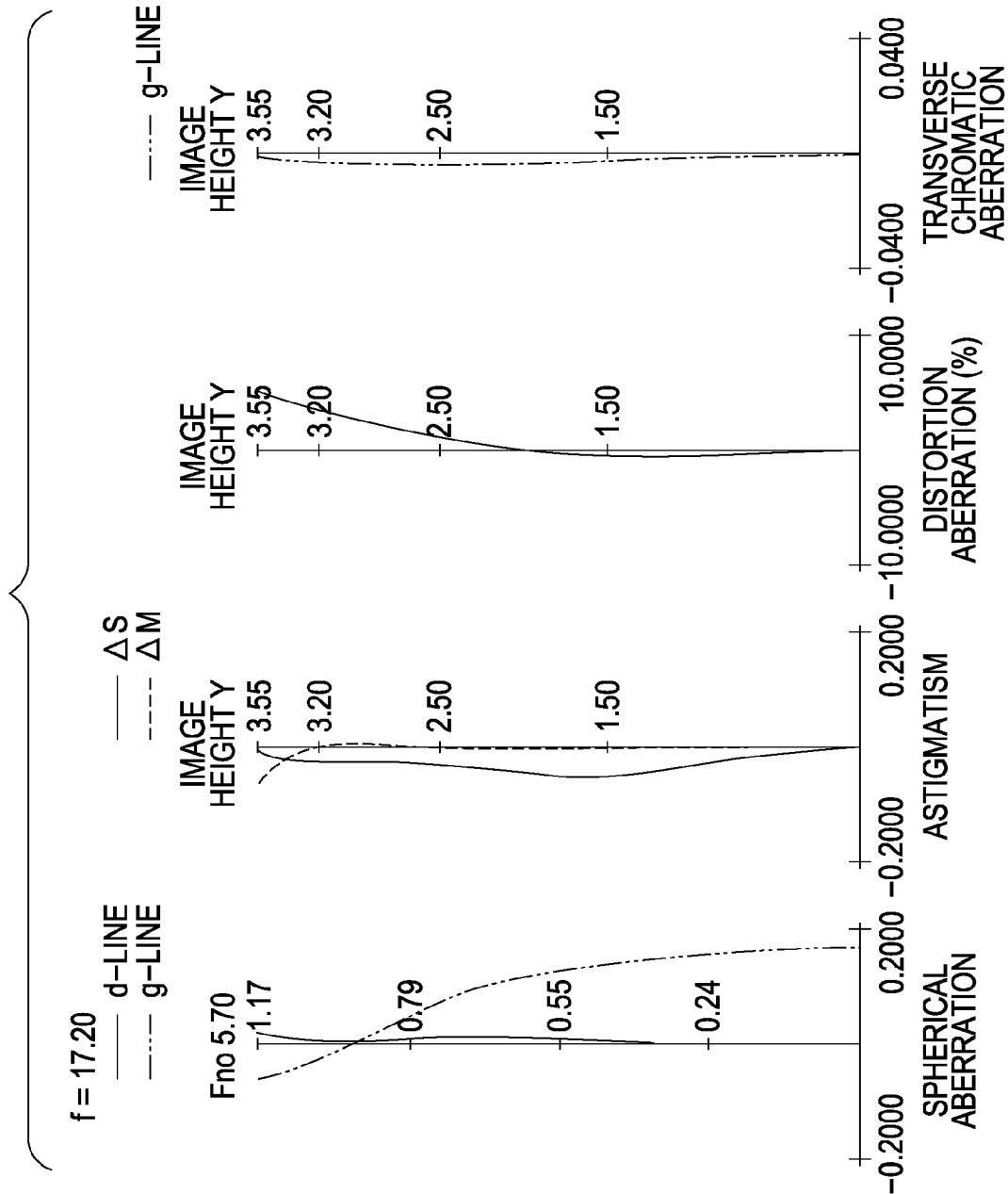
FIG. 15 illustrates various aberrations at a telephoto end of the zoom lens in the third exemplary embodiment.

FIG. 11 is a optical sectional view of a zoom lens used in the imaging apparatus according to a third exemplary embodiment of the present invention at a wide-angle end, and FIGS. 12A, 12B and 12C each illustrate a light path of the zoom lens when the light path is folded by a reflective member. FIGS. 13, 14 and 15 illustrate various aberrations of the zoom lens at a wide-angle end (shorter focal length end), an intermediate zooming position, and a telephoto end (longer focal length end), respectively, which is used in the imaging apparatus according to the third exemplary embodiment.

Figure 16:
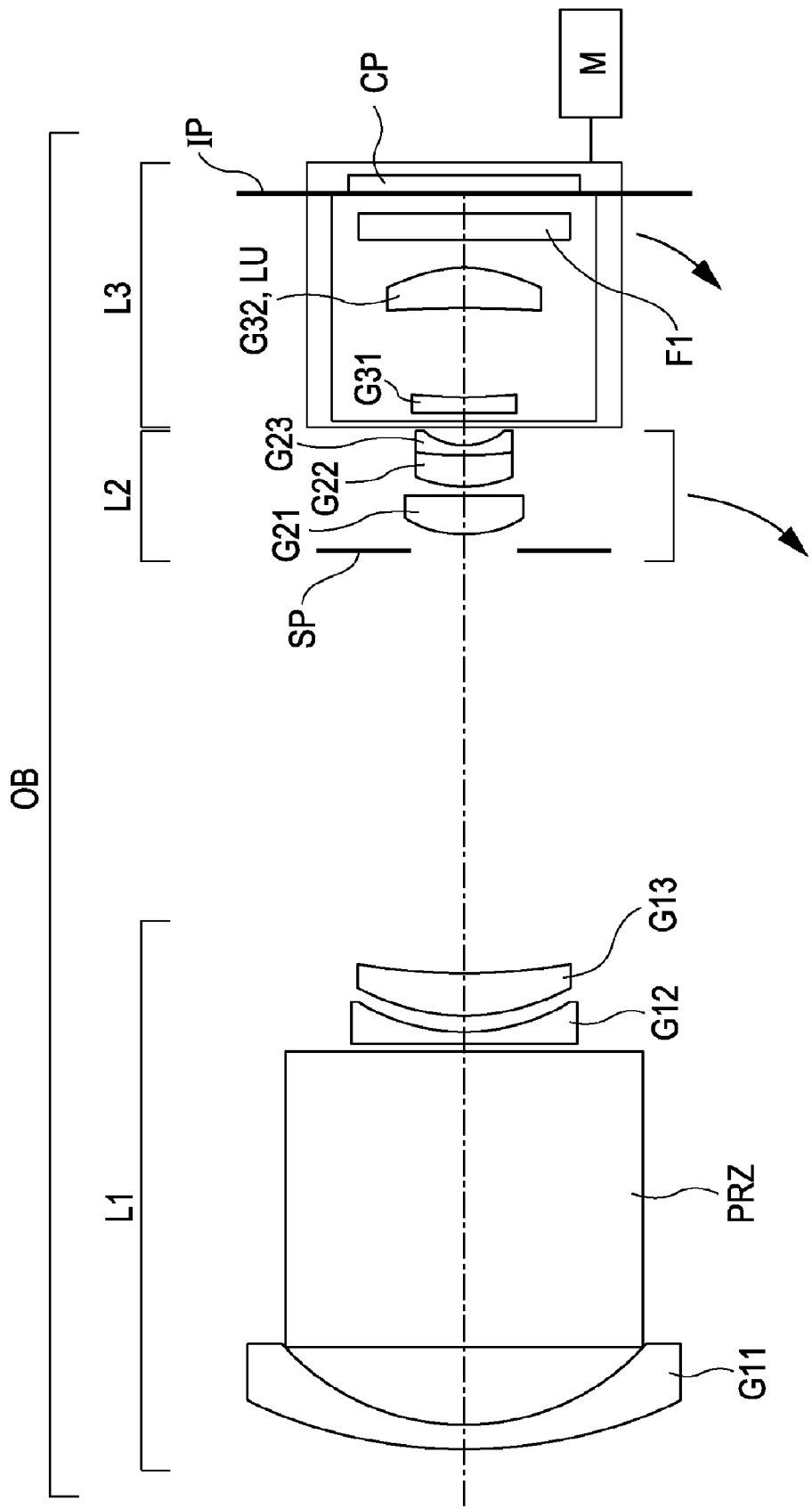
FIG. 16 is an optical sectional view of a zoom lens in a fourth exemplary embodiment of the present invention.
Figure 17C:
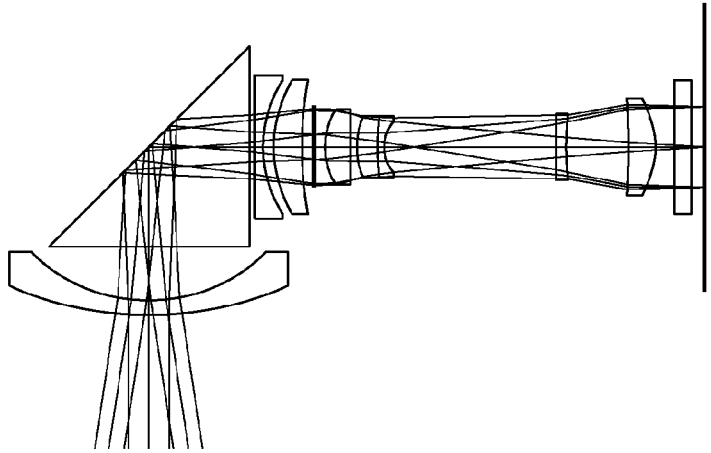
FIGS. 17A, 17B and 17C each illustrate a light path of the zoom lens in the fourth exemplary embodiment when the light path is folded at 90 degrees.
Figure 17B:
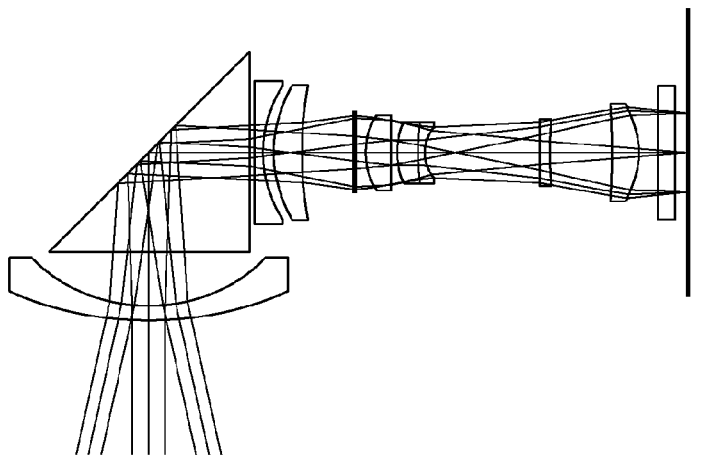
Figure 17A:
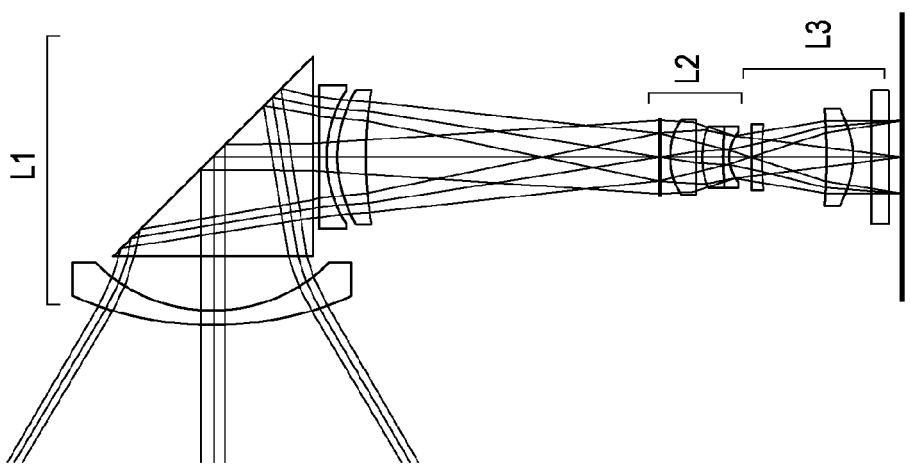
Figure 18:
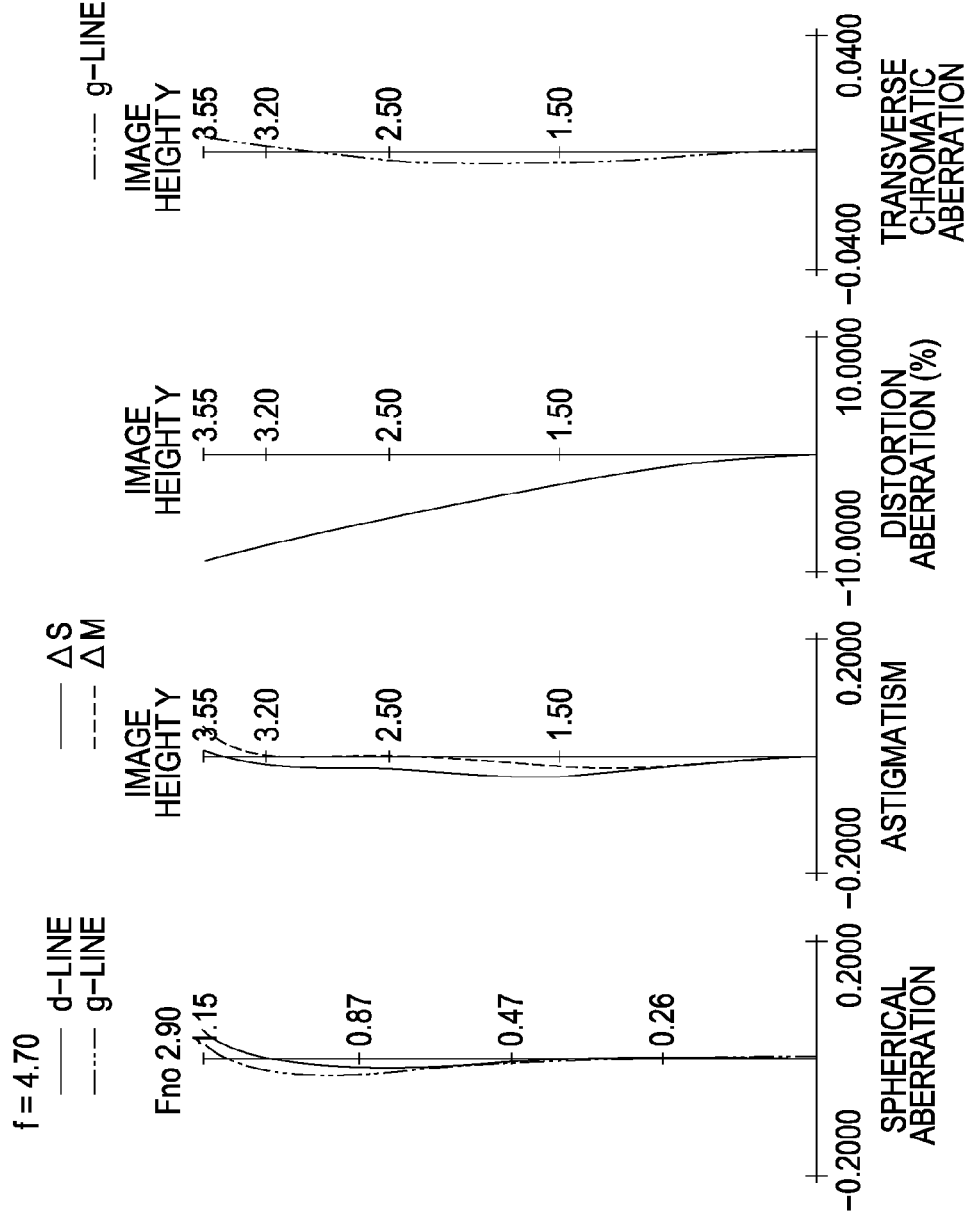
FIG. 18 illustrates various aberrations at a wide-angle end of the zoom lens in the fourth exemplary embodiment.
Figure 19:
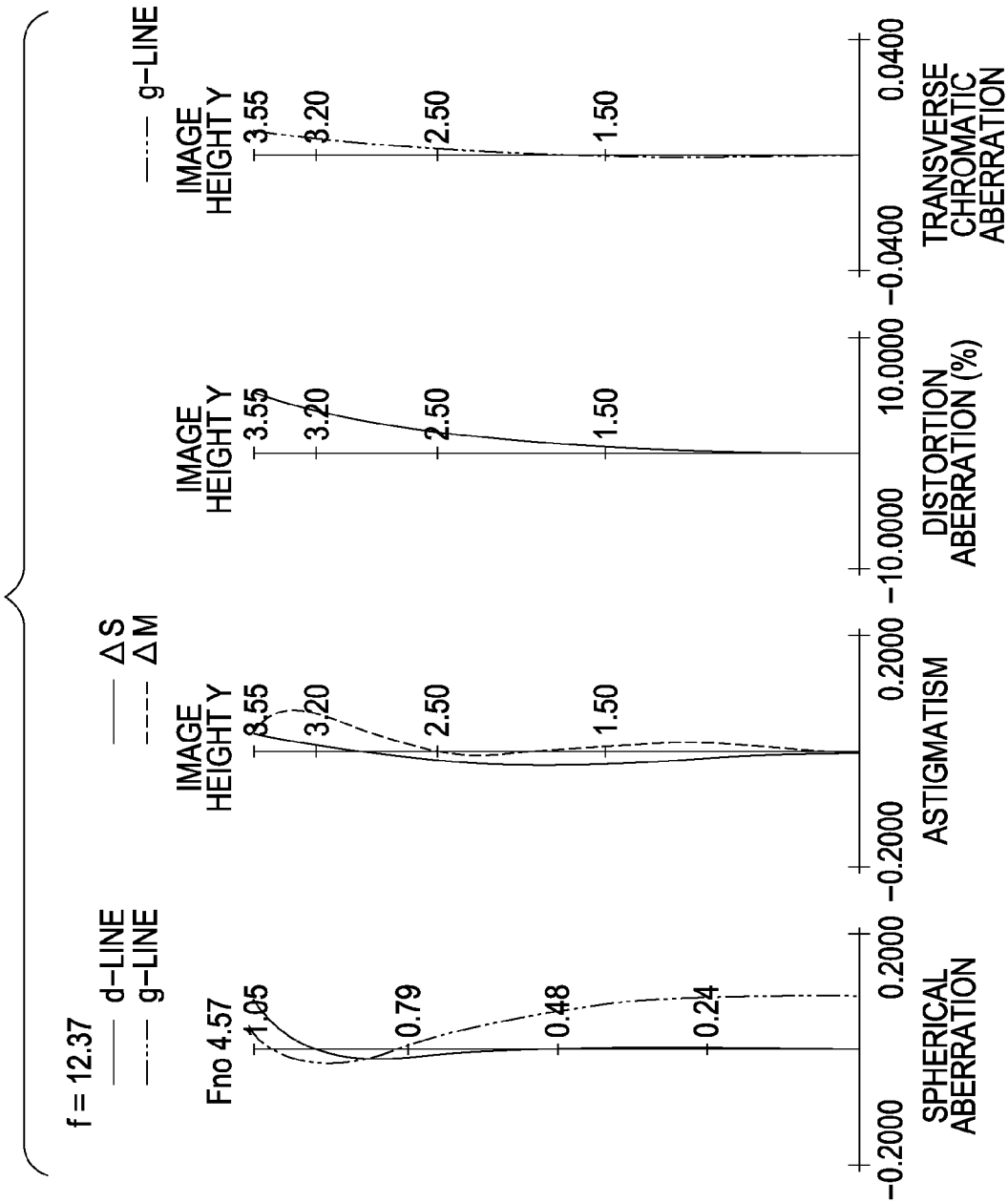
FIG. 19 illustrates various aberrations at an intermediate zooming position of the zoom lens in the fourth exemplary embodiment.

FIG. 16 is a optical sectional view of a zoom lens used in the imaging apparatus according to a fourth exemplary embodiment of the present invention at a wide-angle end, and FIGS. 17A, 17B and 17C each illustrate a light path of the zoom lens when the light path is folded by a reflective member. FIGS. 18, 19 and 20 illustrate various aberrations of the zoom lens at a wide-angle end (shorter focal length end), an intermediate zooming position, and a telephoto end (longer focal length end), respectively, which is used in the imaging apparatus according to the fourth exemplary embodiment.

Figure 25:
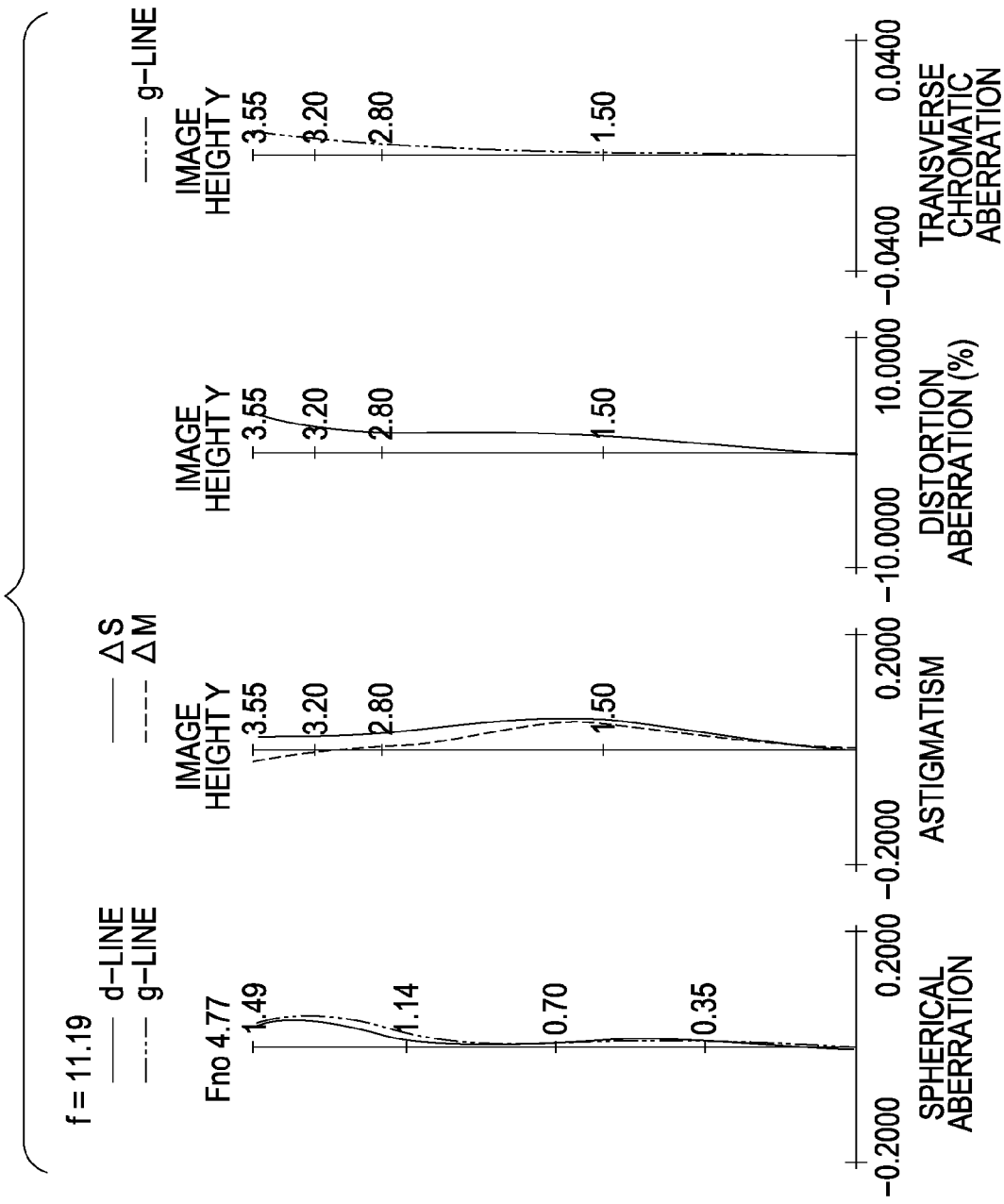
FIG. 25 illustrates various aberrations at a telephoto end of the zoom lens in the fifth exemplary embodiment.

FIG. 21 is a optical sectional view of a zoom lens used in the imaging apparatus according to a fifth exemplary embodiment of the present invention at a wide-angle end, and FIGS. 22A, 22B and 22C each illustrate a light path of the zoom lens when the light path is folded by a reflective member. FIGS. 23, 24 and 25 illustrate various aberrations of the zoom lens at a wide-angle end (shorter focal length end), an intermediate zooming position, and a telephoto end (longer focal length end), respectively, which is used in the imaging apparatus according to the fifth exemplary embodiment.

Figure 28:
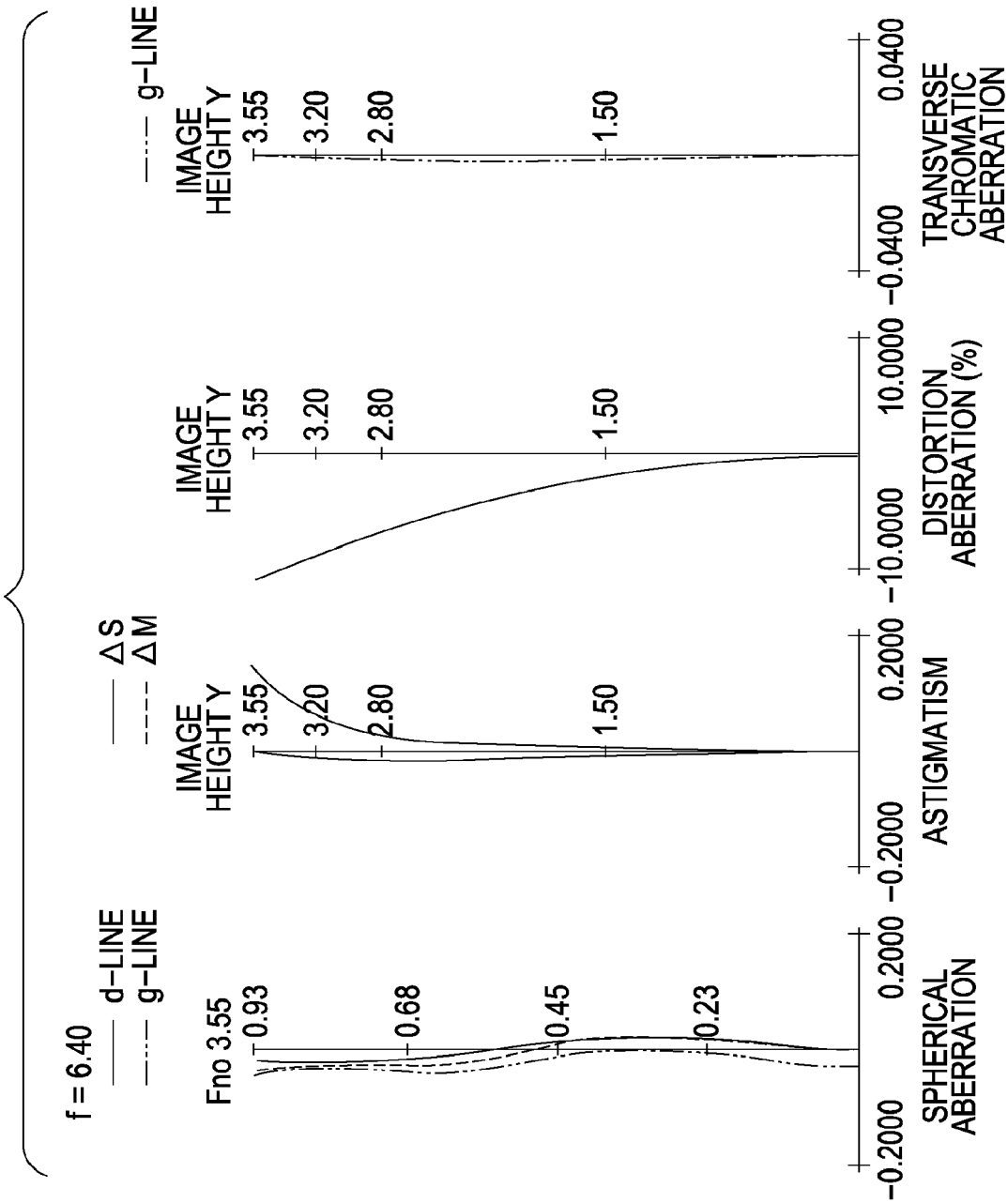
FIG. 28 illustrates various aberrations at a wide-angle end of the zoom lens in the sixth exemplary embodiment.
Figure 29:
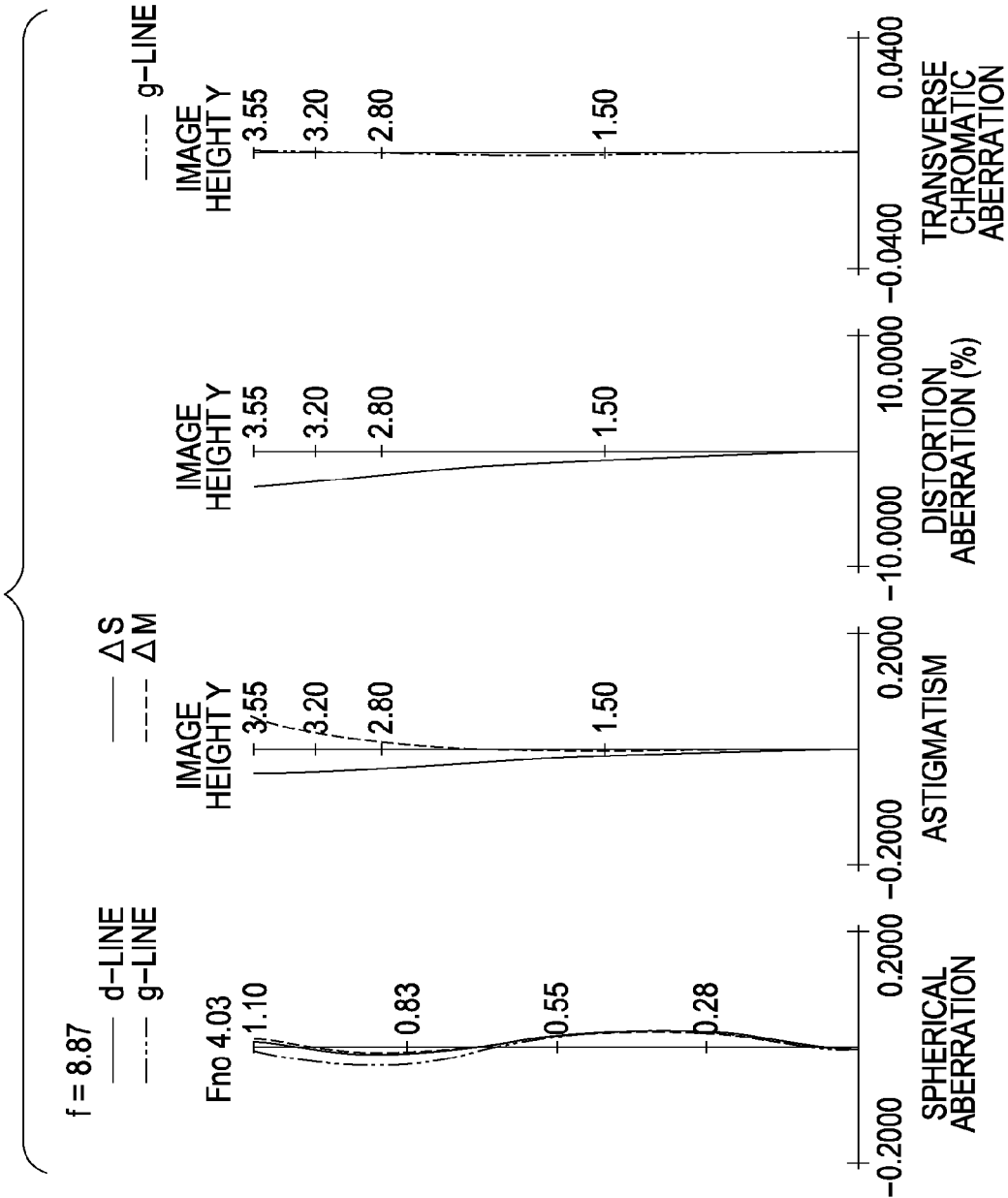
FIG. 29 illustrates various aberrations at an intermediate zooming position of the zoom lens in the sixth exemplary embodiment.
Figure 30:
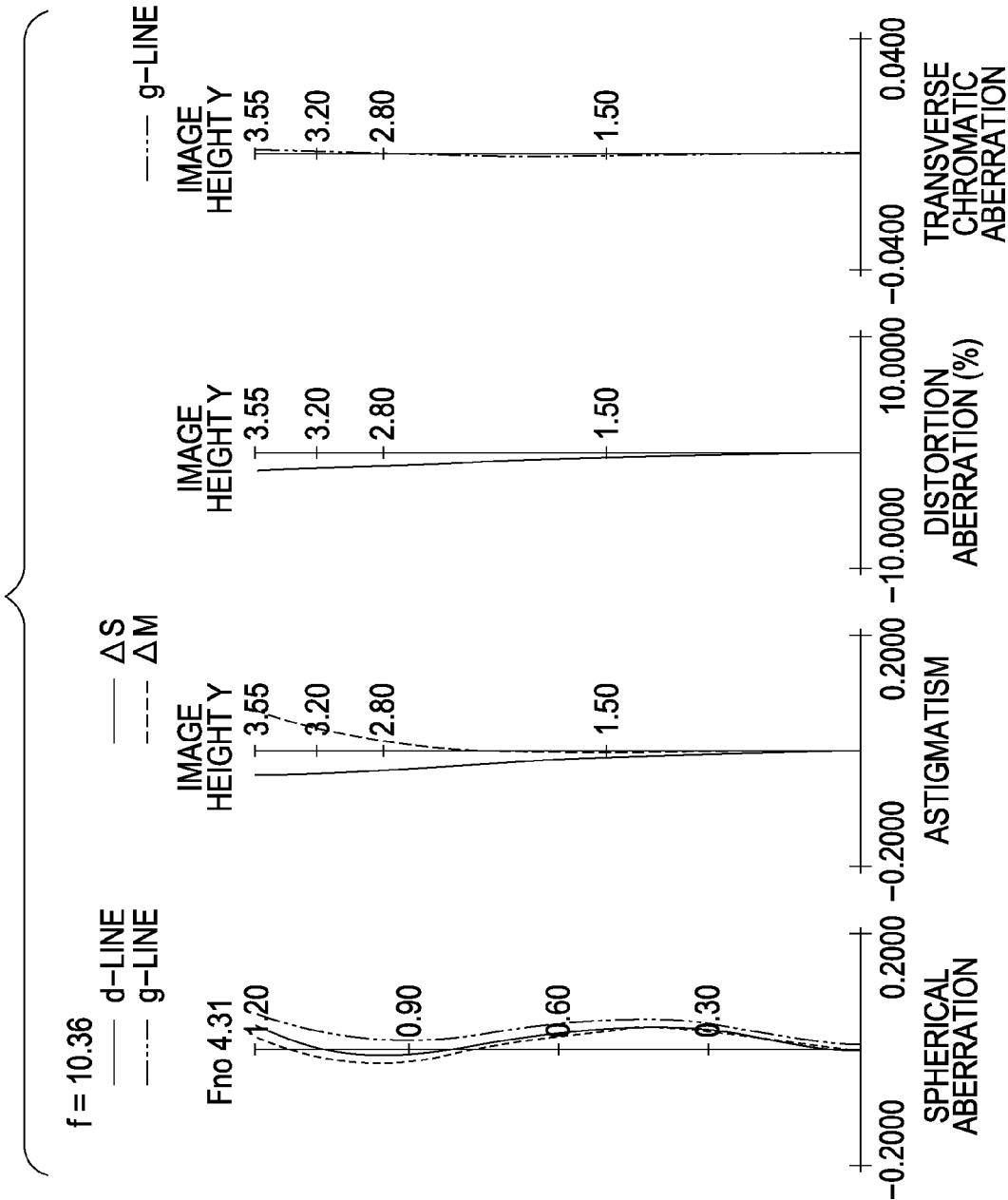
FIG. 30 illustrates various aberrations at a telephoto end of the zoom lens in the sixth exemplary embodiment.

FIG. 26 is a optical sectional view of a zoom lens used in the imaging apparatus according to a sixth exemplary embodiment of the present invention at a wide-angle end, and FIGS. 27A, 27B and 27C each illustrate a light path of the zoom lens when the light path is folded by a reflective member. FIGS. 28, 29 and 30 illustrate various aberrations of the zoom lens at a wide-angle end (shorter focal length end), an intermediate zooming position, and a telephoto end (longer focal length end), respectively, which is used in the imaging apparatus according to the sixth exemplary embodiment.

Figure 31:
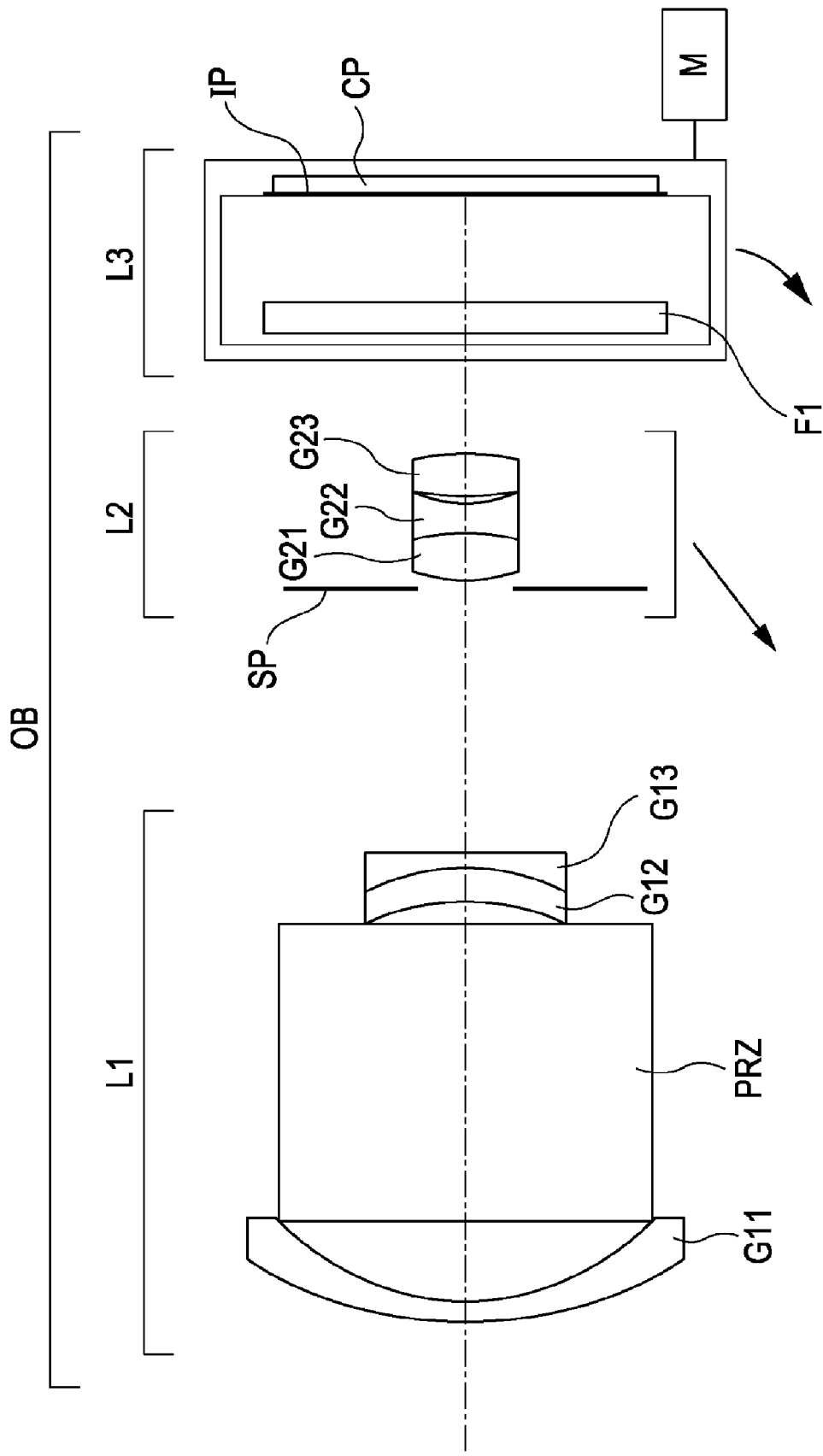
FIG. 31 is an optical sectional view of a zoom lens in a seventh exemplary embodiment of the present invention.
Figure 34:
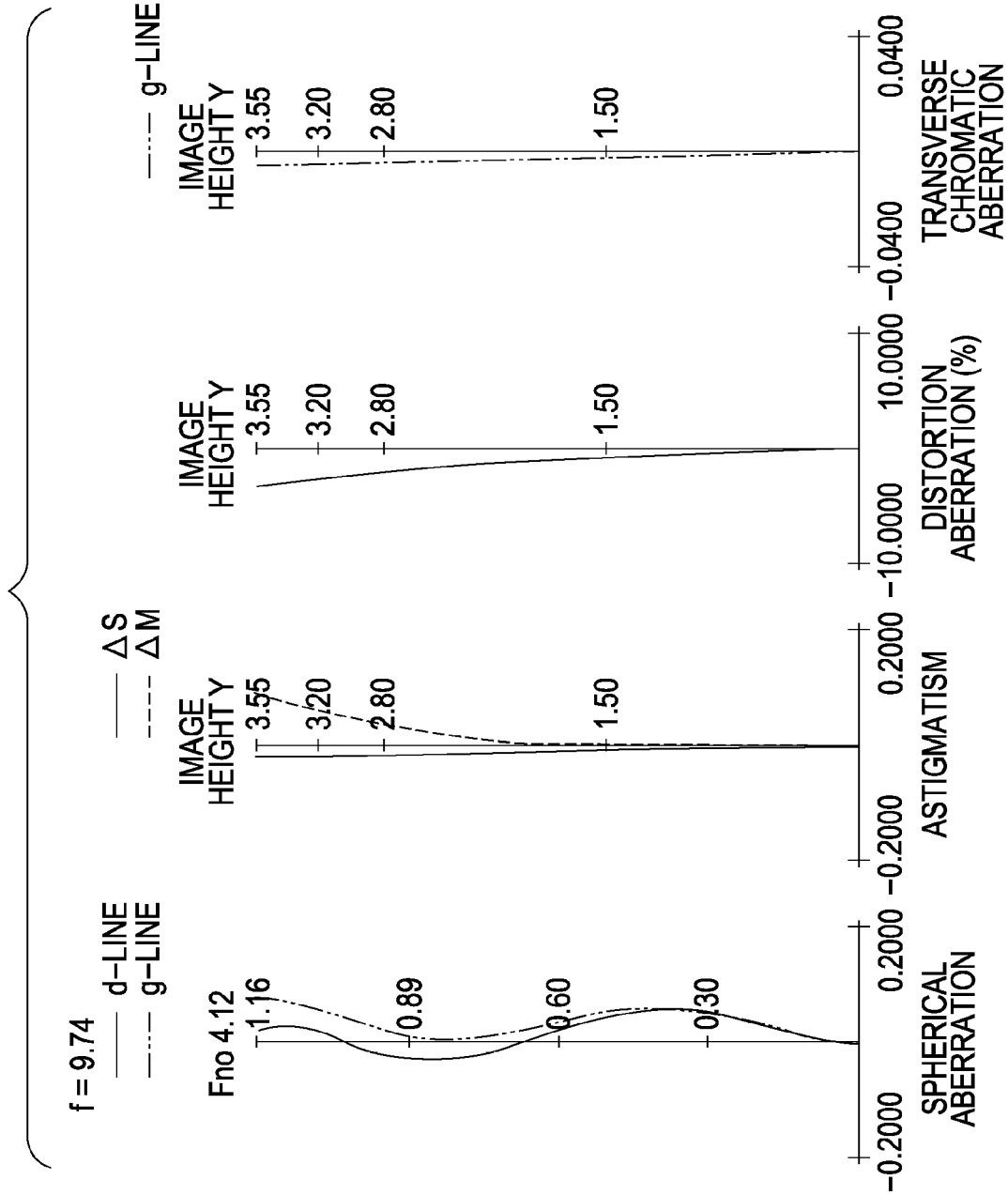
FIG. 34 illustrates various aberrations at an intermediate zooming position of the zoom lens in the seventh exemplary embodiment.
Figure 35:
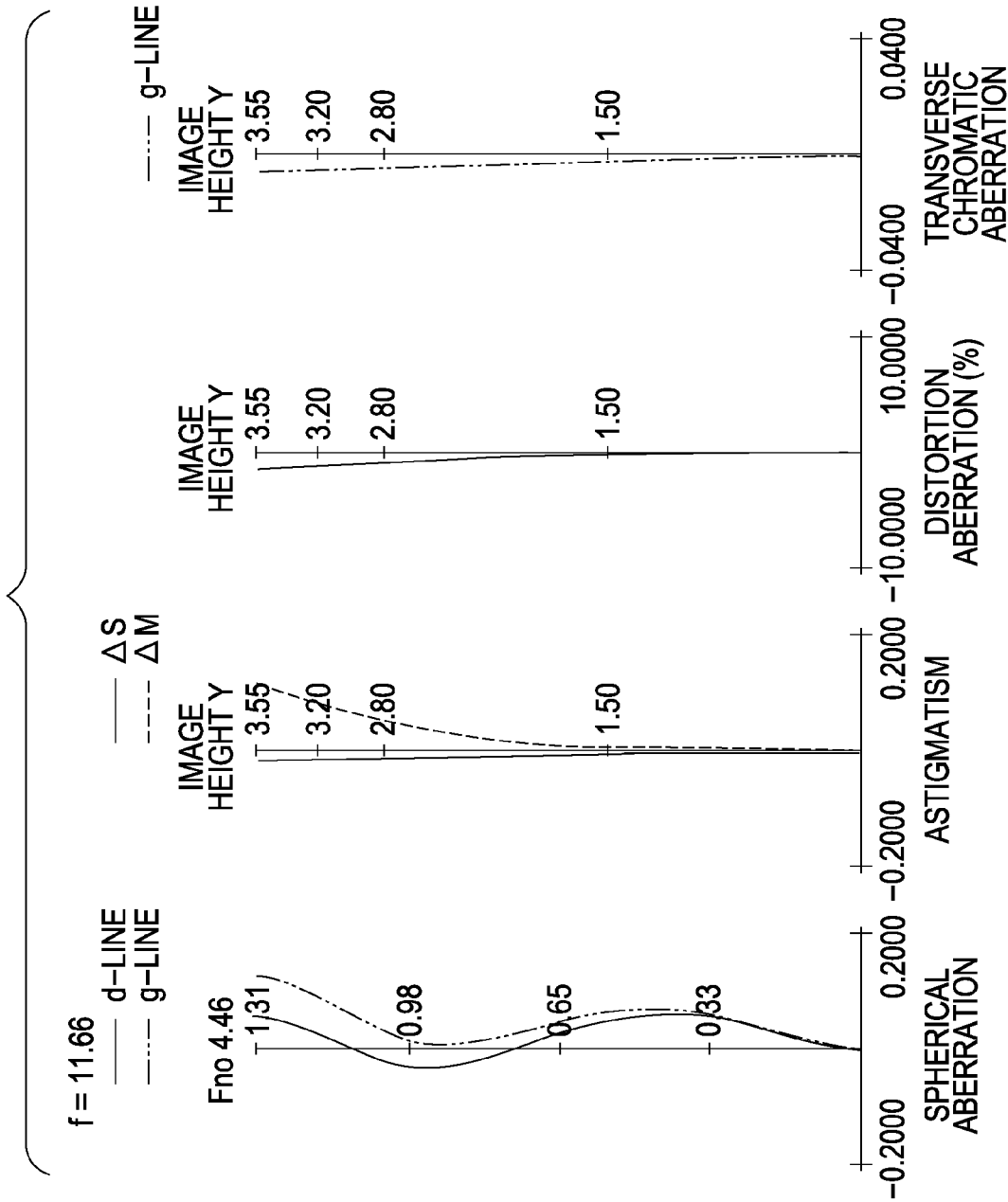
FIG. 35 illustrates various aberrations at a telephoto end of the zoom lens in the seventh exemplary embodiment.

FIG. 31 is a optical sectional view of a zoom lens used in the imaging apparatus according to a seventh exemplary embodiment of the present invention at a wide-angle end, and FIGS. 32A, 32B and 32C each illustrate a light path of the zoom lens when the light path is folded by a reflective member. FIGS. 33, 34 and 35 illustrate various aberrations of the zoom lens at a wide-angle end (shorter focal length end), an intermediate zooming position, and a telephoto end (longer focal length end), respectively, which is used in the imaging apparatus according to the seventh exemplary embodiment.

Figure 36:
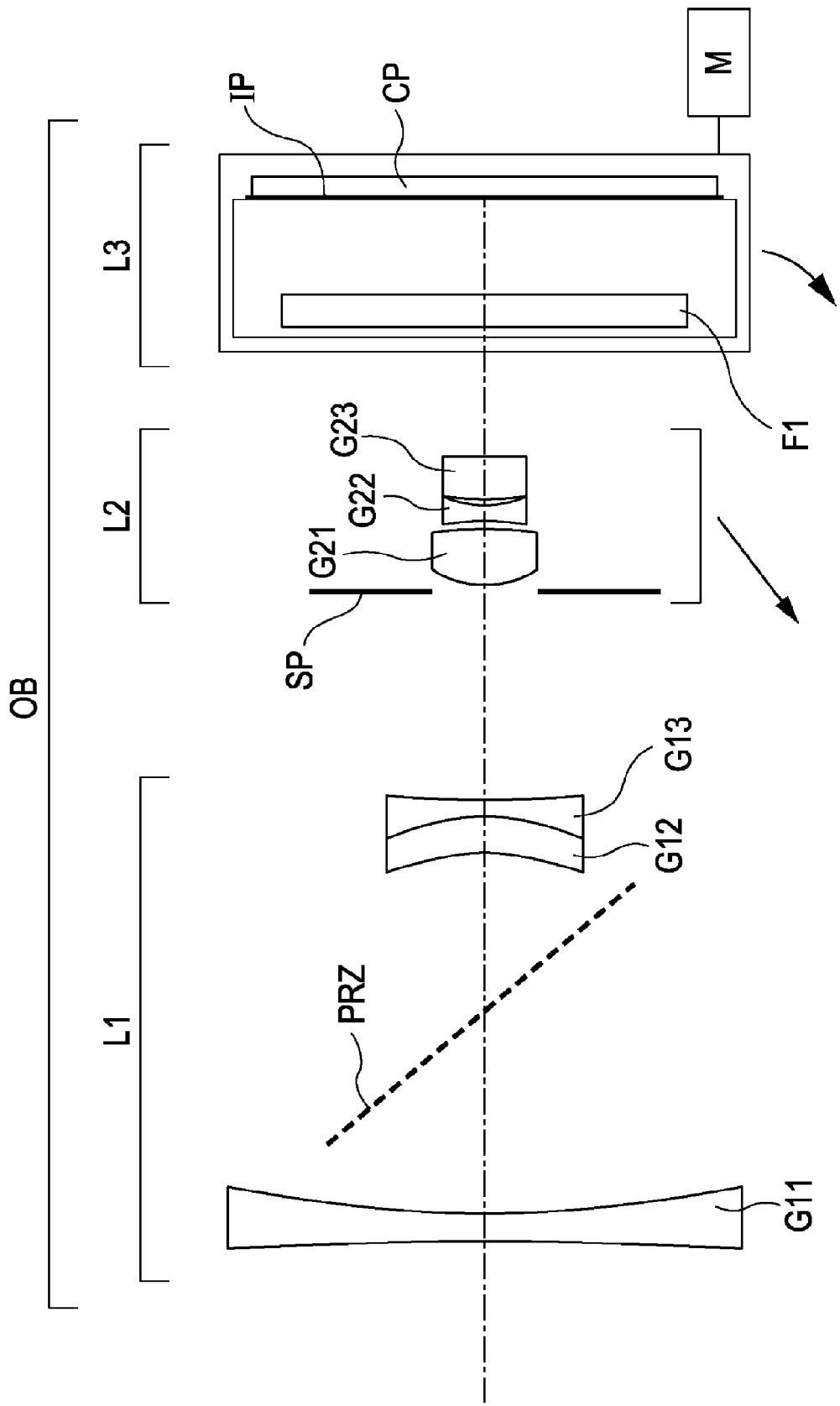
FIG. 36 is an optical sectional view of a zoom lens in an eighth exemplary embodiment of the present invention.
Figure 38:
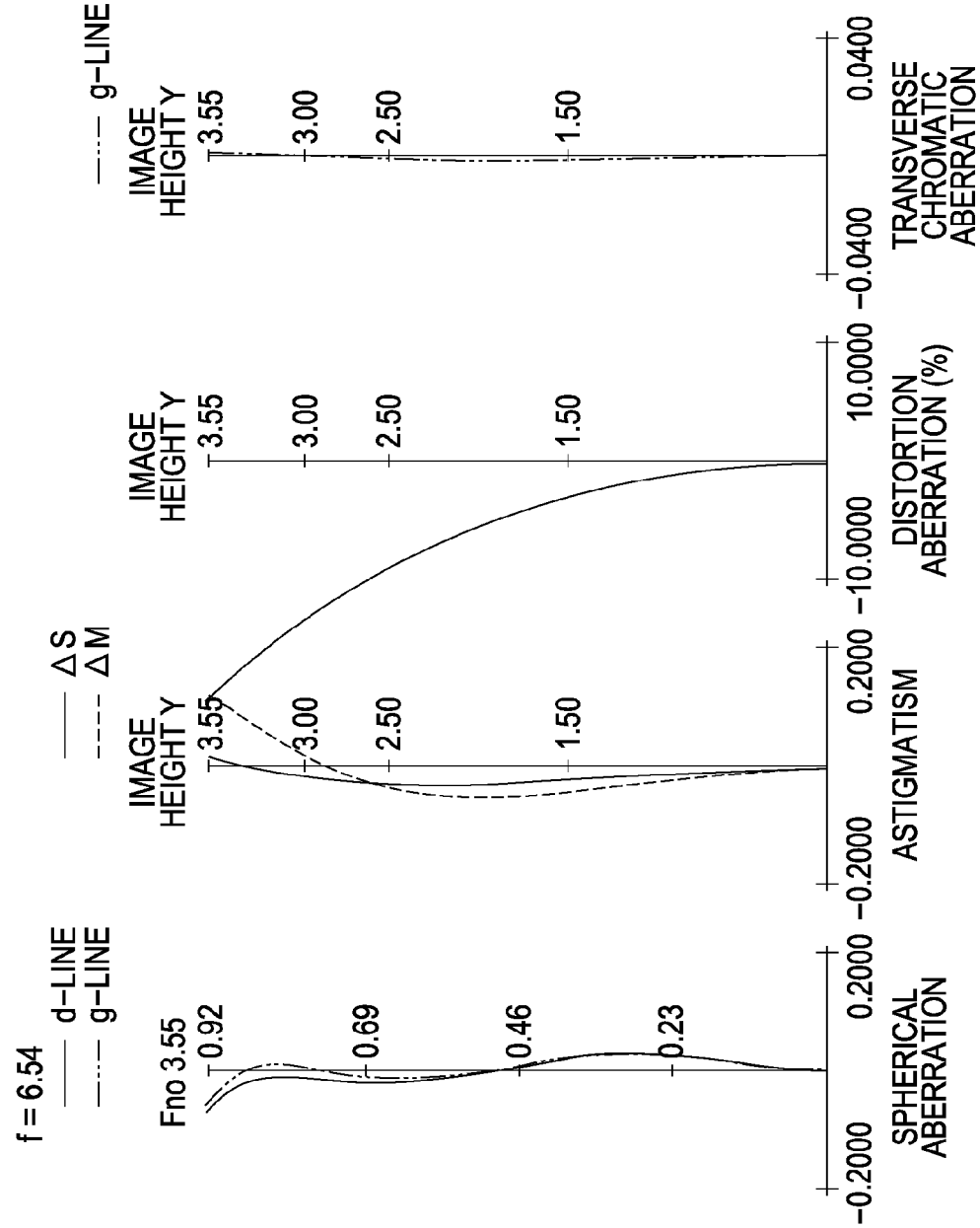
FIG. 38 illustrates various aberrations at a wide-angle end of the zoom lens in the eighth exemplary embodiment.
Figure 39:
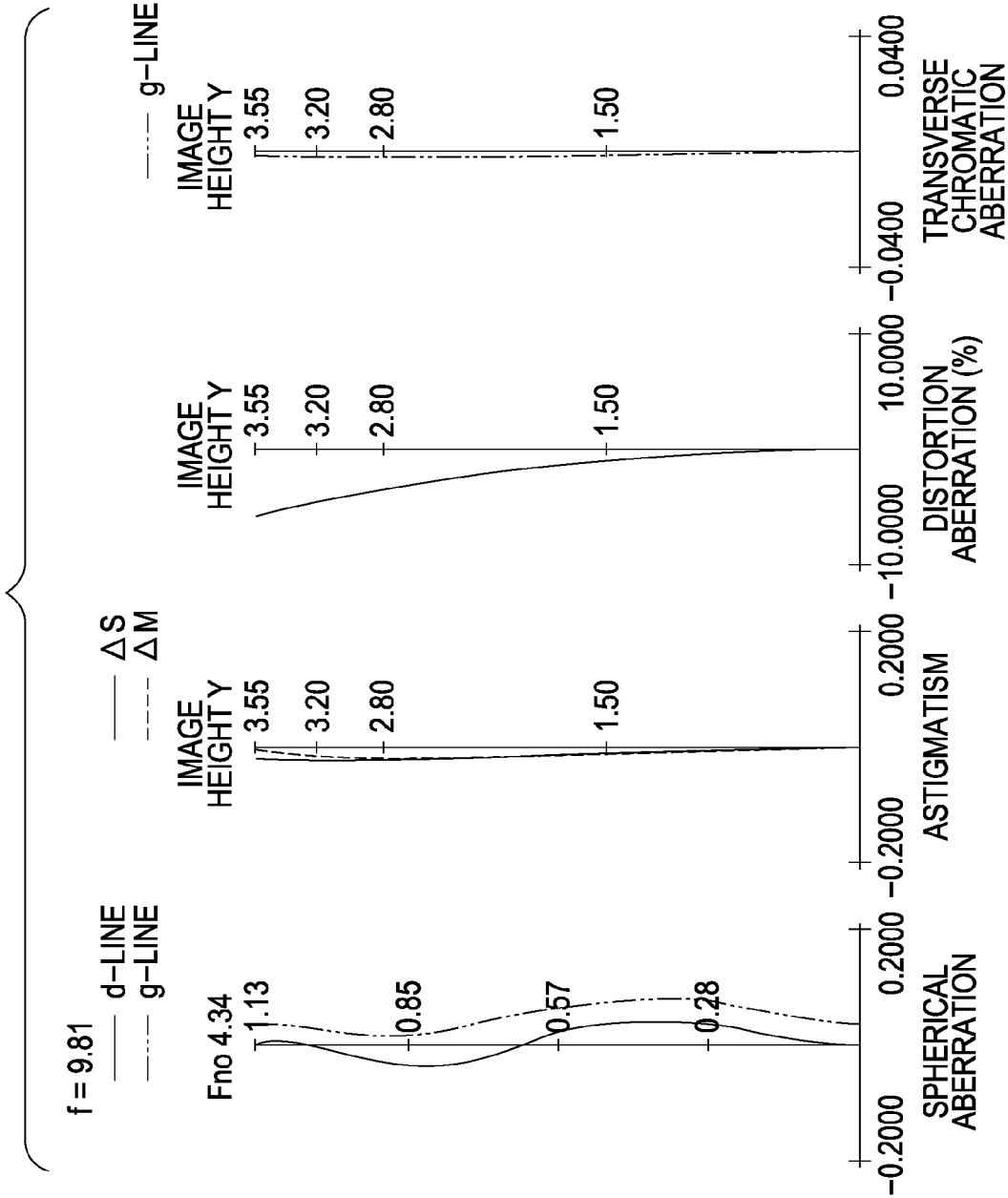
FIG. 39 illustrates various aberrations at an intermediate zooming position of the zoom lens in the eighth exemplary embodiment.
Figure 40:
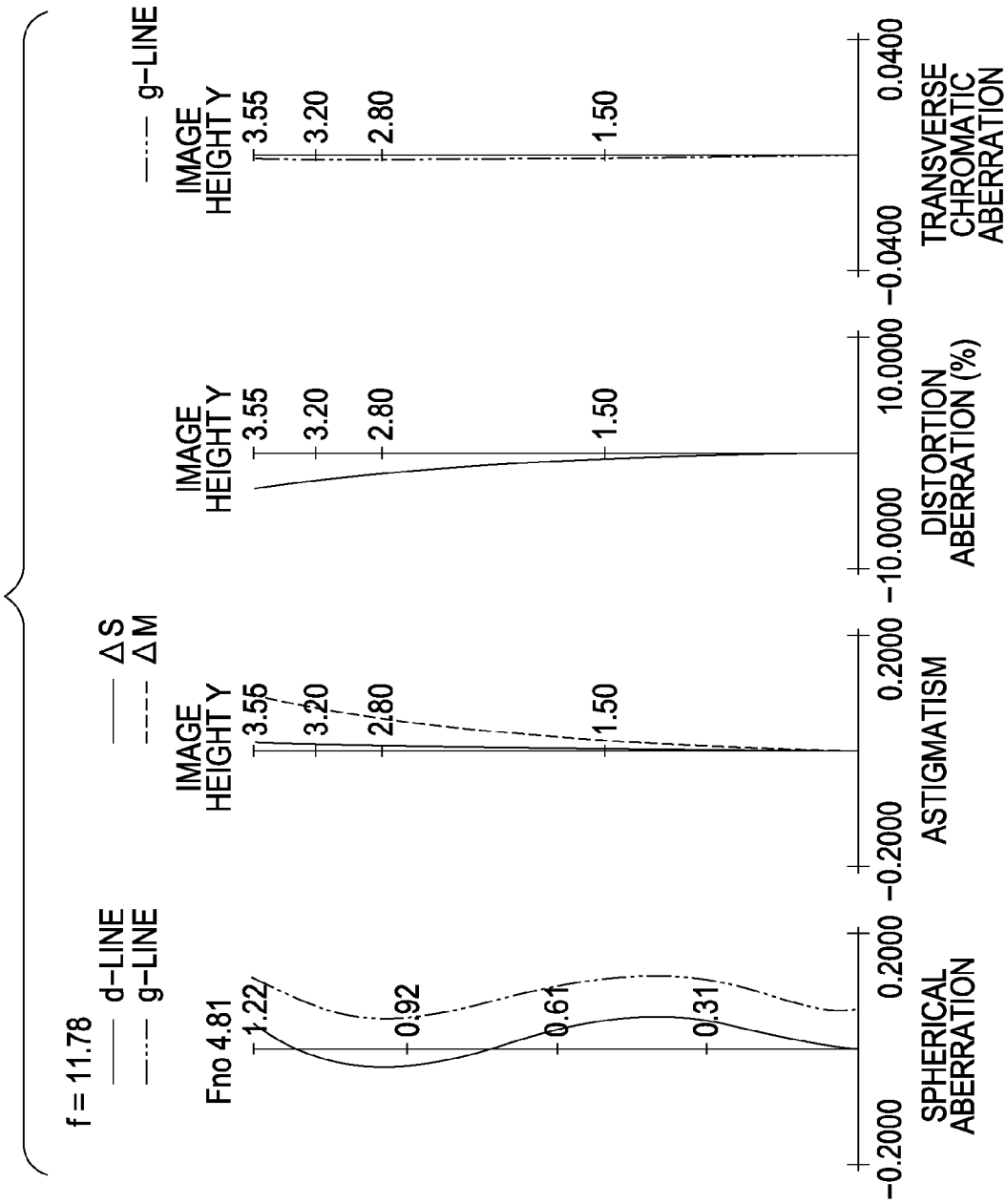
FIG. 40 illustrates various aberrations at a telephoto end of the zoom lens in the eighth exemplary embodiment.

FIG. 36 is a optical sectional view of a zoom lens used in the imaging apparatus according to an eighth exemplary embodiment of the present invention at a wide-angle end, and FIGS. 37A, 37B and 37C each illustrate a light path of the zoom lens when the light path is folded by a reflective member. FIGS. 38, 39 and 40 illustrate various aberrations of the zoom lens at a wide-angle end (shorter focal length end), an intermediate zooming position, and a telephoto end (longer focal length end), respectively, which is used in the imaging apparatus according to the eighth exemplary embodiment.

In the drawings illustrating the light path folded by the reflective member, A represents the light path when the zoom lens is at the wide-angle end, B represents the light path when the zoom lens is at the intermediate zooming position, and C represents the light path when the zoom lens is at the telephoto end.

Figure 41A:
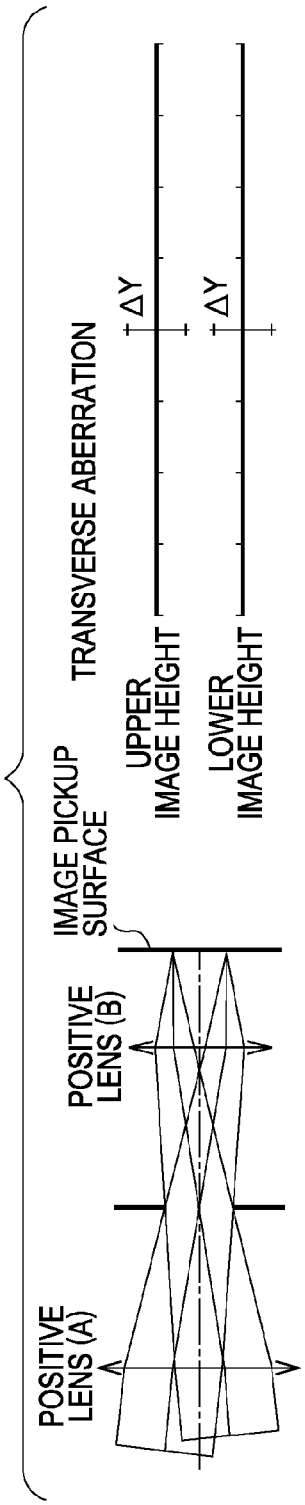
FIGS. 41A, 41B and 41C are explanatory views illustrating optical characteristics in the present invention when an image pickup element is not inclined and when it is inclined.
Figure 41B:
Figure 41C:
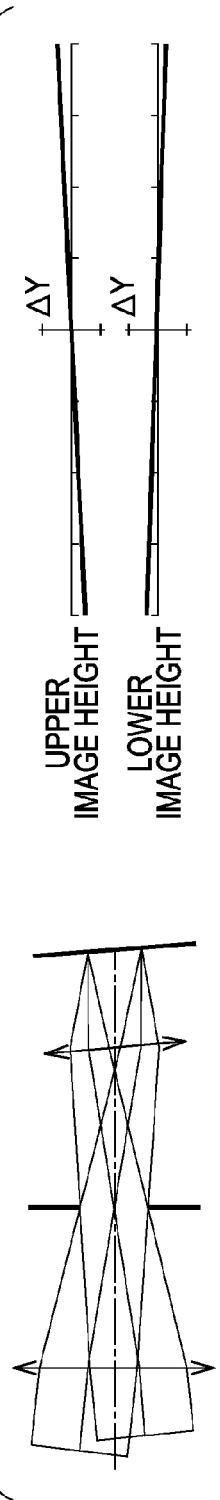

FIGS. 41A, 41B and 41C are explanatory views illustrating optical characteristics in the present invention when the image pickup element is not inclined and when it is inclined from a plane perpendicular to an optical axis.

Figure 42:
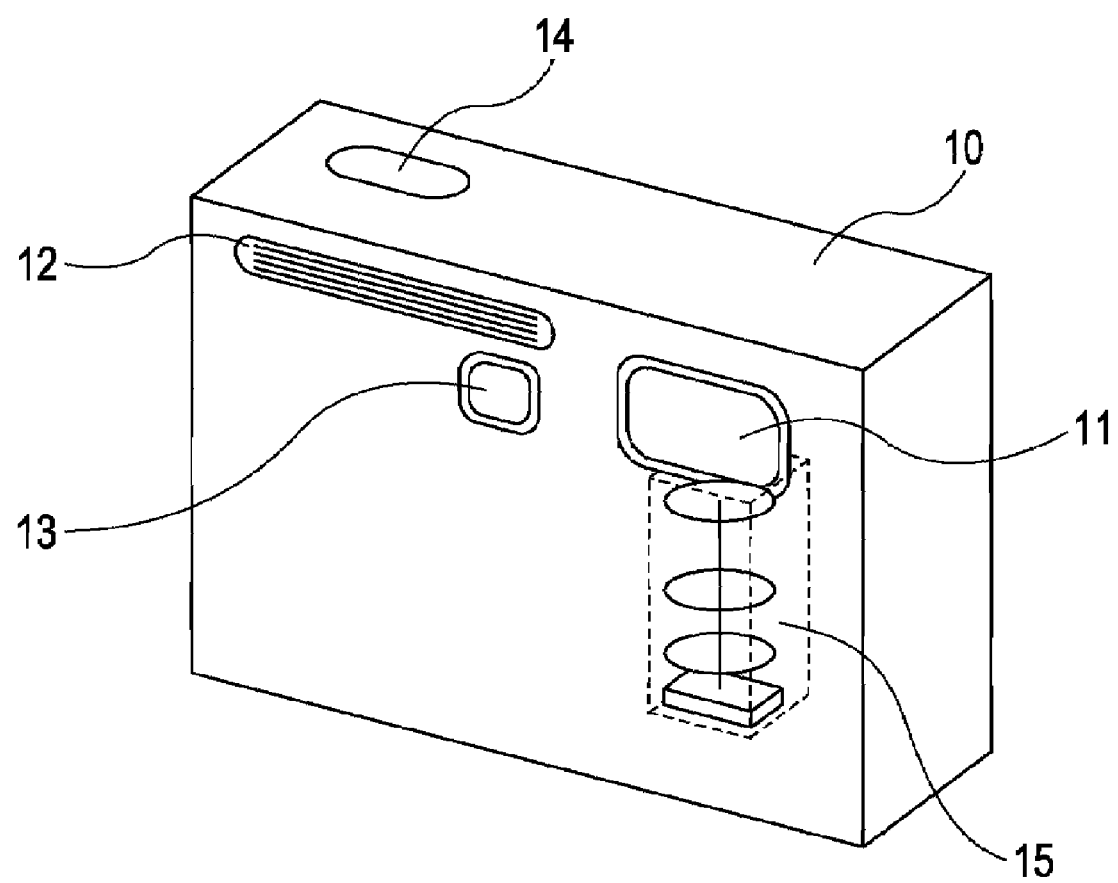
FIG. 42 is an explanatory view illustrating an imaging apparatus according to the present invention.

FIG. 42 is an explanatory view illustrating principal parts of a digital still camera (imaging apparatus) according to the present invention.

Figure 43:
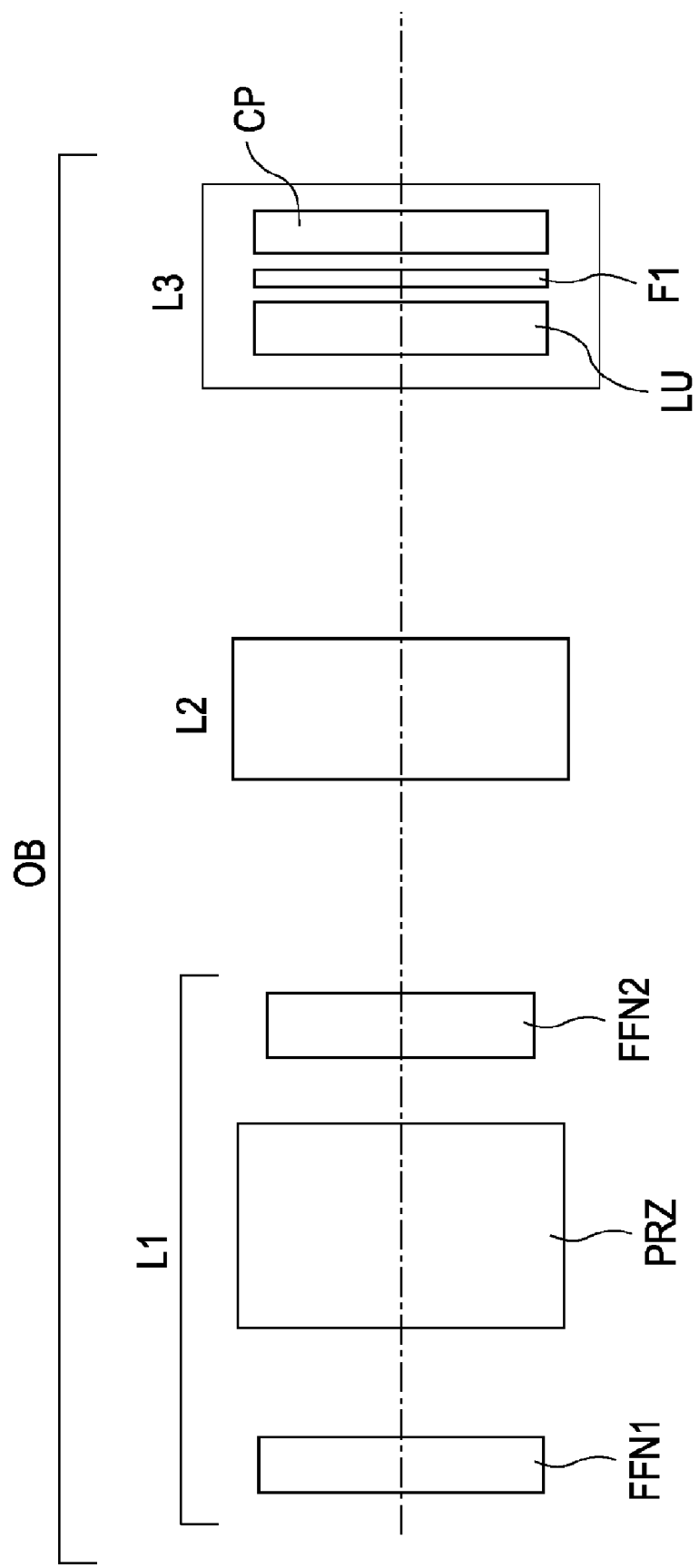
FIG. 43 is an explanatory view illustrating a basic construction of an optical system according to the present invention.

FIG. 43 is an explanatory view illustrating a basic construction of an optical system according to the present invention.

In each of the optical sectional views of the zoom lenses in the exemplary embodiments which show the light paths in the developed form and in each of the illustrations of the folded light paths, the left side represents an object (front) side, and the right side or the lower side represents an image (rear) side.

When the zoom lens of each exemplary embodiment is used as a projection apparatus, e.g., a projector, the left side corresponds to a screen and the right side or the lower side corresponds to an image to be projected in each of the lens sectional views which show the light paths in the developed form and in each of the illustrations of the folded light paths.

In FIG. 43, OB represents the imaging apparatus with its optical system installed in a lens barrel.

L1 represents a first optical unit which is disposed closer to the object side, has a negative refractive power, and is fixed to the lens barrel. The first optical unit L1 includes a lens section FFN1 having a negative refractive power, a reflective member PRZ made of a prism or a reflective mirror and folding an optical axis in the range of, e.g., 80°-100°, and a lens section FFN2 having a negative refractive power.

L2 represents a second optical unit having a positive refractive power.

L3 represents a third optical unit including an image pickup element CP. The third optical unit L3 includes at least one of a plane-parallel plate (glass block) F1 having no refractive power and a lens member LU having a refractive power.

As an alternative, the third optical unit L3 includes only the image pickup element CP (described below) in some cases. Thus, the term "optical unit" used herein means not only a unit constituted by one or more lenses, but also a unit including the image pickup element alone or a unit including a combination of the image pickup element and a filter.

CP represents the image pickup element. M represents a moving mechanism arranged to move the third optical unit L3 in the direction of the optical axis.

The imaging apparatus OB of each exemplary embodiment includes the zoom lens (optical system) and the image pickup element CP.

Assuming that i denotes the order of the optical unit counting from the object side, Li represents the i-th optical unit having a positive or negative refractive power (optical power=reciprocal of focal length) or no refractive power.

PRZ represents a reflective mirror or a prism (i.e., a reflective member) including a reflective surface for folding the light path.

SP represents an aperture stop (iris diaphragm) which is disposed between the first optical unit L1 and the second optical unit L2. LU represents a lens member which has a refractive power and is positioned closest to the image pickup element CP.

F1 represents an optical block having no refractive power, such as an optical filter, a face plate, an optical low-pass filter made of quartz, or an infrared cut filter.

IP represents an image plane which corresponds to an image pickup surface of the solid-state image pickup element (photoelectric conversion element) CP, such as a CCD sensor or a CMOS sensor.

M represents a moving mechanism arranged to move the third optical unit L3 including the image pickup element CP.

As described above, the optical unit can include a lens unit having a refractive power, or a plane-parallel plate, etc. having no refractive power, or only the image pickup element CP.

In each of the drawings illustrating various aberrations, d and g represent respectively the d-line and the g-line. $\Delta M$ and $\Delta S$ represent respectively the meridional image plane and the saggital image plane. The transverse chromatic aberration is represented by the g-line. Further, f represents the focal length. Fno represents the F-number. Y represents the image height.

In the following exemplary embodiments, the wide-angle end and the telephoto end of the zoom lens mean respective zooming positions where the lens unit for varying a magnification (i.e., for zooming) is positioned at opposite ends of the mechanically movable range along the optical axis.

The first optical unit L1 does not move during zooming.

The second optical unit L2 moves toward the object side during zooming from the wide-angle end to the telephoto end.

The third optical unit L3 moves so that the image pickup element CP is positioned at the position of the image plane which varies with the zooming. In other words, the third optical unit L3 moves during zooming to compensate for changes in position of the image formed by the imaging apparatus, which are caused during zooming, (or to reduce adverse influences of those positional changes). The third optical unit L3 also moves toward the object side during zooming from the wide-angle end to the telephoto end.

The basic construction of the imaging apparatus OB according to the present invention will be described with reference to FIG. 43. The diagonal length of an effective (viewing) area of the image pickup element CP in FIG. 43 is assumed to be LD. The term "effective area" used herein means an area in which, when the light incoming from the object side (i.e., the light forming the object image) enters, the image pickup element can effectively perform photoelectric conversion of the incident light. The lens member LU of the third optical unit L3, which has a refractive power and is positioned closest to the image plane, is disposed within a distance of 1.5×LD in terms of air-converted length OD from the image pickup element CP.

Herein, the term "air-converted length OD" means an equivalent length in air. For example, when a glass block is disposed in the light path, the air-converted length OD of the glass block is given below:

$$OD=D/n$$

where n is the refractive index of material of the glass block and D is the thickness of the glass block in the direction of the optical axis.

The third optical unit L3 containing the image pickup element CP is moved during zooming by the moving mechanism M. By providing the lens member LU having a positive refractive power in the third optical unit L3, a partial blur occurred in an image obtained by the image pickup element CP is suppressed even when the image pickup element CP is inclined relative to the optical axis with the movement of the third optical unit L3 during zooming.

With reference to FIGS. 41A-41C, a description is now made of the optical action that is developed when the image pickup element CP is inclined relative to the optical axis with integral movement of the lens member LU having a positive refractive power and the image pickup element CP in the imaging apparatus OB shown in FIG. 43.

Each of FIGS. 41A-41C shows one zooming position within a zooming range when the optical system of the imaging apparatus OB includes a positive lens (A) and a positive lens (B) arranged in this order from the object side.

In FIG. 41A, both positive lenses (A) and (B) are not offset relative to the optical axis. In other words, FIG. 41A is a schematic view of the optical system in a no-offset state.

Thus, FIG. 41A illustrates paths of rays of light focused at levels of two image heights in the image pickup surface in the vertical direction by using an ideal optical system in which both positive lenses (A) and (B) are assembled as per design values.

In FIG. 41A, the positive lens (B) is disposed closest to the image plane in an adjacent relation to the image pickup element CP, and the positive lens (A) is assumed to be one positive lens representing a combined refractive power of the remaining system which is obtained by excluding the positive lens (B) from the entire optical system.

FIG. 41B illustrates the case where only the image pickup element CP is inclined relative to the optical axis. In FIG. 41B, the upper image height appears in a front focus state and the lower image height appears in a rear focus state. Further, because the ray of light obliquely enters the image plane, the diameter of a light spot is increased and the transverse aberration of the image height becomes asymmetrical in the vertical direction.

FIG. 41C illustrates the case where the image pickup element CP and the positive lens (B) positioned closest to the image plane are both inclined together relative to the optical axis.

In the case of FIG. 41C, an incident angle upon the positive lens (B) is changed depending on the rays of light corresponding to two image heights in the vertical direction such that, in comparison with the no-offset state of FIG. 41A, the incident angle of the ray of light corresponding to the upper image height (i.e., the incident angle of the upper ray) is increased and the incident angle of the ray of light corresponding to the lower image height (i.e., the incident angle of the lower ray) is decreased.

Therefore, the ray of light passing through the positive lens (B) is subjected to such a refractive action that the upper ray is more strongly refracted in the direction toward the optical axis because it receives a stronger positive refractive action, while the lower ray undergoes a reversed refractive action.

Thus, the refractive action imposed on the upper and lower rays is changed depending on the direction of inclination of the image pickup surface. In other words, in the case of FIG. 41C, the refractive action is generated so as to suppress the image change, shown in FIG. 41B, caused when only the image pickup surface is inclined. Hence, as shown in FIG. 41C, the amount of transverse aberration generated is reduced in comparison with the case of FIG. 41B.

The arrangement of the optical system of the imaging apparatus OB for producing the refractive power is not limited to the order of the positive lens (A) and the positive lens (B). As an alternative, the lens arrangement can be changed to the order of a negative lens and a positive lens.

When the image pickup element is moved in the direction of the optical axis, it has to be moved while keeping the image pickup surface of the image pickup element perpendicular to the optical axis in order to maintain good optical performance.

If the image pickup surface is inclined relative to the optical axis when the image pickup element is moved, unevenness in focusing (i.e., a partially blurred state) occurs in opposed peripheral images looking from the center of the viewing area, thus causing a deterioration of image quality.

In contrast, according to the first to fourth exemplary embodiments, when the image pickup element is moved, it is moved together with the lens member LU having a positive refractive power. Therefore, even when the image pickup surface of the image pickup element is inclined, unevenness of the optical performance is held small over the entire viewing area and high quality of an image can be maintained.

On that occasion, the lens member LU having a positive refractive power is positioned close to the image pickup element. The lens member LU having a positive refractive power and arranged closest to the image plane is positioned within the distance 1.5×LD in terms of the air-converted length from the image pickup element CP.

The features common to the exemplary embodiments will be described with reference to FIG. 43.

In FIG. 43, when the lens member LU is formed of a lens having a positive refractive power, the focal length of the lens member LU having a positive refractive power is assumed to be PFL. Also, the focal length of the entire optical system in a state focused, at the wide-angle end thereof, to an object at infinity is assumed to be Fw.

In that state, the following condition formula (3) is satisfied:

$$0.12 < Fw/PFL < 0.5 \qquad (3)$$

If Fw/PFL exceeds an upper limit value of the condition formula (3), the refractive power of the lens member LU having a positive refractive power becomes too strong and the diameter of the exit pupil tends to increase. This is disadvantageous because, in order to obtain constant quality of peripheral light, the outer diameter of the lens member LU having a positive refractive power has to be increased and the off-axis light aberration is increased.

On the other hand, if Fw/PFL exceeds a lower limit value of the condition formula (3), the refractive power of the lens member LU having a positive refractive power becomes too weak and the effect of compensating for the image deterioration caused by the partial blur is reduced.

When in the optical system of FIG. 43 the lens member LU is formed of a lens having a negative refractive power, at least one surface of the lens having a negative refractive power is formed as an aspherical surface.

Such an arrangement can also provide a similar advantage to that obtained with the case satisfying the condition formula (3).

The focal length of the first optical (lens) unit L1 is assumed to be F1.

The combined focal length of an optical unit (rear optical unit) in a combination of the second optical unit L2 and the third optical unit L3 at the wide-angle end is assumed to be FR.

On that assumption, the following condition formulae (1) and (2) are satisfied:

$$0.25 < |Fw/F1| < 0.6 \text{ (where } F1 < 0) \tag{1}$$

$$0.25 < Fw/FR < 0.9 \tag{2}$$

The condition formula (1) relates to a ratio of the focal length of the entire optical system at the wide-angle end to the focal length of the first optical unit L1 at the wide-angle end, the latter L1 including the reflective member. The condition formula (1) represents a condition for obtaining good image quality while reducing the lens outer diameter.

If |Fw/F1| exceeds an upper limit value of the condition formula (1), the negative refractive power of the first optical unit L1 becomes too strong and a positive spherical aberration is increased to such an extent as causing a difficulty in compensating for the positive spherical aberration.

On the other hand, if |Fw/F1| exceeds a lower limit value of the condition formula (1), the retro-focusing action of the entire optical system is weakened. Therefore, the backfocus becomes too short to arrange an optical low-pass filter, an infrared absorption filter or the like in a space between the surface of the image pickup element and the optical (lens) member LU positioned closest to the image plane.

Another disadvantage is that the off-axis light aberration is increased with an increase in the lens diameter of the second optical unit L2.

The condition formula (2) relates to a ratio of the focal length of the entire optical system at the wide-angle end to the combined focal length of the rear optical unit at the wide-angle end, which includes the second optical unit L2 and the third optical unit L3.

If Fw/FR exceeds an upper limit value of the condition formula (2), the positive refractive action of the rear optical unit becomes too strong and the higher-order spherical aberration and the coma aberration are increased to such an extent as causing a difficulty in compensating for those aberrations.

On the other hand, if Fw/FR exceeds a lower limit value of the condition formula (2), the second optical unit L2 has to be moved in a larger amount to ensure a certain zooming range. Therefore, the overall length of the optical system is increased.

In each of the exemplary embodiments, the numerical ranges of the condition formulae (1) to (3) can be set as follows:

$$0.30 < |Fw/F1| < 0.56 \text{ (where } F1 < 0) \tag{1a}$$

$$0.30 < Fw/FR < 0.8 \tag{2a}$$

$$0.14 < Fw/PFL < 0.45 \tag{3a}$$

Also, a focusing operation with respect to an object at a finite distance is desirably performed by moving the image pickup element or the third optical unit L3 including the image pickup element along the optical axis. As an alternative, the focusing operation can also be performed by moving some other optical unit along the optical axis except for the first optical unit L1 including the reflective member PRZ.

In the exemplary embodiments, during zooming, the first optical unit L1 including the reflective member PRZ is held fixed relative to the optical axis and the second optical unit L2 is moved. Further, a variation of the image plane position is compensated for by moving the lens member LU and the image pickup element CP together, or the plane-parallel plate F1 and the image pickup element CP together, or only the image pickup element CP along the optical axis.

Thus, the operation of compensating for a variation of the image plane position, which is caused during zooming, is performed by moving the image pickup element along the optical axis.

The reflective member PRZ is disposed in the first optical unit L1 having a negative refractive power, which is arranged on the side closer to the object than the position of the shutter or the iris stop SP. In addition, a negative lens is arranged on the side closer to the object than the reflective member PRZ.

In the lens unit arranged at the position of the pupil or the iris stop, the off-axis ray has a light path crossing the optical axis at the position of the pupil. Therefore, the off-axis ray having passed through the negative lens, which is arranged on the side closer to the object than the reflective member PRZ, is given with such a refractive action that the off-axis ray is substantially parallel to the optical axis.

Further, by providing a space for insertion of the reflective member on the side closer to the image plane than that negative lens, the size of the space required for insertion of the reflective member can be reduced while preventing changes in an optical characteristic which are caused with a variation of the pupil position.

The first optical unit L1 having a negative refractive power and including the reflective member PRZ is constituted as a lens unit having the strongest negative refractive power in the optical system.

The reason is that moving relatively the lens unit having the strongest negative refractive power is effective in reducing the size of the optical system because the operation of compensating for the position of the focused image plane can be achieved with a smaller amount of movement of a compensation lens unit.

In each of the exemplary embodiments, the first optical unit L1 is held fixed relative to the optical axis. This means that the change of the focused image position caused during zooming is given by an amount of relative positional change between the lens unit compensating for the position of the focused image plane and the image pickup element. Accordingly, an amount by which the image pickup element should be moved to compensate for the position of the focused image plane can be reduced.

For the reasons described above, in each of the exemplary embodiments, the reflective member is arranged in the first optical unit L1, which has a negative refractive power and is positioned closest to the object, to constitute the lens unit satisfying the above-described conditions.

Each of the exemplary embodiments can also be constructed as follows to achieve higher image quality.

For the purpose of reducing the number of lenses used and realizing a smaller-size optical system with higher performance, it is effective to introduce a lens having at least one aspherical surface in the second optical unit L2 or the third optical unit L3, which is positioned closer to the image plane than the first optical unit L1 including the reflective member PRZ. With such an arrangement, the spherical aberration generated in the first optical unit L1 can be easily compensated for with a satisfactory result.

An aspherical lens used in such a case can be a lens having a combined aspherical surface (replica aspherical surface) in order to widen a range of glass types practically usable in consideration of productivity.

Further, the aspherical lens can be made of a plastic material.

In addition, a diffractive optical element or a refraction-distributed optical material can also be introduced. Such a modification is effective in easily improving the optical performance.

By moving the iris stop SP along the optical axis during zooming independently of the other optical units, changes in the position of the entrance pupil can be reduced. Alternatively, the iris stop SP can be held fixed relative to the optical axis during zooming for the sake of simplification of the mechanism.

To compensate for an image blur generated by shaking of hands at the time of photographing and causing a deterioration of image quality, the lens unit or a part of the lens unit can be arranged in an eccentric state. Further, the reflective member PRZ can be rotated or moved to change the angle or the direction of deflection (of the folded light path) such that the action of displacing the image plane position is produced so as to cancel the image blur caused at the time of photographing.

The first to eighth exemplary embodiments will be described next.

In each of the first to fourth exemplary embodiments shown in FIGS. 1, 6, 11 and 16, the imaging apparatus OB includes the first optical unit L1 having a negative refractive power and including the reflective member PRZ, the aperture stop SP, the second optical unit L2 having a positive refractive power, and the third optical unit L3 having a positive refractive power and including the image pickup element CP, which are arranged in the order named from the object side toward the image side.

The third optical unit L3 includes the lens member LU having a positive refractive power, which is disposed within the distance of 1.5×LD in terms of air-converted length from the image pickup element CP on an assumption that LD is the diagonal length of the effective (viewing) area of the image pickup element CP.

The first optical unit L1 includes the reflective member PRZ for deflecting (folding) the optical axis in the range of 80°-100°.

The first optical unit L1 does not move during zooming.

The second optical unit L2 moves toward the object side.

The third optical unit L3 moves such that the image pickup element CP is positioned at the image plane, which is moved during zooming.

At least one of the positive lens and the negative lens of the second optical unit L2 and the positive lens and the negative lens of the third optical unit L3 can be moved to have a component perpendicular to the direction of the optical axis such that the action of displacing the image plane position is produced so as to compensate for the image blur caused by shaking of hands.

The above-described condition formulae (1) to (3) for the first to fourth exemplary embodiments can be expressed as follows.

The focal length of the lens member LU is assumed to be PFL.

Also, the focal length of the entire optical system at the wide-angle end is assumed to be FW. On that assumption, the following condition formula (3) is satisfied:

$$0.12 < Fw/PFL < 0.5 \quad (3)$$

The focal length of the first optical unit L1 is assumed to be F1. The combined focal length of the second and third optical units L2, L3 at the wide-angle end is assumed to be FR.

On that assumption, the following condition formulae (1) and (2) are satisfied:

$$0.25 < |Fw/F1| < 0.6 \text{ (where } F1 < 0\text{)} \quad (1)$$

$$0.25 < Fw/FR < 0.9 \quad (2)$$

In the first exemplary embodiment shown in FIG. 1, the first optical unit L1 includes a negative lens G11 having an object-side surface in the form of a convex meniscus, a reflective member PRZ, a positive lens G12, and a negative lens G13, which are arranged in the order named from the object side toward the image side.

The second optical unit L2 includes an aperture stop SP, a positive lens G21 having convex surfaces on both sides, a negative lens G22 having concave surfaces on both sides, and a positive lens G23 having a convex surface on the object side.

The third optical unit L3 includes a positive lens G31, the plane-parallel plate F1, and the image pickup element CP.

In the second exemplary embodiment shown in FIG. 6, the first optical unit L1 includes a negative lens G11 having an object-side surface in the form of a convex meniscus, the reflective member PRZ, a negative lens G12, and a positive lens G13, which are arranged in the order named from the object side toward the image side.

The second optical unit L2 includes the aperture stop SP, a positive lens G21 having convex surfaces on both sides, a positive lens G22, and a negative lens G23.

The third optical unit L3 includes a negative lens G31, a positive lens G32, the plane-parallel plate F1, and the image pickup element CP.

In the third exemplary embodiment shown in FIG. 11, the first optical unit L1 includes a positive lens G11, a negative lens G12 having an object-side surface in the form of a convex meniscus, the reflective member PRZ, a negative lens G13, and a positive lens G14, which are arranged in the order named from the object side toward the image side.

The positive lens G11 and the negative lens G12 cooperatively compensate for the distortion aberration and the transverse chromatic aberration at the wide-angle end.

The second optical unit L2 includes the aperture stop SP, a positive lens G21 having convex surfaces on both sides, a positive lens G22, and a negative lens G23 having an object-side surface in the form of a convex meniscus.

The third optical unit L3 includes a negative lens G31, a positive lens G32, the plane-parallel plate F1, and the image pickup element CP.

The lens arrangement of the fourth exemplary embodiment shown in FIG. 16 is the same as that of the second exemplary embodiment shown in FIG. 6.

In the fifth exemplary embodiment shown in FIG. 21, the imaging apparatus OB includes the first optical unit L1 having a negative refractive power and including the reflective member PRZ, the aperture stop SP, the second optical unit L2 having a positive refractive power, and the third optical unit L3 having a negative refractive power and including the image pickup element CP, which are arranged in the order named from the object side toward the image side.

The first optical unit L1 includes the reflective member PRZ for deflecting (folding) the optical axis in the range of 80°-100°.

The first optical unit L1 does not move during zooming.

The second optical unit L2 moves toward the object side.

The third optical unit L3 moves such that the image pickup element CP is positioned at the image plane which is moved during zooming.

At least one of the positive lens and the negative lens of the second optical unit L2 and the negative lens of the third optical unit L3 can be moved to have a component perpendicular to the direction of the optical axis such that the action of displacing the image plane position is produced so as to compensate for the image blur caused by shaking of hands.

The above-described condition formulae (1) and (2) for the fifth exemplary embodiment can be expressed as follows.

The focal length of the first optical unit L1 is assumed to be F1. The combined focal length of the second and third optical units L2, L3 at the wide-angle end is assumed to be FR.

On that assumption, the following condition formulae (1) and (2) are satisfied:

$$0.25<|Fw/F1|<0.6 \text{ (where } F1<0) \quad (1)$$

$$0.25<Fw/FR<0.9 \quad (2)$$

In the fifth exemplary embodiment shown in FIG. 21, the first optical unit L1 includes a negative lens G11 having an object-side surface in the form of a convex meniscus, the reflective member PRZ, a positive lens G12, and a negative lens G13, which are arranged in the order named from the object side toward the image side.

The second optical unit L2 includes the aperture stop SP, a positive lens G21, a negative lens G22, and a positive lens G23 having a convex surface on the object side.

The third optical unit L3 includes a negative lens G31 having an aspherical surface and made of a resin, the plane-parallel plate F1, and the image pickup element CP.

At least one of the positive lens and the negative lens of the second optical unit L2 or the negative lens of the third optical unit L3 can be moved to have a component perpendicular to the direction of the optical axis such that the action of displacing the image plane position is produced so as to compensate for the image blur caused by shaking of hands.

In each of the sixth to eighth exemplary embodiments shown in FIGS. 26, 31 and 36, the imaging apparatus OB includes the first optical unit L1 having a negative refractive power and including the reflective member PRZ, the aperture stop SP, the second optical unit L2 having a positive refractive power, and the third optical unit L3 including the image pickup element CP, which are arranged in the order named from the object side toward the image side.

The first optical unit L1 includes the reflective member PRZ for deflecting (folding) the optical axis in the range of 80°-100°.

The first optical unit L1 does not move during zooming.

The second optical unit L2 moves toward the object side.

The third optical unit L3 moves such that the image pickup element CP is positioned at the position of the image plane which is moved during zooming.

At least one of the positive lens and the negative lens of the second optical unit L2 and the third optical unit L3 can be moved to have a component perpendicular to the direction of the optical axis such that the action of displacing the image plane position is produced so as to compensate for the image blur caused by shaking of hands.

The above-described condition formulae (1) and (2) for each of the sixth to eighth exemplary embodiments can be expressed as follows.

The focal length of the first optical unit L1 is assumed to be F1. The focal length of the second optical unit L2 at the wide-angle end is assumed to be FR.

On that assumption, the following condition formulae (1) and (2) are satisfied:

$$0.25<|Fw/F1|<0.6 \text{ (where } F1<0) \quad (1)$$

$$0.25<Fw/FR<0.9 \quad (2)$$

In the sixth exemplary embodiment shown in FIG. 26, the first optical unit L1 includes a negative lens G11 having an object-side surface in the form of a convex meniscus, the reflective member PRZ, a positive lens G12, and a negative lens G13, which are arranged in the order named from the object side toward the image side.

The second optical unit L2 includes the aperture stop SP, a positive lens G21 having convex surfaces on both sides, a negative lens G22 having concave surfaces on both sides, and a positive lens G23 having a convex surface on the object side.

The third optical unit L3 includes the plane-parallel plate F1 and the image pickup element CP.

The lens arrangement of the seventh exemplary embodiment shown in FIG. 31 is the same as that of the sixth exemplary embodiment shown in FIG. 26.

In the eighth exemplary embodiment shown in FIG. 36, the first optical unit L1 includes a negative lens G11 having concave surfaces on both sides, the reflective member PRZ formed of a mirror, a positive lens G12, and a negative lens G13, which are arranged in the order named from the object side toward the image side.

The second optical unit L2 includes the aperture stop SP, a positive lens G21 having convex surfaces on both sides, a negative lens G22 having concave surfaces on both sides, and a positive lens G23 having a convex surface on the object side.

The third optical unit L3 includes the plane-parallel plate F1 and the image pickup element CP.

Numerical Examples of the present invention will be described below. In each of Numerical Examples, i represents the order of a surface counting from the object side, Ri represents the radius of curvature of each surface, Di represents the distance between the i-th surface and the (i+1)-th surface, and Ni and vi represent respectively the refractive index and the Abbe number on the basis of the d-line.

Two surfaces closest to the image plane are given by the surfaces of the optical block F1. Also, assuming that x represents a displacement in the direction of the optical axis at the position of the height h from the optical axis on the basis of the surface vertex, the spherical shape can be expressed by:

$$x=(h^2/R)/[1+\{1-(1+k)(h/R)^2\}^{1/2}]+Ah^2+Bh^4+Ch^6+Dh^8+Eh^{10}$$

where k is the conical constant, A, B, C, D and E are aspherical surface coefficients, and R is the radius of paraxial curvature.

Further, "e−0x" means "×10$^{-x}$". In addition, f represents the focal length, Fno represents the F number, and ω represents the half angle of view. The relationships between the condition formulae and Numerical Examples are shown in Table 1.

NUMERICAL EXAMPLE 1

| f = 6.31~10.56 Fno = 3.55~4.53 2ω = 58.7°~37.2° | | | |
|---|---|---|---|
| R1 = 13.345 | D1 = 1.00 | N1 = 1.69680 | v1 = 55.5 |
| R2 = 8.327 | D2 = 3.41 | | |
| R3 = ∞ | D3 = 12.00 | N2 = 1.77250 | v2 = 49.6 |
| R4 = ∞ | D4 = 0.72 | | |
| R5 = −13.225 | D5 = 1.50 | N3 = 1.84666 | v3 = 23.9 |
| R6 = −11.139 | D6 = 0.70 | N4 = 1.48749 | v4 = 70.2 |
| R7 = 225.227 | D7 = variable | | |
| R8 = stop | D8 = 0.30 | | |
| * R9 = 4.545 | D9 = 2.20 | N5 = 1.74320 | v5 = 49.3 |
| * R10 = −12.519 | D10 = 0.30 | | |
| R11 = −10.045 | D11 = 1.00 | N6 = 1.69895 | v6 = 30.1 |
| R12 = 4.176 | D12 = 0.20 | | |
| R13 = 7.146 | D13 = 2.00 | N7 = 1.69680 | v7 = 55.5 |
| R14 = 131.113 | D14 = variable | | |

-continued f = 6.31~10.56 Fno = 3.55~4.53 2ω = 58.7°~37.2°

| R15 = 11.679 | D15 = 1.50 | N8 = 1.48749 | ν8 = 70.2 |
| R16 = 27.893 | D16 = 1.00 | | |
| R17 = ∞ | D17 = 1.25 | N9 = 1.51633 | ν9 = 64.1 |
| R18 = ∞ | | | |

| | Focal length | | |
|---|---|---|---|
| Variable distance | 6.31 | 8.97 | 10.56 |
| D7 | 8.34 | 2.94 | 1.00 |
| D14 | 5.00 | 6.85 | 7.95 |

Coefficients of Aspherical Surfaces

| 9th Surface: | K = −6.64966e−002 C = 4.67119e−004 | A = 0.00000e+000 D = −1.47826e−004 | B = 1.74069e−004 E = 2.16085e−005 |
| 10th Surface: | K = 4.27738e+000 C = 1.36497e−004 | A = 0.00000e+000 D = −1.57732e−005 | B = 2.59427e−003 E = 1.27714e−005 |

NUMERICAL EXAMPLE 2 f = 4.06~15.94 Fno = 3.17~6.30 2ω = 82.3°~25.1°

| R1 = 34.663 | D1 = 1.50 | N1 = 1.88300 | ν1 = 40.8 |
| R2 = 16.618 | D2 = 5.50 | | |
| R3 = ∞ | D3 = 19.00 | N2 = 1.77250 | ν2 = 49.6 |
| R4 = ∞ | D4 = 0.30 | | |
| * R5 = 85.947 | D5 = 1.15 | N3 = 1.85961 | ν3 = 40.3 |
| R6 = 8.236 | D6 = 1.66 | | |
| R7 = 10.880 | D7 = 2.50 | N4 = 1.84666 | ν4 = 23.9 |
| R8 = 30.932 | D8 = variable | | |
| R9 = stop | D9 = 0.50 | | |
| * R10 = 6.364 | D10 = 2.00 | N5 = 1.69350 | ν5 = 53.2 |
| * R11 = −64.751 | D11 = 0.97 | | |
| R12 = 6.317 | D12 = 1.60 | N6 = 1.69350 | ν6 = 53.2 |
| R13 = 74.670 | D13 = 0.50 | N7 = 1.80518 | ν7 = 25.4 |
| R14 = 3.606 | D14 = variable | | |
| R15 = −10773.414 | D15 = 0.80 | N8 = 1.59270 | ν8 = 35.3 |
| R16 = 22.665 | D16 = 2.01 | | |
| * R17 = −239.836 | D17 = 2.00 | N9 = 1.73077 | ν9 = 40.5 |
| * R18 = −8.195 | D18 = 1.50 | | |
| R19 = ∞ | D19 = 1.25 | N10 = 1.51633 | ν10 = 64.1 |
| R20 = ∞ | | | |

| | Focal length | | |
|---|---|---|---|
| Variable distance | 4.06 | 11.19 | 15.94 |
| D8 | 24.74 | 4.62 | 1.21 |
| D14 | 3.02 | 10.16 | 14.91 |

Coefficients of Aspherical Surfaces

| 5th Surface: | K = 9.38032e+001 C = 2.19306e−007 | A = 0.00000e+000 D = 0.00000e+000 | B = 4.58085e−005 E = 0.00000e+000 |
| 10th Surface: | K = −2.05423e+000 C = 2.05880e−005 | A = 0.00000e+000 D = 3.08708e−006 | B = 9.53260e−004 E = 1.12930e−009 |
| 11th Surface: | K = 3.09419e+001 C = 6.73795e−005 | A = 0.00000e+000 D = −1.37951e−007 | B = 5.23315e−004 E = 2.14543e−007 |
| 17th Surface: | K = −5.24721e+005 C = 7.75565e−006 | A = 0.00000e+000 D = 2.40415e−006 | B = −1.34953e−003 E = 6.82850e−008 |
| 18th Surface: | K = −3.86270e+000 C = −1.03846e−005 | A = 0.00000e+000 D = 2.39892e−006 | B = −1.15490e−003 E = 6.30842e−008 |

NUMERICAL EXAMPLE 3 f = 4.71~17.20 Fno = 3.00~5.70 2ω = 74.0°~23.3°

| R1 = 24.836 | D1 = 4.80 | N1 = 1.48749 | ν1 = 70.2 |
| R2 = 624.170 | D2 = 0.15 | | |
| R3 = 52.758 | D3 = 1.00 | N2 = 1.88300 | ν2 = 40.8 |
| R4 = 9.454 | D4 = 3.99 | | |
| R5 = ∞ | D5 = 10.00 | N3 = 1.77250 | ν3 = 49.6 |
| R6 = ∞ | D6 = 0.62 | | |
| R7 = −116.585 | D7 = 0.60 | N4 = 1.88300 | ν4 = 40.8 |
| R8 = 11.497 | D8 = 0.39 | | |
| R9 = 11.586 | D9 = 2.20 | N5 = 1.84666 | ν5 = 23.9 |
| R10 = 96.006 | D10 = variable | | |
| R11 = stop | D11 = 0.80 | | |
| * R12 = 6.260 | D12 = 2.00 | N6 = 1.69350 | ν6 = 53.2 |
| * R13 = −29.247 | D13 = 0.40 | | |
| R14 = 6.846 | D14 = 1.60 | N7 = 1.69350 | ν7 = 53.2 |
| R15 = 38.913 | D15 = 0.50 | N8 = 1.80518 | ν8 = 25.4 |
| R16 = 3.683 | D16 = variable | | |
| R17 = −19.887 | D17 = 0.80 | N9 = 1.59270 | ν9 = 35.3 |
| R18 = 253.579 | D18 = 5.01 | | |
| * R19 = −144.382 | D19 = 2.00 | N10 = 1.73077 | ν10 = 40.5 |
| * R20 = −8.877 | D20 = 1.50 | | |
| R21 = ∞ | D21 = 1.25 | N11 = 1.51633 | ν11 = 64.1 |
| R22 = ∞ | | | |

| | Focal length | | |
|---|---|---|---|
| Variable distance | 4.71 | 12.20 | 17.20 |
| D10 | 22.19 | 4.10 | 0.80 |
| D16 | 1.34 | 7.37 | 11.39 |

Coefficients of Aspherical Surfaces

| 12th Surface: | K = −2.04787e+000 C = 9.83531e−006 | A = 0.00000e+000 D = 1.09240e−006 | B = 8.93475e−004 E = 1.30132e−007 |
| 13th Surface: | K = −2.43093e+001 C = 2.02216e−005 | A = 0.00000e+000 D = 9.59498e−007 | B = 4.71249e−004 E = 2.13765e−007 |
| 19th Surface: | K = −5.24460e+005 C = −5.35728e−006 | A = 0.00000e+000 D = 2.83552e−006 | B = −1.59761e−003 E = 8.20922e−008 |
| 20th Surface: | K = −3.79995e+000 C = −1.50934e−005 | A = 0.00000e+000 D = 2.37139e−006 | B = −1.32477e−003 E = 7.29888e−008 |

NUMERICAL EXAMPLE 4 f = 4.70~17.48 Fno = 2.90~5.70 2ω = 74.1°~23.0°

| R1 = 26.182 | D1 = 1.20 | N1 = 1.88300 | ν1 = 40.8 |
| R2 = 12.548 | D2 = 4.06 | | |
| R3 = ∞ | D3 = 15.00 | N2 = 1.77250 | ν2 = 49.6 |
| R4 = ∞ | D4 = 0.46 | | |
| R5 = 481.879 | D5 = 0.60 | N3 = 1.88300 | ν3 = 40.8 |
| R6 = 10.074 | D6 = 0.85 | | |
| R7 = 10.760 | D7 = 2.20 | N4 = 1.84666 | ν4 = 23.9 |
| R8 = 32.602 | D8 = variable | | |
| R9 = stop | D9 = 0.80 | | |
| * R10 = 6.238 | D10 = 2.00 | N5 = 1.69350 | ν5 = 53.2 |
| * R11 = −43.029 | D11 = 0.48 | | |
| R12 = 6.306 | D12 = 1.60 | N6 = 1.69350 | ν6 = 53.2 |
| R13 = 24.260 | D13 = 0.50 | N7 = 1.80518 | ν7 = 25.4 |
| R14 = 3.536 | D14 = variable | | |
| R15 = −94.680 | D15 = 0.80 | N8 = 1.59270 | ν8 = 35.3 |
| R16 = 22.419 | D16 = 4.60 | | |
| * R17 = −219.255 | D17 = 2.00 | N9 = 1.73077 | ν9 = 40.5 |
| * R18 = −8.195 | D18 = 1.50 | | |
| R19 = ∞ | D19 = 1.25 | N10 = 1.51633 | ν10 = 64.1 |
| R20 = ∞ | | | |

-continued f = 4.70~17.48 Fno = 2.90~5.70 2ω = 74.1°~23.0°

| Variable distance | Focal length | | |
|---|---|---|---|
| | 4.70 | 12.37 | 17.48 |
| D8 | 21.69 | 3.96 | 0.79 |
| D14 | 1.69 | 8.37 | 12.82 |

Coefficients of Aspherical Surfaces

| 10th Surface: | K = −2.13082e+000 C = 1.88054e−005 | A = 0.00000e+000 D = 7.25651e−007 | B = 9.70421e−004 E = 1.47315e−007 |
|---|---|---|---|
| 11th Surface: | K = 6.87585e−001 C = 2.90541e−005 | A = 0.00000e+000 D = 1.23619e−006 | B = 5.62449e−004 E = 2.14543e−007 |
| 17th Surface: | K = −5.24460e+005 C = 7.75565e−006 | A = 0.00000e+000 D = 2.40415e−006 | B = −1.34953e−003 E = 6.82850e−008 |
| 18th Surface: | K = −3.86270e+000 C = −1.03846e−005 | A = 0.00000e+000 D = 2.39892e−006 | B = −1.15490e−003 E = 6.30842e−008 |

NUMERICAL EXAMPLE 5 f = 6.01~11.99 Fno = 3.55~4.77 2ω = 61.1°~33.0°

| R1 = 13.377 | D1 = 1.00 | N1 = 1.69680 | ν1 = 55.5 |
|---|---|---|---|
| R2 = 8.661 | D2 = 3.20 | | |
| R3 = ∞ | D3 = 12.00 | N2 = 1.77250 | ν2 = 49.6 |
| R4 = ∞ | D4 = 0.72 | | |
| R5 = −11.096 | D5 = 1.50 | N3 = 1.84666 | ν3 = 23.9 |
| R6 = −9.619 | D6 = 0.60 | N4 = 1.48749 | ν4 = 70.2 |
| R7 = 53.531 | D7 = variable | | |
| R8 = stop | D8 = 0.30 | | |
| * R9 = 4.117 | D9 = 2.10 | N5 = 1.69350 | ν5 = 53.2 |
| * R10 = −136.716 | D10 = 0.30 | | |
| R11 = −1001.639 | D11 = 1.00 | N6 = 1.80518 | ν6 = 25.4 |
| R12 = 3.673 | D12 = 0.20 | | |
| R13 = 5.134 | D13 = 1.60 | N7 = 1.64769 | ν7 = 33.8 |
| R14 = −31.878 | D14 = variable | | |
| * R15 = −8.349 | D15 = 0.80 | N8 = 1.58306 | ν8 = 30.2 |
| * R16 = −11.353 | D16 = 1.20 | | |
| R17 = ∞ | D17 = 1.25 | N9 = 1.51633 | ν9 = 64.1 |
| R18 = ∞ | | | |

| Variable distance | Focal length | | |
|---|---|---|---|
| | 6.01 | 9.75 | 11.99 |
| D7 | 9.85 | 3.04 | 1.00 |
| D14 | 5.00 | 7.35 | 8.76 |

Coefficients of Aspherical Surfaces

| 9th Surface: | K = 3.39452e−002 C = 1.70872e−004 | A = 0.00000e+000 D = −4.04778e−005 | B = 2.47151e−005 E = 6.93891e−006 |
|---|---|---|---|
| 10th Surface: | K = −3.52243e+003 C = 1.25471e−004 | A = 0.00000e+000 D = 3.61107e−005 | B = 2.21925e−003 E = 6.09430e−007 |
| 15th Surface: | K = −1.73320e+001 C = 3.09883e−004 | A = 0.00000e+000 D = 0.00000e+000 | B = 1.40872e−004 E = 0.00000e+000 |
| 16th Surface: | K = −1.43760e+002 C = 4.76635e−004 | A = 0.00000e+000 D = 0.00000e+000 | B = −1.34966e−003 E = 0.00000e+000 |

NUMERICAL EXAMPLE 6 f = 6.40~10.36 Fno = 3.55~4.31 2ω = 58.1°~37.8°

| R1 = 12.271 | D1 = 1.00 | N1 = 1.69680 | ν1 = 55.5 |
|---|---|---|---|
| R2 = 8.122 | D2 = 3.19 | | |

-continued f = 6.40~10.36 Fno = 3.55~4.31 2ω = 58.1°~37.8°

| R3 = ∞ | D3 = 12.00 | N2 = 1.77250 | ν2 = 49.6 |
|---|---|---|---|
| R4 = ∞ | D4 = 0.61 | | |
| R5 = −14.128 | D5 = 1.50 | N3 = 1.84666 | ν3 = 23.9 |
| R6 = −12.108 | D6 = 0.70 | N4 = 1.48749 | ν4 = 70.2 |
| R7 = 84.072 | D7 = variable | | |
| R8 = stop | D8 = 0.30 | | |
| * R9 = 4.679 | D9 = 2.20 | N5 = 1.74320 | ν5 = 49.3 |
| * R10 = −17.498 | D10 = 0.30 | | |
| R11 = −10.357 | D11 = 1.00 | N6 = 1.69895 | ν6 = 30.1 |
| R12 = 4.460 | D12 = 0.20 | | |
| R13 = 8.349 | D13 = 2.00 | N7 = 1.69680 | ν7 = 55.5 |
| R14 = −16.887 | D14 = variable | | |
| R15 = ∞ | D15 = 1.25 | N8 = 1.51633 | ν8 = 64.1 |
| R16 = ∞ | | | |

| Variable distance | Focal length | | |
|---|---|---|---|
| | 6.40 | 8.87 | 10.36 |
| D7 | 8.44 | 3.01 | 1.00 |
| D14 | 5.00 | 6.47 | 7.36 |

Coefficients of Aspherical Surfaces

| 9th Surface: | K = −5.21824e−003 C = 4.48315e−004 | A = 0.00000e+000 D = −1.56662e−004 | B = 1.85904e−005 E = 2.29432e−005 |
|---|---|---|---|
| 10th Surface: | K = 4.61553e+000 C = 1.71106e−005 | A = 0.00000e+000 D = 2.50225e−005 | B = 1.88617e−003 E = 5.38693e−006 |

NUMERICAL EXAMPLE 7 f = 6.53~11.66 Fno = 3.55~4.46 2ω = 57.0°~33.9°

| R1 = 15.926 | D1 = 0.90 | N1 = 1.69680 | ν1 = 55.5 |
|---|---|---|---|
| R2 = 10.388 | D2 = 3.21 | | |
| R3 = ∞ | D3 = 12.00 | N2 = 1.51633 | ν2 = 64.1 |
| R4 = ∞ | D4 = 0.88 | | |
| R5 = −10.720 | D5 = 1.40 | N3 = 1.80518 | ν3 = 25.4 |
| R6 = −8.522 | D6 = 0.60 | N4 = 1.48749 | ν4 = 70.2 |
| R7 = 1836.477 | D7 = variable | | |
| R8 = stop | D8 = 0.30 | | |
| * R9 = 5.616 | D9 = 2.00 | N5 = 1.74320 | ν5 = 49.3 |
| R10 = −6.053 | D10 = 1.20 | N6 = 1.64769 | ν6 = 33.8 |
| R11 = 4.749 | D11 = 0.26 | | |
| R12 = 11.894 | D12 = 1.60 | N7 = 1.60311 | ν7 = 60.6 |
| R13 = −16.367 | D13 = variable | | |
| R14 = ∞ | D14 = 1.25 | N8 = 1.51633 | ν8 = 64.1 |
| R15 = ∞ | | | |

| Variable distance | Focal length | | |
|---|---|---|---|
| | 6.53 | 9.74 | 11.66 |
| D7 | 10.70 | 3.43 | 0.98 |
| D13 | 5.00 | 6.99 | 8.19 |

Coefficients of Aspherical Surfaces

| 9th Surface: | K = 1.37709e+000 C = 4.52513e−004 | A = 0.00000e+000 D = −1.87562e−004 | B = −2.06320e−003 E = 2.06825e− |
|---|---|---|---|

NUMERICAL EXAMPLE 8 f = 6.54~11.78  Fno = 3.55~4.81  2ω = 57.0°~33.5°

| | | |
|---|---|---|
| R1 = −152.692 | D1 = 1.00 | N1 = 1.69680 ν1 = 55.5 |
| R2 = 46.600 | D2 = 14.08 | |
| * R3 = −10.328 | D3 = 1.40 | N2 = 1.84666 ν2 = 23.9 |
| R4 = −8.641 | D4 = 0.70 | N3 = 1.48749 ν3 = 70.2 |
| R5 = 42.143 | D5 = variable | |
| R6 = stop | D6 = 0.30 | |
| * R7 = 4.336 | D7 = 2.20 | N4 = 1.74320 ν4 = 49.3 |
| * R8 = −13.726 | D8 = 0.30 | |
| R9 = −8.245 | D9 = 0.60 | N5 = 1.69895 ν5 = 30.1 |
| R10 = 4.277 | D10 = 0.24 | |
| R11 = 7.720 | D11 = 1.70 | N6 = 1.60311 ν6 = 60.6 |
| R12 = −16.517 | D12 = variable | |
| R13 = ∞ | D13 = 1.25 | N7 = 1.51633 ν7 = 64.1 |
| R14 = ∞ | | |

| | Focal length | | |
|---|---|---|---|
| Variable distance | 6.54 | 9.81 | 11.78 |
| D5 | 8.03 | 2.74 | 0.98 |
| D12 | 5.00 | 7.37 | 8.79 |

Coefficients of Aspherical Surfaces

| 3th Surface: | K = −6.36822e−001 C = −6.56359e−006 | A = 0.00000e+000 D = 1.58657e−007 | B = −7.06419e−005 E = 5.20652e−010 |
|---|---|---|---|
| 7th Surface: | K = −1.12637e−001 C = 4.61140e−004 | A = 0.00000e+000 D = −1.25420e−004 | B = 3.20201e−004 E = 1.74047e−005 |
| 8th Surface: | K = 1.18881e+000 C = 2.10460e−004 | A = 0.00000e+000 D = −4.03980e−005 | B = 2.34714e−003 E = 1.65917e−005 |

TABLE 1

| | | Numerical example 1 | Numerical example 2 | Numerical example 3 | Numerical example 4 |
|---|---|---|---|---|---|
| Condition formula (1) | \|Fw/F1\| | 0.441 | 0.312 | 0.360 | 0.361 |
| Condition formula (2) | Fw/FR | 0.707 | 0.314 | 0.338 | 0.330 |
| Condition formula (3) | Fw/PFL | 0.158 | 0.351 | 0.366 | 0.405 |

| | | Numerical example 5 | Numerical example 6 | Numerical example 7 | Numerical example 8 |
|---|---|---|---|---|---|
| Condition formula (1) | \|Fw/F1\| | 0.500 | 0.442 | 0.429 | 0.546 |
| Condition formula (2) | Fw/FR | 0.722 | 0.743 | 0.689 | 0.755 |
| Condition formula (3) | Fw/PFL | — | — | — | — |

As one exemplary embodiment of the imaging apparatus according to the present invention, a digital compact camera of lens shutter type will be described with reference to FIG. 42.

In FIG. 42, the digital compact camera includes a digital camera body 10 and an optical system 11 according to the present invention. It further includes a strobe 12 incorporated in the camera body 10, an external finder 13, and a shutter (release) button 14. Numeral 15 denotes a schematic arrangement of the optical system according to the present invention, which is incorporated within the camera body.

By applying the imaging apparatus of the present invention to the digital camera, for example, a digital camera having a smaller size and higher optical performance can be realized. In particular, the thickness of the camera body can be reduced.

In the illustrated exemplary embodiment, the optical system is arranged such that the ray of light folded by the reflective member advances in the up-and-down (vertical) direction when the camera is in a landscape posture at the time of photographing. However, the optical system can also be arranged such that the folded ray of light advances in the right-and-left (horizontal) direction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-328094 filed Dec. 5, 2006, which is hereby incorporated by reference herein in its entirety.

What is claimed is:

1. An imaging apparatus configured to form an image on an image pickup element, the imaging apparatus comprising, in order from an object side to an image side:

a first optical unit having a negative refractive power;

a second optical unit having a positive refractive power; and a third optical unit including the image pickup element, wherein the first optical unit does not move during zooming, wherein the second optical unit moves toward the object side during zooming from a wide-end angle end to a telephoto end, wherein the third optical unit moves during zooming, wherein the second optical unit includes an aperture stop, a positive lens having convex surfaces on both sides, a negative lens having concave surfaces on both sides, and a positive lens having a convex surface on the object side, which are arranged in order from an object side to an image side, and wherein a focal length of the first optical unit (F1), a combined focal length of the second optical unit and the third optical unit at a wide-angle end (FR), and a focal length of an entire optical system at the wide-angle end (Fw) satisfy the following conditions:

$0.25 < |Fw/F1| < 0.6$ (where F1<0), and $0.25 < Fw/FR < 0.9$.

2. The imaging apparatus according to claim 1, wherein the third optical unit includes a lens member having a refractive power.

3. The imaging apparatus according to claim 1, wherein the third optical unit includes the image pickup element and an optical member having no refractive power.

4. The imaging apparatus according to claim 1, wherein the first optical unit includes a reflective member configured to fold an optical axis.

5. The imaging apparatus according to claim 1, wherein a lens member having a refractive power is disposed within a distance of 1.5×LD in terms of air-converted length from the image pickup element, where (LD) denotes a diagonal length of an effective area of the image pickup element.

6. The imaging apparatus according to claim 5, wherein the lens member comprises a lens having a positive refractive power and satisfies the following condition:

$0.12 < Fw/PFL < 0.5$, where (PFL) denotes a focal length of the lens having a positive refractive power and (Fw) denotes a focal length of an entire optical system at a wide-angle end.

7. The imaging apparatus according to claim 5, wherein the lens member comprises a lens having a negative refractive power and including an aspherical surface.

8. An imaging apparatus configured to form an image on an image pickup element, the imaging apparatus comprising, in order from an object side to an image side:
a first optical unit having a negative refractive power;
a second optical unit having a positive refractive power; and
a third optical unit including the image pickup element,
wherein the first optical unit does not move during zooming,
wherein the second optical unit moves toward the object side during zooming from a wide-end angle end to a telephoto end,
wherein the third optical unit moves during zooming,
wherein the second optical unit includes an aperture stop, a positive lens having convex surfaces on both sides, a negative lens having concave surfaces on both sides, and a positive lens having a convex surface on the object side, which are arranged in order from an object side to an image side, and
wherein a lens member having a refractive power is disposed within a distance of 1.5×LD in terms of air-converted length from the image pickup element, where (LD) denotes a diagonal length of an effective area of the image pickup element.

9. The imaging apparatus according to claim 8, wherein the lens member comprises a lens having a positive refractive power and satisfies the following condition:

$0.12<Fw/PFL<0.5$, where (PFL) denotes a focal length of the lens having a positive refractive power and (Fw) denotes a focal length of an entire optical system at a wide-angle end.

10. The imaging apparatus according to claim 8, wherein the lens member comprises a lens having a negative refractive power and including an aspherical surface.

11. An imaging apparatus configured to form an image on an image pickup element, the imaging apparatus comprising, in order from an object side to an image side:
a first optical unit having a negative refractive power;
a second optical unit having a positive refractive power; and
a third optical unit including the image pickup element,
wherein the first optical unit does not move during zooming,
wherein the second optical unit moves toward the object side during zooming from a wide-end angle end to a telephoto end,
wherein the third optical unit moves during zooming,
wherein the second optical unit includes an aperture stop, a positive lens having convex surfaces on both sides, a positive lens, and a negative lens, which are arranged in order from an object side to an image side, and
wherein a focal length of the first optical unit (F1), a combined focal length of the second optical unit and the third optical unit at a wide-angle end (FR), and a focal length of an entire optical system at the wide-angle end (Fw) satisfy the following conditions:

$0.25<|Fw/F1|0.6$ (where F1<0), and $0.25<Fw/FR<0.9$.

12. An imaging apparatus configured to form an image on an image pickup element, the imaging apparatus comprising, in order from an object side to an image side:
a first optical unit having a negative refractive power;
a second optical unit having a positive refractive power; and
a third optical unit including the image pickup element,
wherein the first optical unit does not move during zooming,
wherein the second optical unit moves toward the object side during zooming from a wide-end angle end to a telephoto end,
wherein the third optical unit moves during zooming,
wherein the second optical unit includes an aperture stop, a positive lens having convex surfaces on both sides, a positive lens, and a negative lens, which are arranged in order from an object side to an image side, and
wherein a lens member having a refractive power is disposed within a distance of 1.5×LD in terms of air-converted length from the image pickup element, where (LD) denotes a diagonal length of an effective area of the image pickup element.

13. An imaging apparatus configured to form an image on an image pickup element, the imaging apparatus consisting of, in order from an object side to an image side:
a first optical unit having a negative refractive power;
a second optical unit having a positive refractive power; and
a third optical unit including the image pickup element,
wherein the first optical unit does not move during zooming,
wherein the second optical unit moves toward the object side during zooming from a wide-end angle end to a telephoto end,
wherein the third optical unit moves during zooming, and
wherein a focal length of the first optical unit (F1), a combined focal length of the second optical unit and the third optical unit at a wide-angle end (FR), and a focal length of an entire optical system at the wide-angle end (Fw) satisfy the following conditions:

$0.25<|Fw/F1|0.6$ (where F1<0), and $0.25<Fw/FR<0.9$.

14. An imaging apparatus configured to form an image on an image pickup element, the imaging apparatus consisting of, in order from an object side to an image side:
a first optical unit having a negative refractive power;
a second optical unit having a positive refractive power; and
a third optical unit including the image pickup element,
wherein the first optical unit does not move during zooming,
wherein the second optical unit moves toward the object side during zooming from a wide-end angle end to a telephoto end,
wherein the third optical unit moves during zooming, and
wherein a lens member having a refractive power is disposed within a distance of 1.5×LD in terms of air-converted length from the image pickup element, where (LD) denotes a diagonal length of an effective area of the image pickup element.

* * * * *